(12) United States Patent
Dewhurst

(10) Patent No.: US 9,430,954 B1
(45) Date of Patent: Aug. 30, 2016

(54) SYSTEM FOR PRESENTING VISUAL ITEMS

(71) Applicant: David Charles Dewhurst, Hook (GB)

(72) Inventor: David Charles Dewhurst, Hook (GB)

( * ) Notice: Subject to any disclaimer, the term of this patent is extended or adjusted under 35 U.S.C. 154(b) by 365 days.

(21) Appl. No.: 14/040,608

(22) Filed: Sep. 27, 2013

(51) Int. Cl.
G09B 21/00 (2006.01)

(52) U.S. Cl.
CPC .................................. G09B 21/003 (2013.01)

(58) Field of Classification Search
None
See application file for complete search history.

(56) References Cited

U.S. PATENT DOCUMENTS

| | | | |
|---|---|---|---|
| 1,350,954 A | 8/1920 | Barr | |
| 1,352,940 A | 9/1920 | Brown | |
| 3,007,259 A | 11/1961 | Abma et al. | |
| 3,800,082 A | 3/1974 | Fish | |
| 4,000,565 A * | 1/1977 | Overby | A61F 9/08 348/62 |
| 4,658,427 A | 4/1987 | Aubin | |
| 4,812,746 A * | 3/1989 | Dallas, Jr. | G09B 21/006 324/111 |
| 5,097,326 A * | 3/1992 | Meijer | G09B 21/006 348/62 |
| 5,374,924 A * | 12/1994 | McKiel, Jr. | G06F 3/04812 341/21 |
| 5,461,399 A * | 10/1995 | Cragun | G06F 3/011 340/4.13 |
| 5,588,839 A * | 12/1996 | Shimoda | G06F 3/011 340/4.12 |
| 6,140,913 A * | 10/2000 | Okada | G09B 21/003 340/4.12 |
| 6,963,656 B1 | 11/2005 | Persaud et al. | |
| 8,239,032 B2 | 8/2012 | Dewhurst | |
| 2002/0037104 A1 * | 3/2002 | Myers | G06K 9/3258 382/187 |
| 2006/0287862 A1 * | 12/2006 | Levin | G10L 13/00 704/271 |
| 2008/0058894 A1 * | 3/2008 | Dewhurst | G09B 21/007 607/54 |
| 2013/0091429 A1 * | 4/2013 | Weng | G06F 17/30746 715/716 |
| 2014/0240110 A1 * | 8/2014 | Suzuki | G06F 3/041 340/407.1 |

OTHER PUBLICATIONS

Fournier D'Albe, E. E "The Moon-Element", D.Appleton and Company, New York, 1924. (Chapter 8 describes completed first optophone.).
Pun, T. et al. "Image and Video Processing for Visually Handicapped People" in EURASIP Journal on Image and Video Processing, vol. 2007, Article ID 25214, 2007. (Summary of the field.).
Edwards, A. "Auditory Display in Assistive Technology" in The Sonification Handbook, T. Hermann, A. Hunt, J.G Neuhoff (Eds.) 2011, pp. 431-453. (Summary of the field.).
Roth, P. et al. "An audio-haptic tool for non-visual image representation" in Proceedings of the Sixth International Symposium on Signal Processing and its Applications 2001 (Cat.No. 01EX467) : 64-7.

(Continued)

Primary Examiner — Ojiako Nwugo

(57) ABSTRACT

One embodiment of a vision substitution system for presenting audio and/or tactile representations of visual items (21) includes processing each visual item (25) into the form of a group of stationary property-presenting energetic effects (for example speech sounds 29), and outputting said effects to audio and/or tactile displays (37 & 35). Said visual items may include: identified entities such as people's faces (23), distributions of color categories or other visual properties (21), areas of movement, and data that can be presented visually; optionally providing facilities for identifying and presenting prominent colors (and other properties) and their distribution, and facilities for blind people to create and access audiotactile images. Other embodiments are described and shown.

20 Claims, 18 Drawing Sheets

(56) References Cited

OTHER PUBLICATIONS

Jaiswal S.R. et al. "Fusion Methodology to Sonification of Color Images" in World Research Journal of Pattern Recognition ISSN: 2278-8557 & E-ISSN: 2278-8565, vol. 1, Issue 1, 2012 (Includes description of Gate project—Graphics Accessible to Everyone—and a method of sonification combining sound and speech.).

Dewhurst, D.C. (present applicant) "Creating and Accessing Audiotactile Images With "HFVE" Vision Substitution Software" in Proc. of ISon 2010, 3rd Interactive Sonification Workshop, KTH, Stockholm, Sweden, 2010 (Present applicant's system prior to inclusion of "Imprints" and other features.).

* cited by examiner

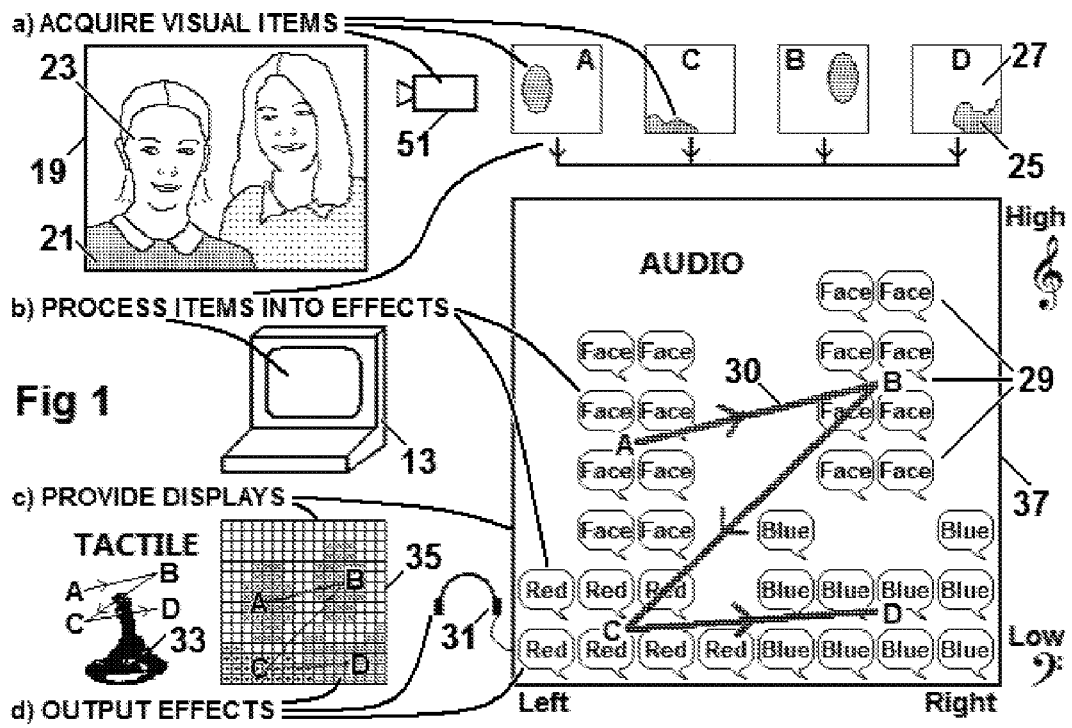
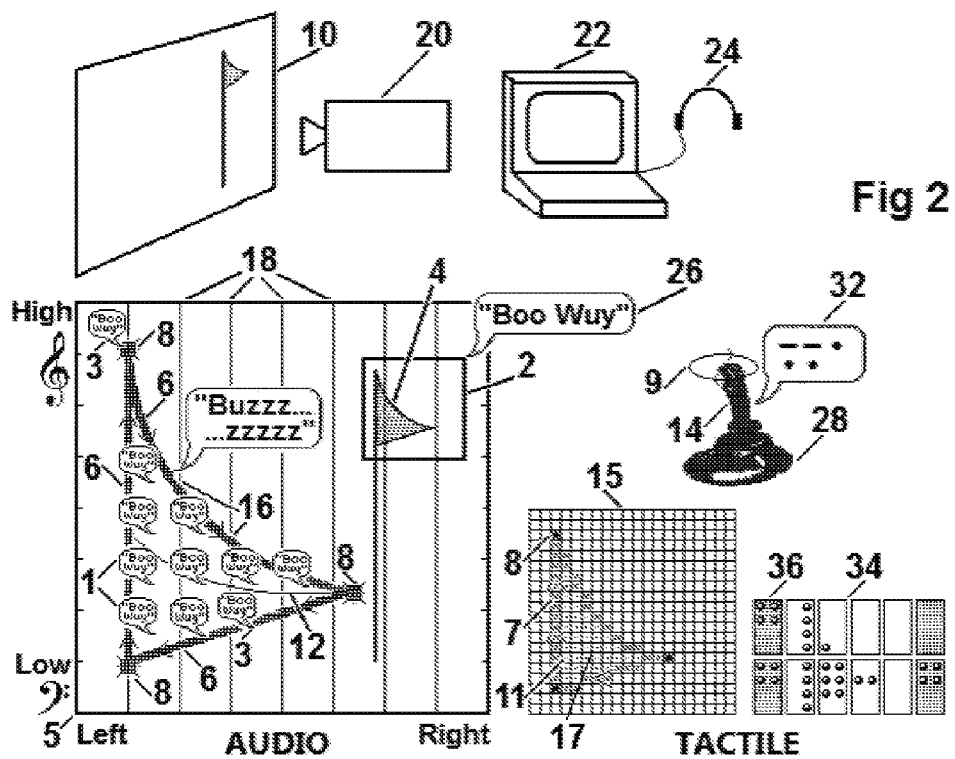

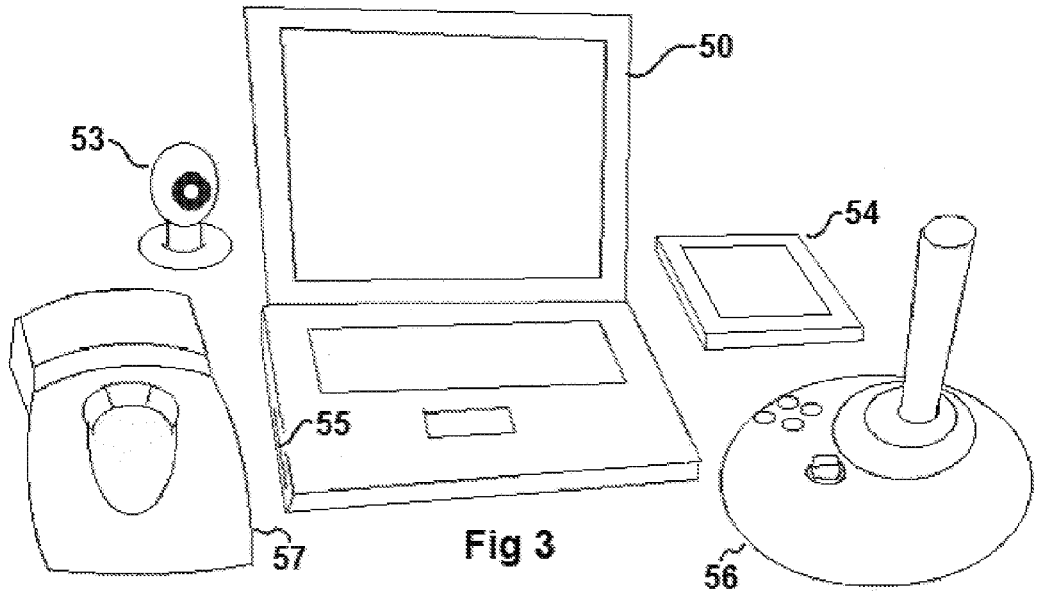
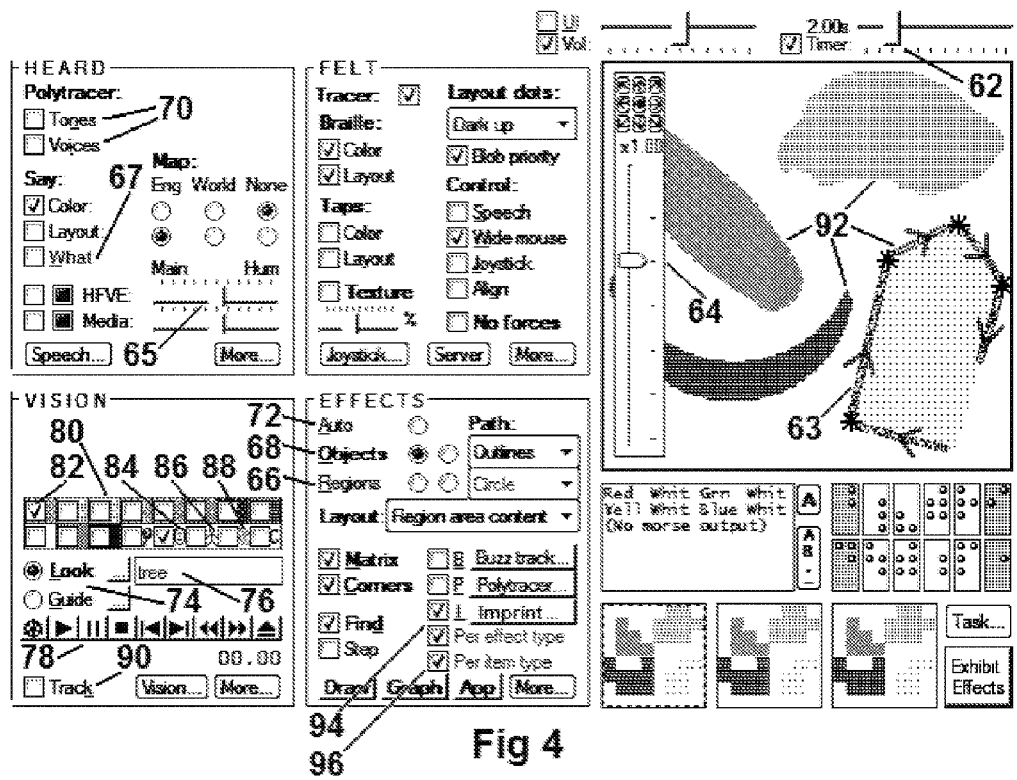

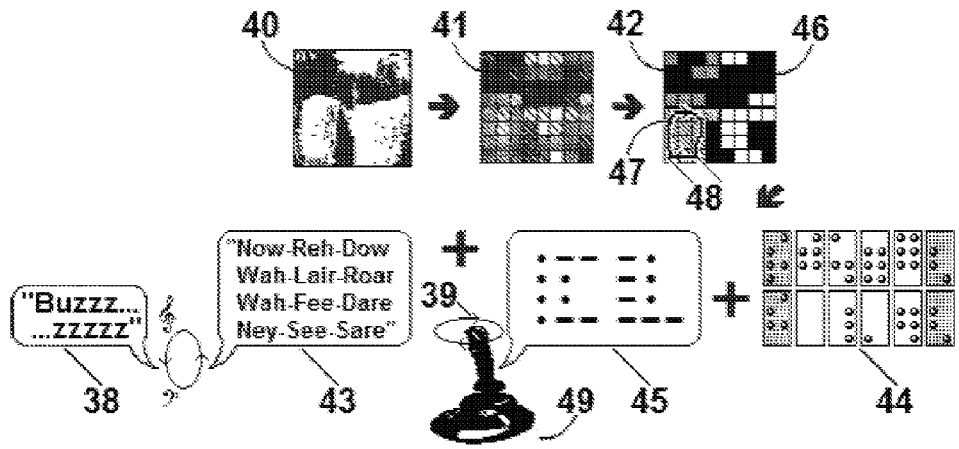
Fig 5    PRIOR ART
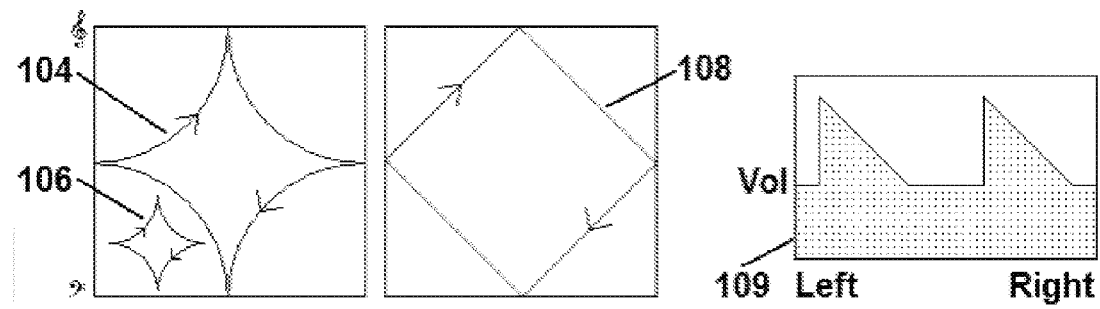
Fig 6
Fig 7

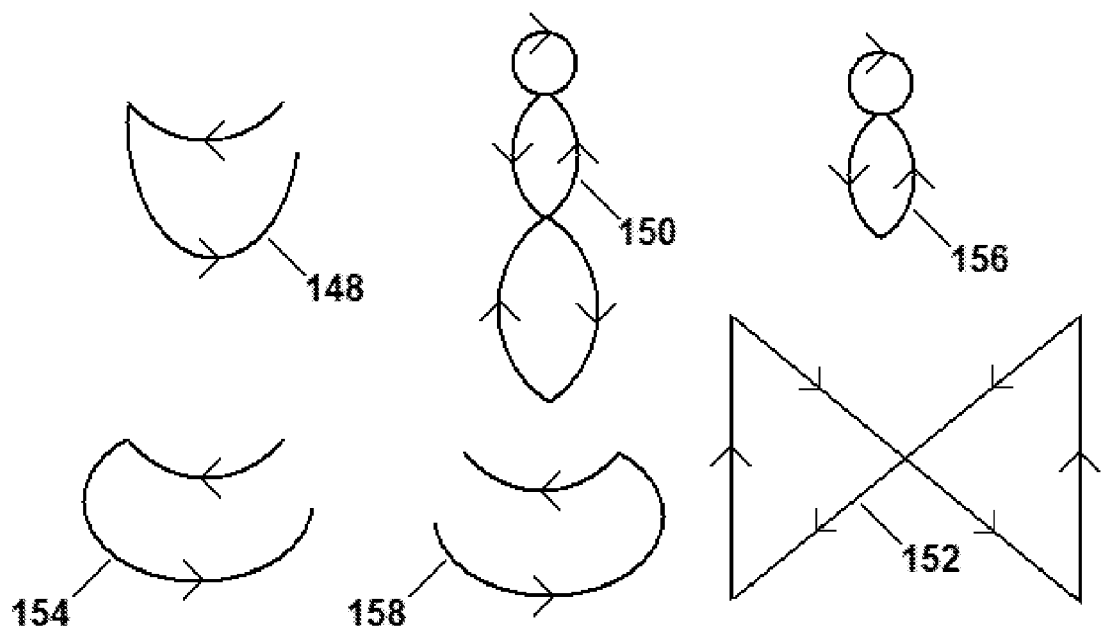
Fig 10
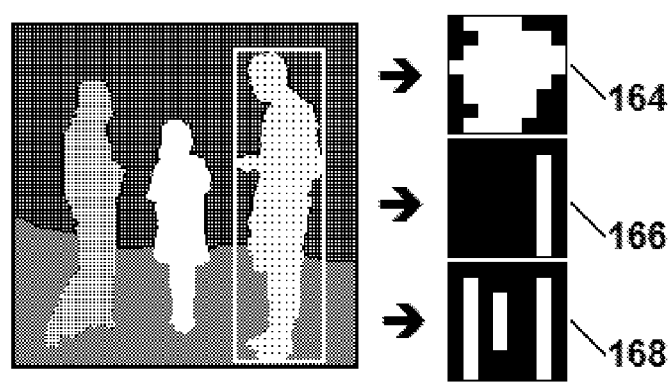
Fig 11
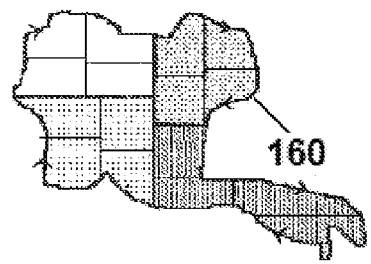

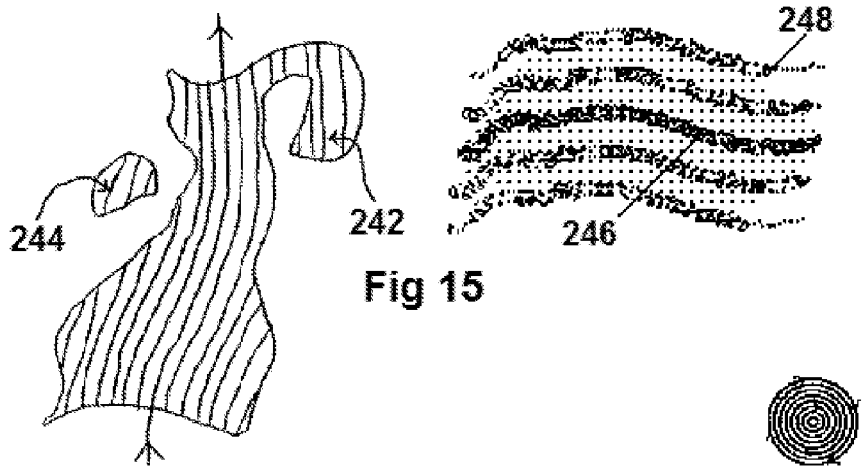
Fig 15
Fig 16
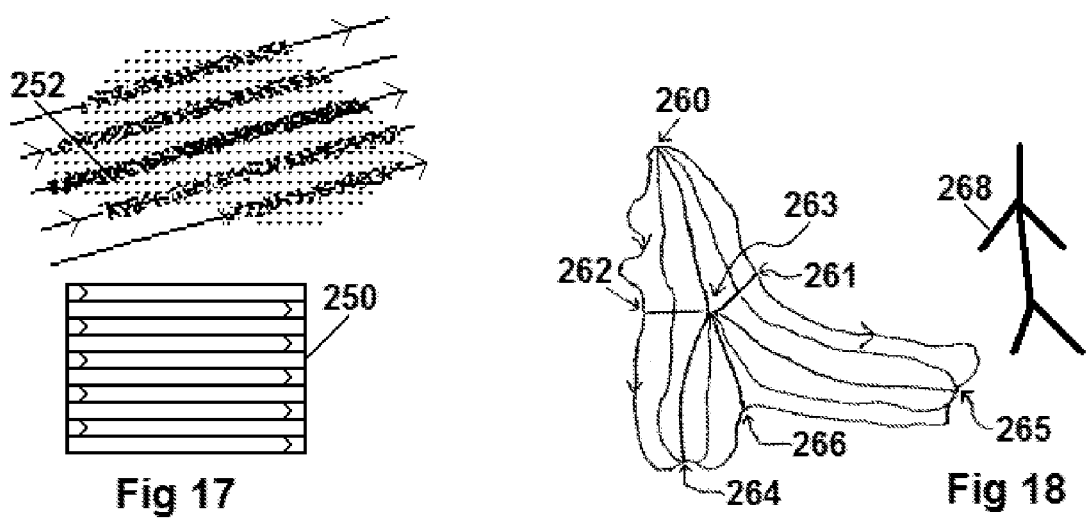
Fig 17
Fig 18
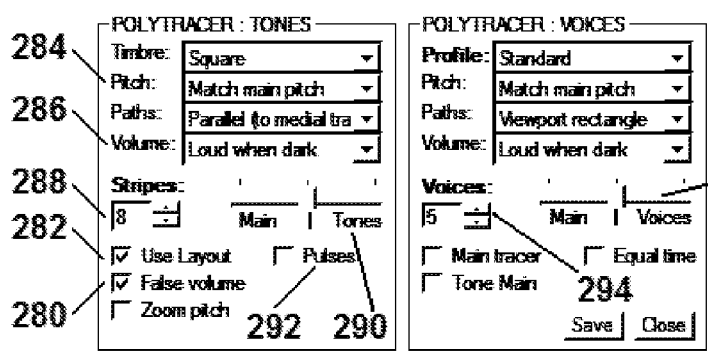
Fig 19 a) Find → b) Guide → c) Effects

Fig 20

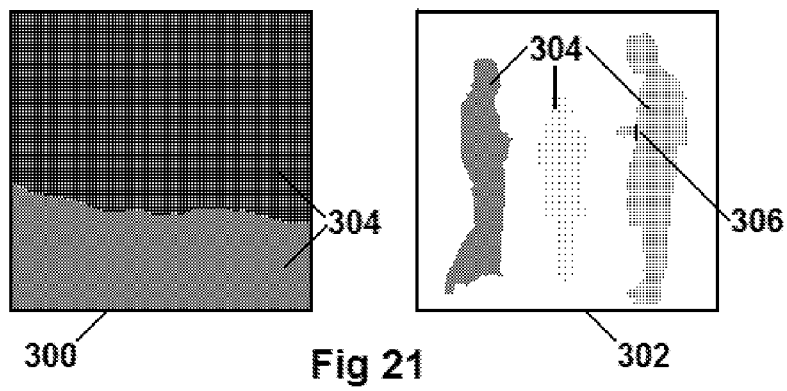

Fig 21

| | Type | Description <<< Standard types are:- T(opview), V(iew), G(roup), O(bject), P(ath), N(ode). | Classification G:letter O:number | RGB Color (Markup color or mask bits, RGB format) | Given best colors | Imp orta nce (%) | Dist ance (m) | Opa city (%) |
|---|---|---|---|---|---|---|---|---|
| | V | MS of group of people | | | | | | 100 |
| | G | Background | A | $00000F | | | | |
| 309 | O | Grass | 1 | $508041 | Gn | 30 | 8 | |
| | O | Bushes | 2 | $204012 | Dg | 30 | 10 | |
| | G | Foreground | B | $000F00 | | | | |
| | O | Woman [Person] | 1 | $80F180 | Lg | 90 | 4 | |
| 308 | O | Girl outline [Person] | 2 | $E0E2E0 | La | 90 | 4 | |
| | O | Man [Person] | 3 | $D0D3A0 | Ln | 90 | 4 | |

|   | A | B | C | D | E | F | G | H | I |
|---|---|---|---|---|---|---|---|---|---|
| 1 |   | Type | X:Min;Max;Grid | Y:Min;Max;Grid | Indicators |   |   |   |   |
| 2 | HFVEinfo | LIN |   | 0;60;10;5 | Y |   |   |   |   |
| 3 | HFVEdata | 20 | 24 | 26 | 29 | 27 | 4 | 4 | 22 |
| 4 | HFVEdata | 44 | 58 | 51 | 59 | 57 | 34 | 34 | 60 |
Fig 30
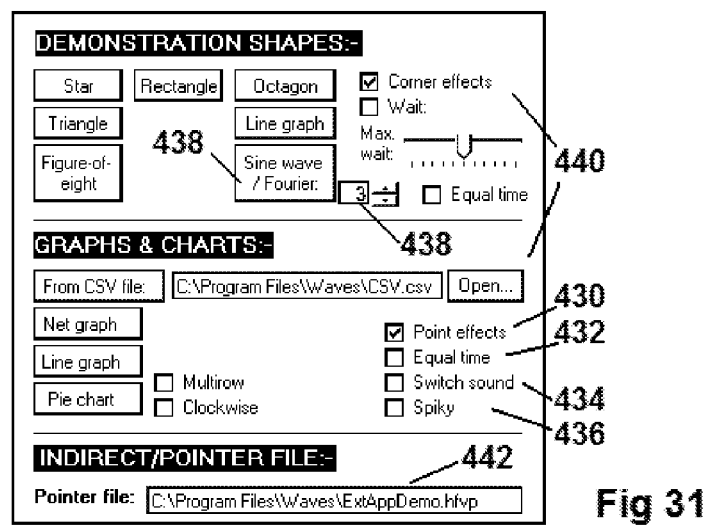
Fig 31
|   | A | B | C | D | E | F |
|---|---|---|---|---|---|---|
| 1 |   | Wave Type | Number of Waves | Minimum | Maximum | Start Phase |
| 2 | HFVEinfo | WAV |   | -1 | 1 | 0 |
| 3 | HFVEwave | SIN | 1 | -0.33 | 0.33 |   |
| 4 | HFVEwave | SIN | 3 | -0.2 | 0.2 |   |
Fig 32
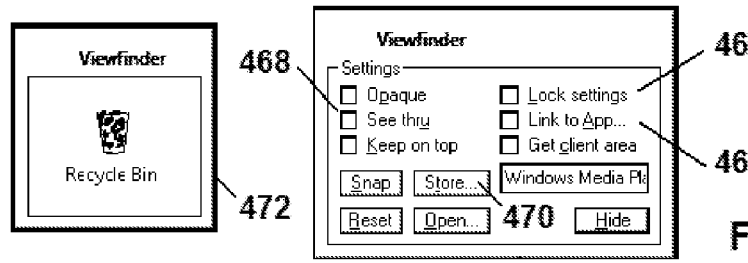
Fig 33

| Dimensions | Apparently-moving effects requiring a period of time to be presented. | Apparently-stationary effects that can be instantaneously and continuously presented. |
|---|---|---|
| 0 | Corners and other point-like features within tracers. | (Center of Item.) |
| "0.5" | "Dot-to-dot"/"join up the dots" representation.  | Corners. 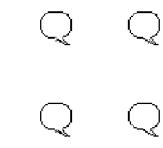 |
| 1 | Line tracers. 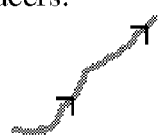 | Line imprints.  |
| "1.5" | Outline tracers. 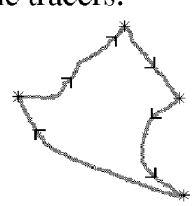 | Outline boundary imprints. 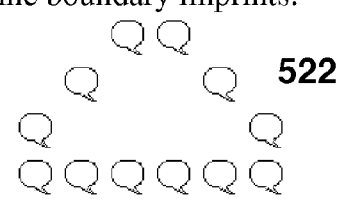 522 |
| 2 | Area "filler" polytracers. 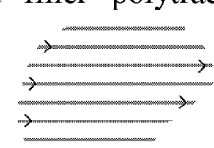 | Area imprints. 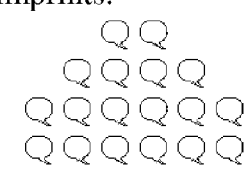 |
| "2.5" | Surface polytracers. 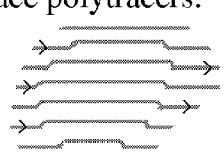 | Surface imprints. 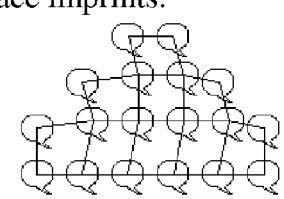 |
| 3 | Volume polytracers. 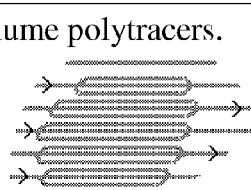 | Volume imprints. 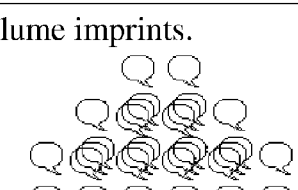 524 |

Fig 35  Effect Components for Presenting Visual Items

SYSTEM FOR PRESENTING VISUAL ITEMS

CROSS-REFERENCE TO RELATED APPLICATIONS

This application contains improvements to the inventions disclosed in the present inventor's U.S. Pat. No. 8,239,032 entitled "Audiotactile Vision Substitution System", and in the present inventor's published UK Pat. Appl. No. GB1101732.4 entitled "Improved Audiotactile Vision System".

SEQUENCE LISTING OR PROGRAM

Not Applicable

FEDERALLY SPONSORED RESEARCH

Not Applicable

BACKGROUND

1. Field of the Invention

This invention relates to vision substitution systems, specifically to a system method and apparatus for presenting audio and tactile representations of visual items.

2. Description of Related Art

Devices have previously been invented that substitute for aspects of vision with another sense, particularly hearing and touch, and can be useful to blind and partially sighted people, and to those temporarily unable to see, for example aircraft pilots blinded by smoke. Fournier d'Albe's 1912 Exploring Optophone highlighted the edges of objects through tone sounds, and his Reading Optophone (described in U.S. Pat. No. 1,350,954) presented the shapes of letters by scanning along lines of type with a column of five spots of light, the reflected light from each spot controlling the volume of a different musical note, producing a characteristic series of chords for each letter. His book "The Moon Element" states "Incidental uses of the optophone consist in the examination of pictures, photographs, maps, and dress materials". The invention described in U.S. Pat. No. 5,097,326 and "The vOICe" vision substitution system present live images via sound. U.S. Pat. No. 6,963,656 describes using musical sequences to convey features of images. Similar approaches have been used to "sonify" the lines on a two-dimensional line graph. Typically a left-to-right column scan is performed, height is mapped to pitch, and intensity to volume (either dark- or light-sounding).

In the tactile modality, several inventions have allowed visual features to be presented via touch, usually via an array of tactile actuators (typically vibro-tactile or electro-tactile) acting on parts of the user's body, for example Telesensory's™ Optacon™ finger-read vibro-tactile array; U.S. Pat. No. 6,430,450 and Wicab's™ Brainport™ tongue-placed electro-tactile display; U.S. Pat. Appl. No. 2010/0151426 and EyePlusPlus's™ Forehead Sensory Recognition System electro-tactile display; electromechanical tactile abdomen displays; and KGS's™ 8 by 8/64-dot tactile display. The present applicant's U.S. Pat. No. 8,239,032 describes a palm-read tactile display. Furthermore, standard programmable braille displays 34 FIG. 2 can be configured to act as displays of simple visual representations.

The present applicant's U.S. Pat. No. 8,239,032 entitled "Audiotactile Vision Substitution System" discloses a system for presenting one or several apparently-moving speech sounds and corresponding tactile effects (referred to as "tracers") that follow the paths of the shapes of lineal features present in visual representations (i.e. "trace out the shapes"), at the same time as presenting information related to the shapes, with distinct audiotactile indicator effects highlighting corners within the shapes. The present applicant's published UK Pat. Appl. GB1101732.4 entitled "Improved Audiotactile Vision System" discloses using buzzing "tracers" (known as "buzz tracks") to improve the perception of shapes. The specification and drawings of U.S. Pat. No. 8,239,032 and UK Pat. Appl. No. GB1101732.4 are incorporated by reference, and copies are obtainable from the Internet and elsewhere. Parts of the present applicant's previous inventions are described in this specification.

The methods described in the present applicant's earlier patents are effective for presenting items that can be summarized via lineal effects (for example via outlines of items 140 FIG. 9, or via a "symbolic tracer paths" 146). To convey the two-dimensional arrangement of the content of an item the system used "Layouts" 42 FIGS. 5 & 180 FIG. 13, which categorically presented the locations of an item's material, via speech sounds 43, braille 44, or coded Morse-like taps 45. ("Items" can be for example objects within a visual representation; regular regions of a visual representation; abstract shapes; etc.) Whereas the earlier inventions described tactile methods used to convey the layout of items via tactile displays for example via braille (or via the "Optacon" or other tactile arrays), in the audio modality the layout was conveyed via coded speech sounds that semantically described the arrangement of matter. Additionally, sets of apparently-moving multiple tracer speech or non-speech "poly/racers" FIGS. 14 to 18 could produce optophone-like effects that helped convey the nature and extent of the material within an item—a set of tracers, arranged approximately in a line, move approximately perpendicular to the line, to "sweep out" item areas, in a similar manner to an optophone. (For solid "blob" shapes the extent is to some degree also conveyed via the locations presented via an "outline" or "medial" tracer.)

SUMMARY OF THE INVENTION

In accordance with preferred embodiments a method and apparatus for presenting audio and/or tactile representations of visual items includes processing each of said visual items into the form of a group of stationary property-presenting energetic effects (for example a group of speech-like sounds), and outputting said effects to audio and/or tactile displays; optionally providing facilities for identifying and presenting prominent colors (and other properties) and their distribution.

COMPARISON OF PRESENT INVENTION TO PRIOR ART

The present invention is an improvement of the earlier inventions, and discloses an additional method for rapidly summarizing the layout/arrangement of visual items (e.g. found within visual representations) by using groups of simultaneously-presented apparently-stationary energetic effects (referred to as "Imprint" effects) to convey the spatial arrangement of the content of items, which may be a more speedy and intuitive method—the groups of energetic effects can rapidly present the extent of the item being represented (though certain such effects, for example speech-like "Imprint" effects, may require a longer period of time to convey the speech content).

While the earlier approaches are effective to a degree, the approach disclosed by the present invention may be perceived by the user in a more rapid and intuitive manner, by using several simultaneously-presented apparently-stationary speech-like or other energetic effects to convey the extent of an item.

When in the form of spoken real or coded words, Imprints are particularly effective, as the dispersed effect of the range of pitches and stereo locations resemble the sounds of a crowd of people speaking in unison, "stamping out" or "printing" the item and its properties onto the "sound display" 5 FIG. 2. The "spread" of the voices (or other effects) conveys the size and approximate shape, with the pitch range and left-right stereophonic effects conveying the approximate location.

The approach can be used in conjunction with the previously-disclosed methods, and it has application to previously-described applications, for example presenting data that can be presented visually; conveying the distribution of color within a scene; or tracking particular items such as objects of specific colors, people's faces, or areas of movement.

One aspect of the present invention is identifying and presenting prominent colors (and other visual properties), and their arrangement/distribution, within visual representations. The applicant's earlier patents describe how more than one color can be presented, and the layout of such colors within an area can be presented. In order to present the layout of colors, it is necessary to determine a limited number of colors that helpfully describe the colors present within the visual representations, and then the distribution of such colors can be presented. The earlier disclosures suggest using a "least error" approach to deciding which colors to present. This application describes an improved method of determining such limited number of colors.

BRIEF DESCRIPTION OF THE DRAWINGS

Note:— a) FIGS. 5 to 33 are prior art and include matter disclosed in UK Pat. Appl. No. GB1101732.4.

b) Drawings of entities may include arrow-like markings to emphasize their order and movement, but the direction of movement may be different to that indicated.

c) Figs may include treble and bass clef symbols to pictorially signify musical change in pitch with height. Though audio effects may commonly use such mappings, other mappings may be used instead.

Example embodiments of the invention will be described with reference to the accompanying drawings in which:—

FIG. 1 conceptually illustrates processing visual items into groups of energetic audiotactile effects, and summarizes the method and apparatus.

FIG. 2 conceptually illustrates the system, and shows the present invention used with prior art "tracer" and "pillar" effects.

FIG. 3 shows a low-cost embodiment, which uses only standard hardware components.

FIG. 4 shows an example main graphical user interface (GUI) for an embodiment.

FIG. 5 recaps how certain image features can be presented via other senses (prior art).

FIG. 6 illustrates how two shapes that may be confused, and how volume profiling can be applied to produce "pillar" (or "layer") effects (prior art).

FIG. 7 shows further GUI controls used for the "buzz track" feature (prior art).

Figure 8:
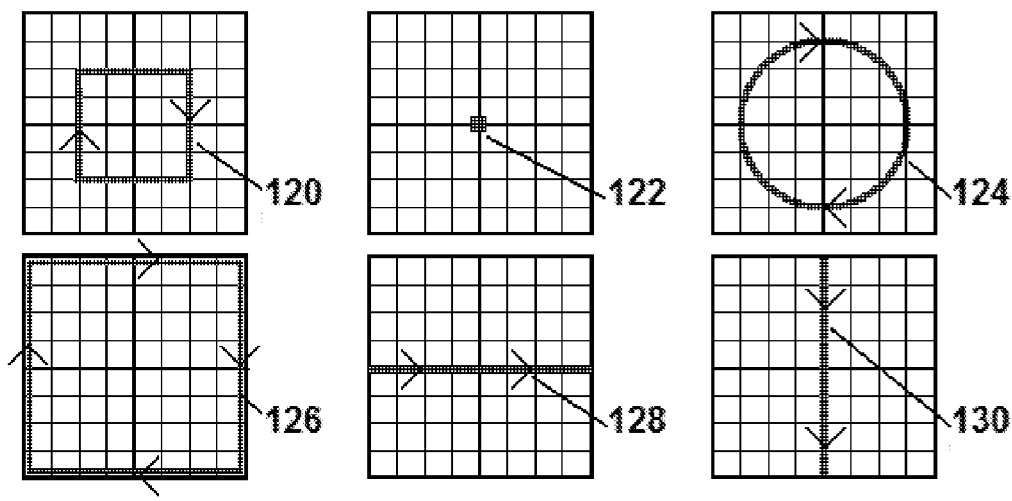

FIG. 8 illustrates the paths that region tracers can follow when presenting region layouts (prior art).

Figure 9:
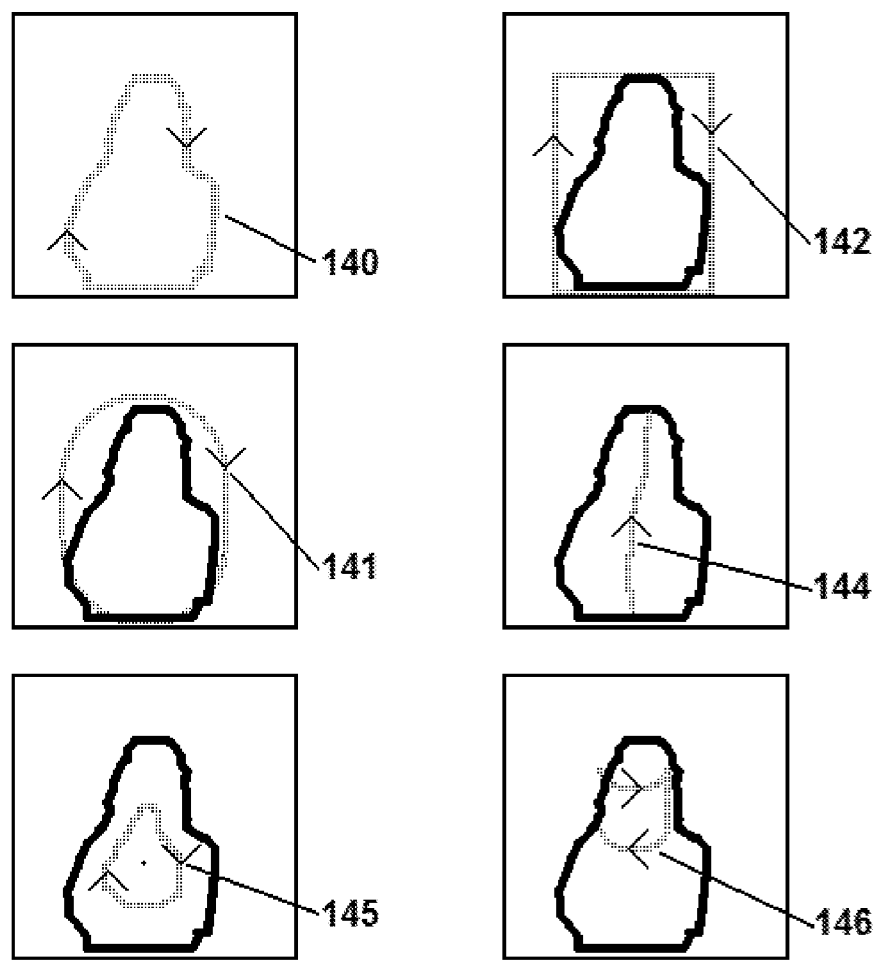

FIG. 9 shows examples the different types of object tracer paths, including outlines, frame, medial and symbolic object tracer paths (prior art).

FIG. 10 shows several examples of symbolic object tracer paths (prior art).

FIG. 11 shows several examples of "object-related layouts"; and how the "segments" and "sub-panels" of the layout of an irregularly shaped object can be shaped to each convey an equal area (prior art).

Figure 12:
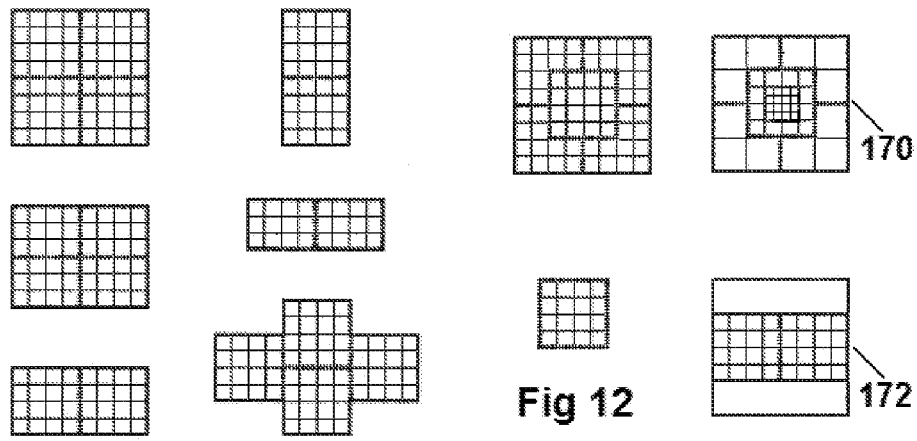

FIG. 12 illustrates examples of how "region layouts" can be configured from "panels" of "segments" (prior art).

Figure 13:
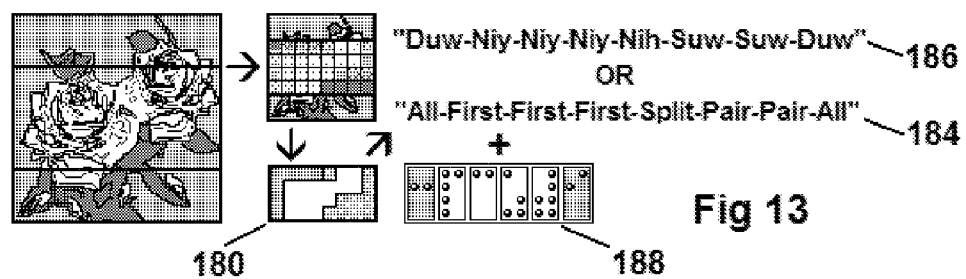

FIG. 13 shows how an 8 by 4 layout can be presented via real or coded words, and via braille (prior art).

Figure 14:
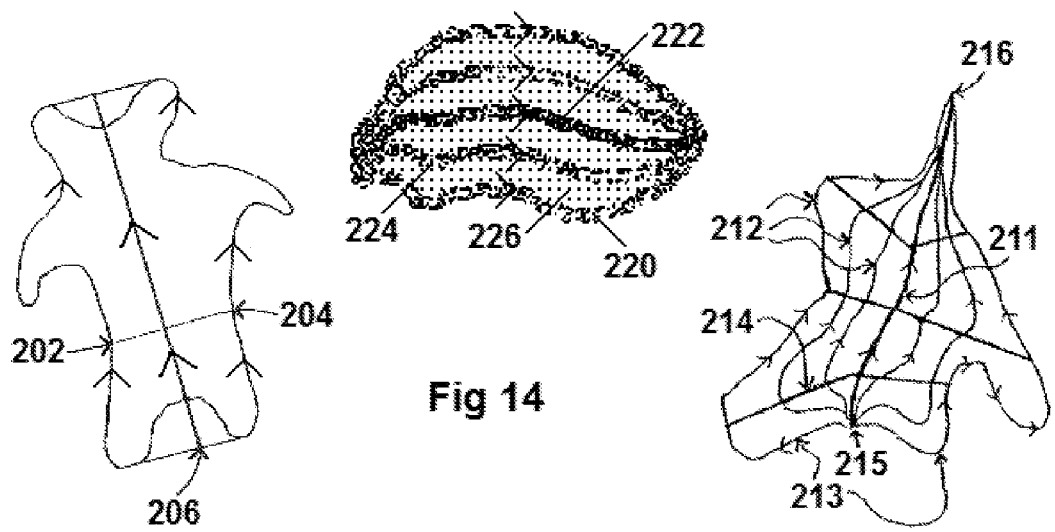

FIG. 14 illustrates "contoured polytracers" (prior art).

FIG. 15 illustrates "parallel polytracers" (prior art).

FIG. 16 illustrates polytracers based on "circuit medials" (prior art).

FIG. 17 illustrates "rectangular polytracers" (prior art).

FIG. 18 illustrates "branching medial" tracers and polytracers (prior art).

FIG. 19 shows the GUI controls used for the "polytracer" feature (prior art).

FIG. 20 conceptually illustrates the processing of live images into a "guide" prior to presentation (prior art).

FIG. 21 shows how an image can be marked with "objects" for presenting (prior art).

FIG. 22 shows an example section of a table that specifies the objects and "markup" colors etc. for a pre-defined guide (prior art).

Figure 23:
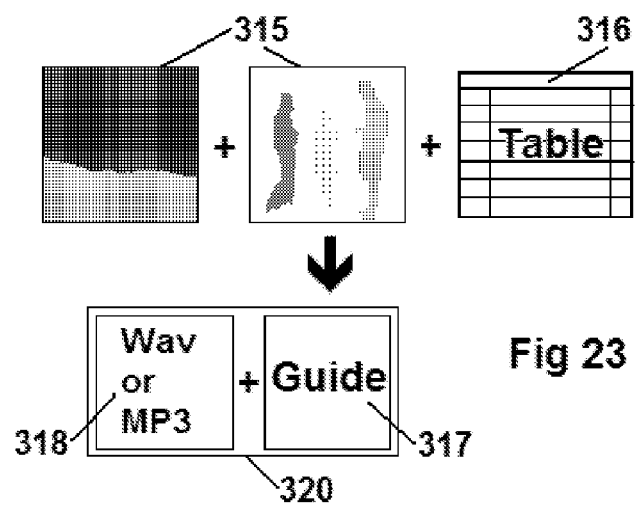

FIG. 23 conceptually illustrates how bitmaps and the text file table are combined to produce a guide, which can be bound to the end of a media file (prior art).

Figure 24:
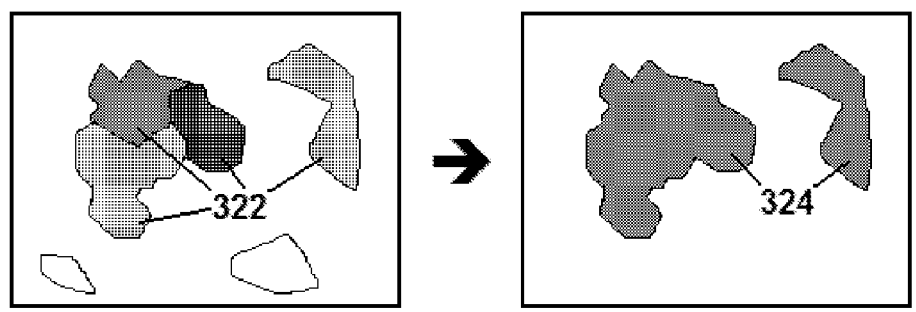

FIG. 24 shows how several shades can be processed into a single "blob" (prior art).

Figure 25:
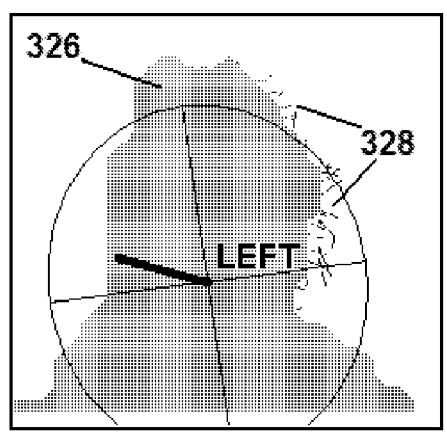

FIG. 25 illustrates detected area of motion (prior art).

Figure 26:
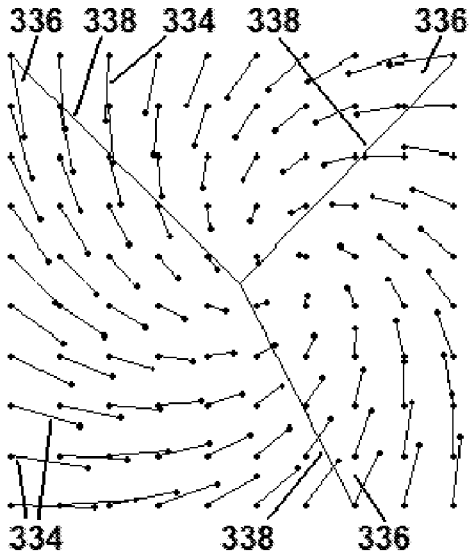

FIG. 26 shows how flow lines can be used to detect direction of movement (prior art).

Figure 27:
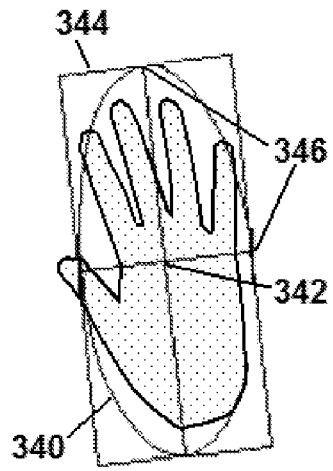

FIG. 27 illustrates "Camshift" tracking (prior art).

Figure 28:
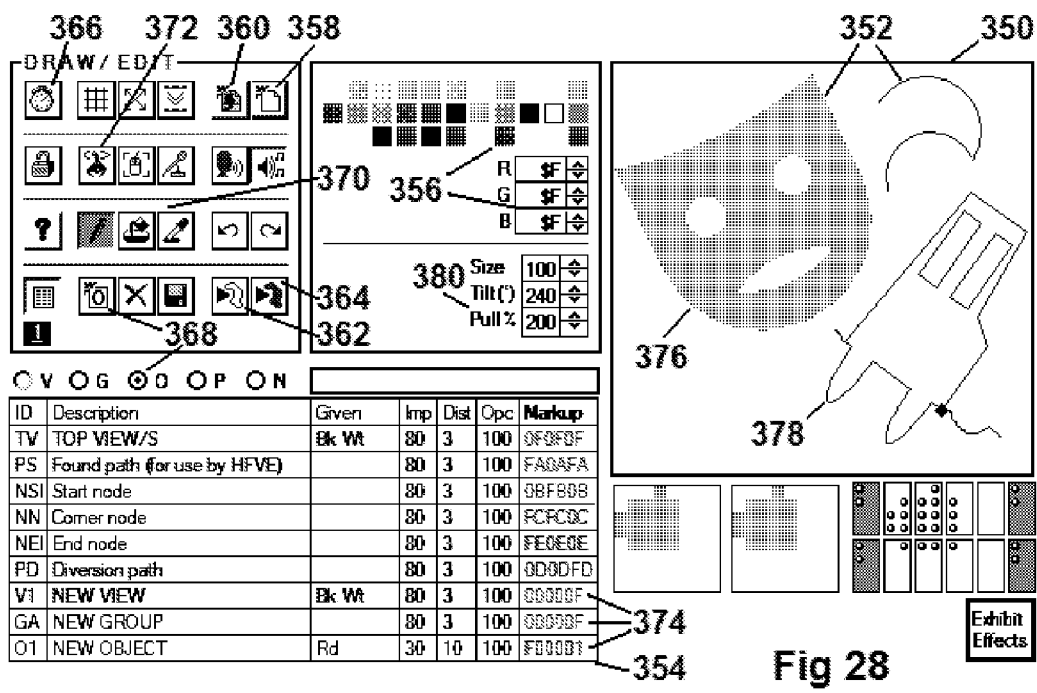

FIG. 28 shows a GUI used for marking up images and providing an accessible drawing facility (prior art).

Figure 29:
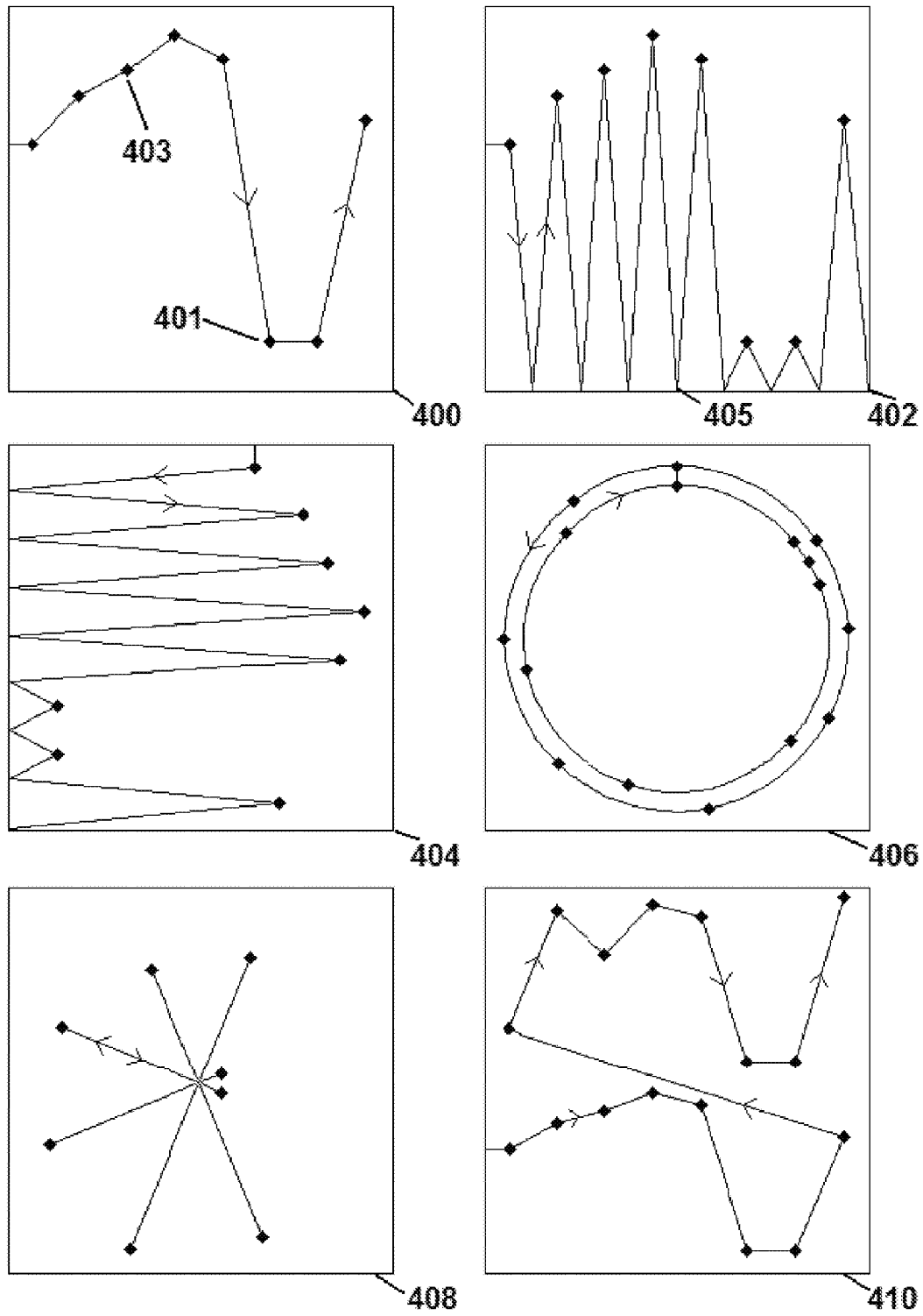

FIG. 29 shows example paths and indicator effect points of audiotactile graphs and charts (prior art).

FIG. 30 shows a section of a spreadsheet for controlling presented audiotactile line graphs (prior art).

FIG. 31 shows example GUI controls for presenting shapes, graphs, charts and waveforms (prior art).

FIG. 32 shows a spreadsheet for controlling a presented audiotactile waveform that illustrates a Fourier series (prior art).

FIG. 33 shows a "viewfinder" facility, which is used to "snap" sections of a computer "desktop" (prior art).

Figure 34:
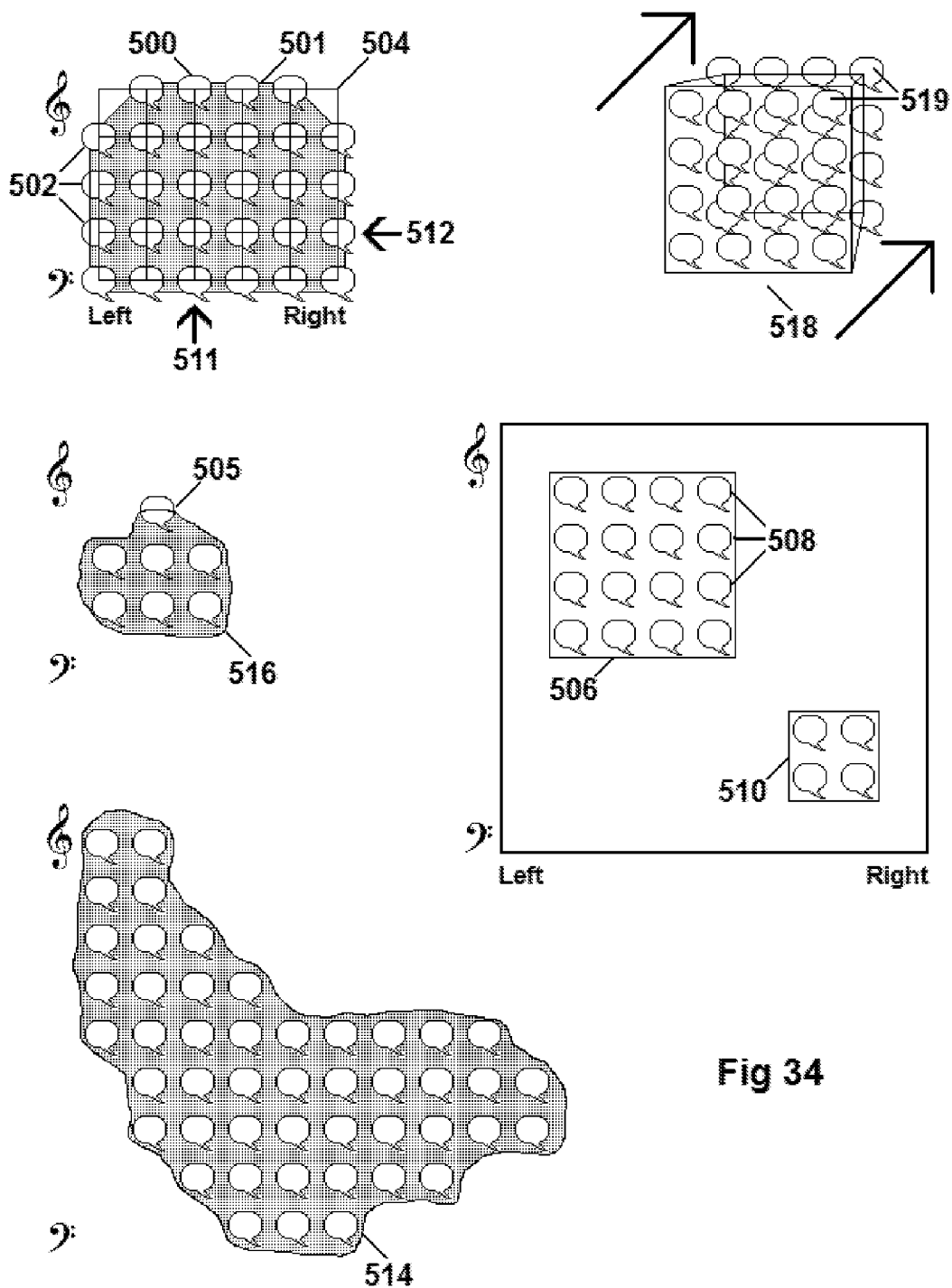

FIG. 34 illustrates several configurations of "Imprint" effects.

FIG. 35 shows a table that categorizes tracer and Imprint effects by their dimensions.

Figure 36:
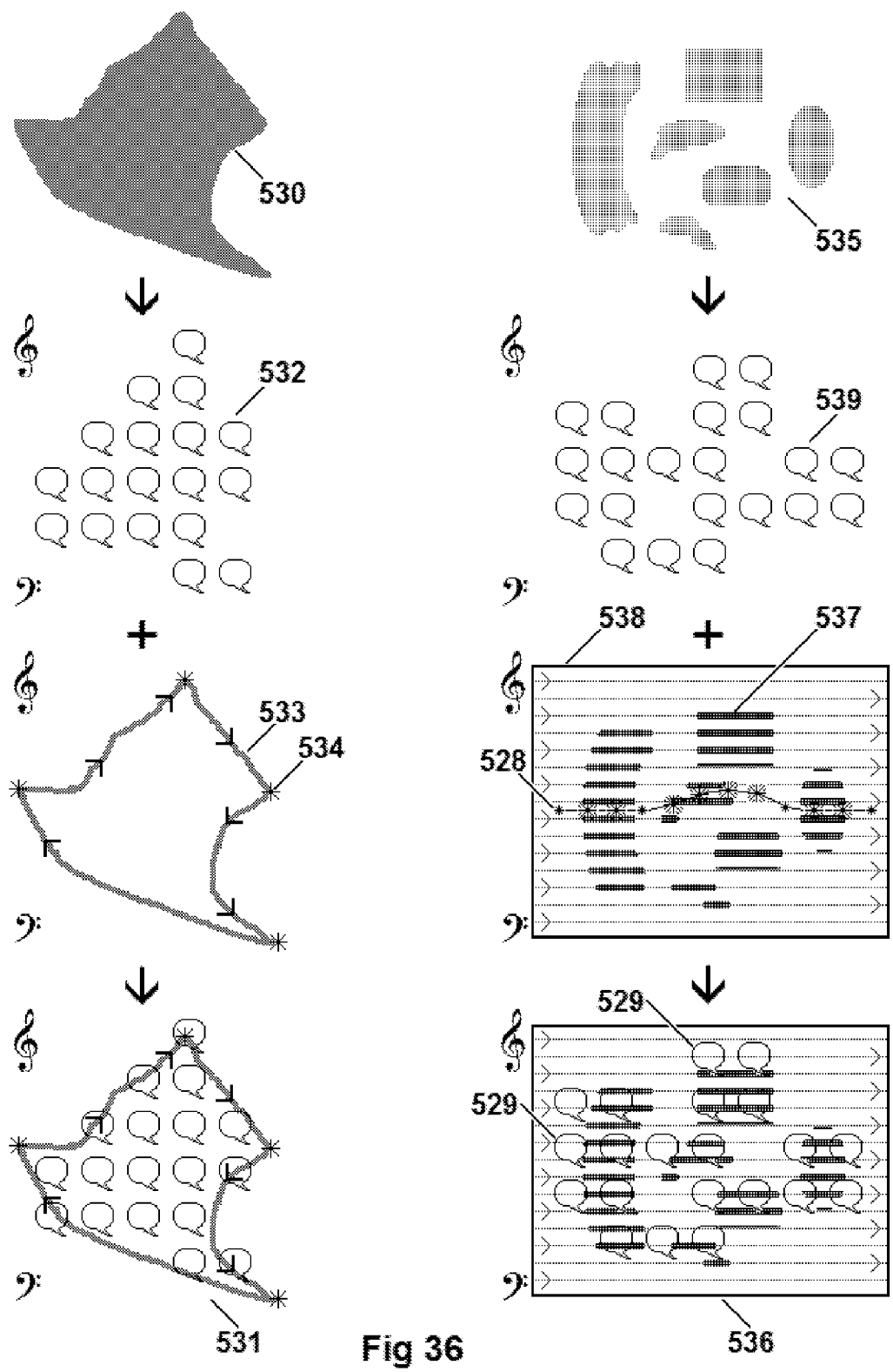

FIG. 36 shows how Imprints for contiguous and fragmented items may be supported by tracers and polytracers.

Figure 37:
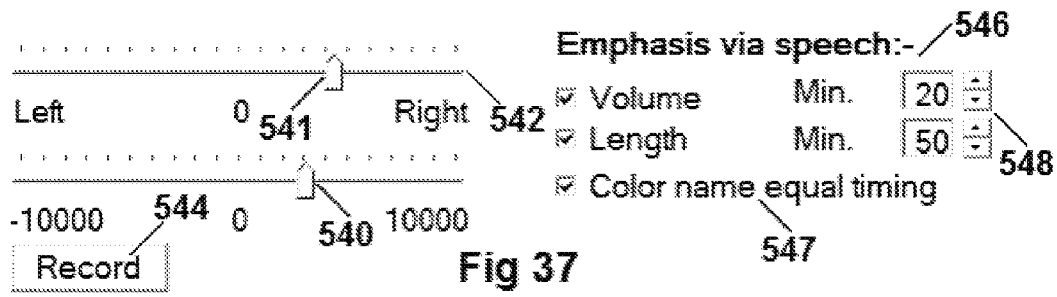

FIG. 37 shows example GUI controls for setting the stereophonic locating effects accurately, and for controlling speech properties.

Figure 38:
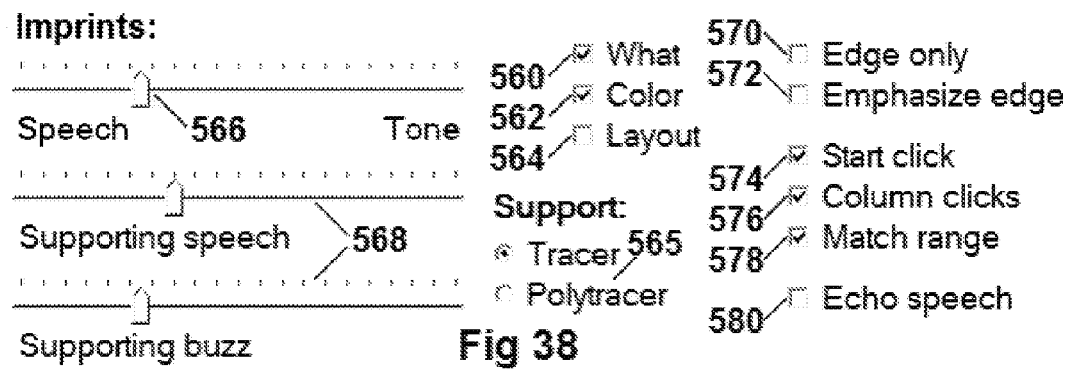

FIG. 38 shows example GUI controls for setting certain Imprint effects.

Figure 39:
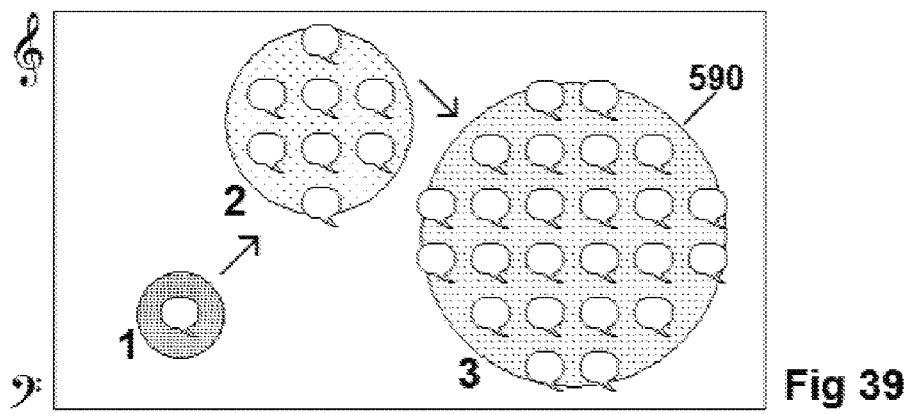

FIG. 39 shows how an example bubble chart can be presented via Imprint effects.

Figure 40:
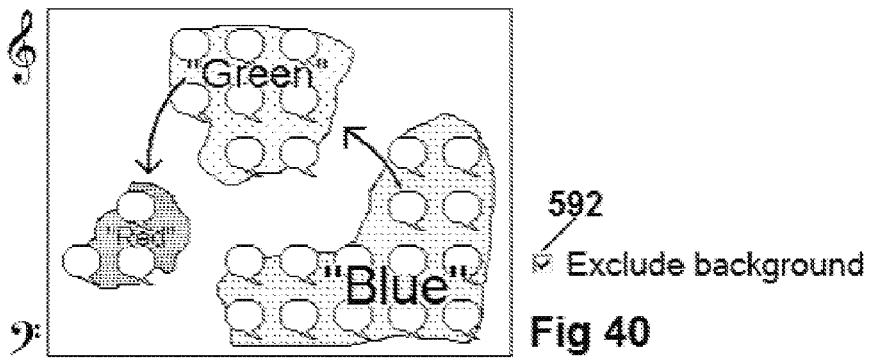

FIG. 40 shows how regions of particular color categories can be presented via Imprint effects.

Figure 41:
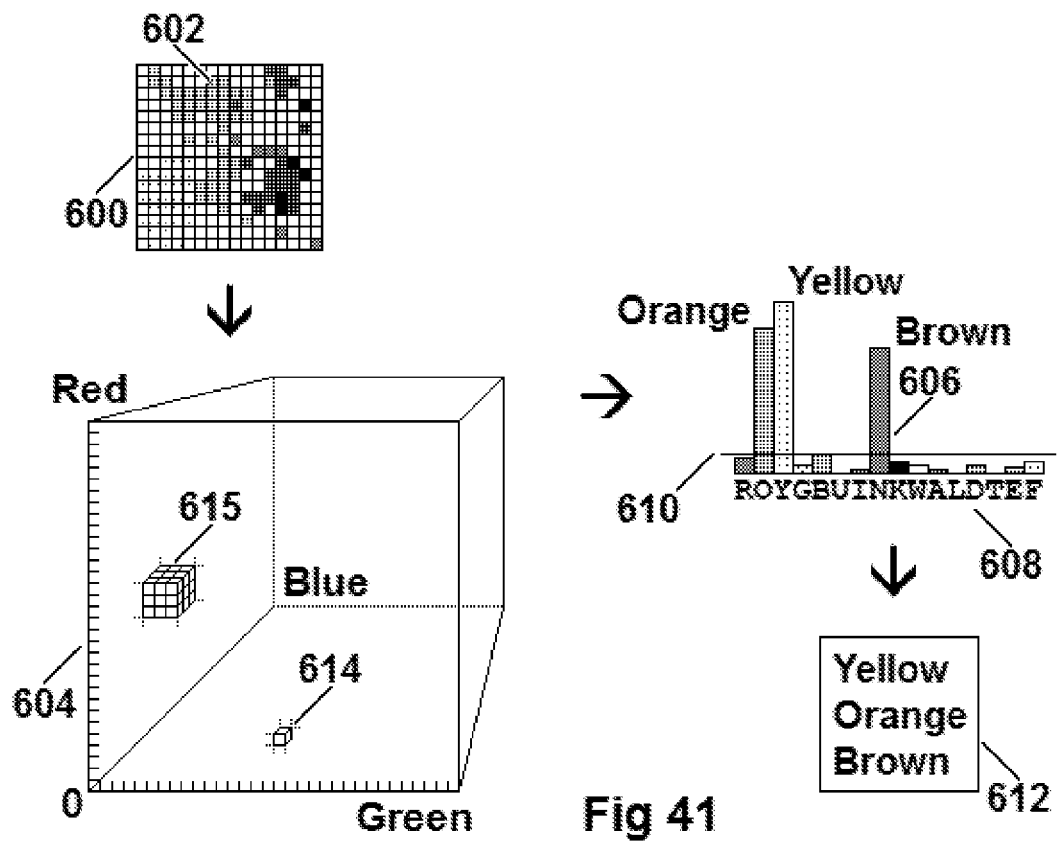

FIG. 41 illustrates a method of selecting a limited number of colors to describe an image of many colors.

Figure 42:
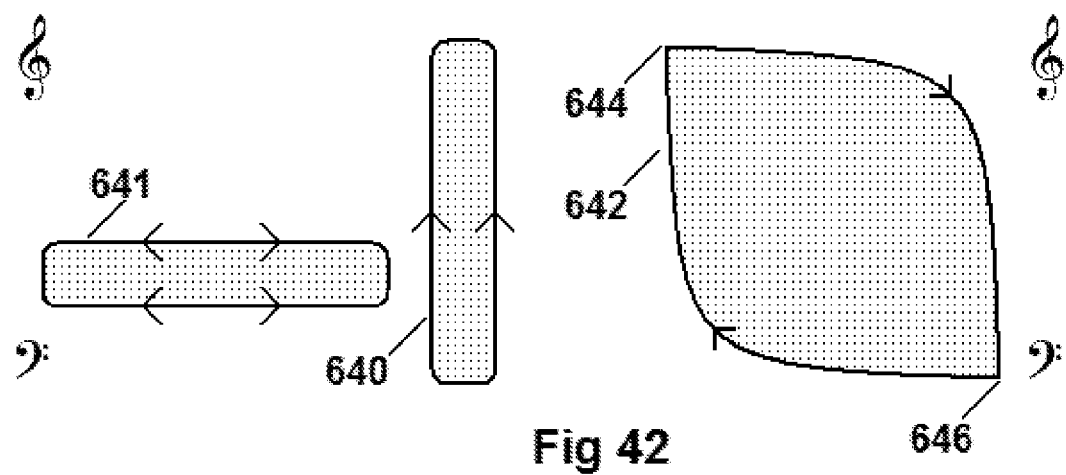

FIG. 42 illustrates tracer start points and direction of travel.

Figure 43:
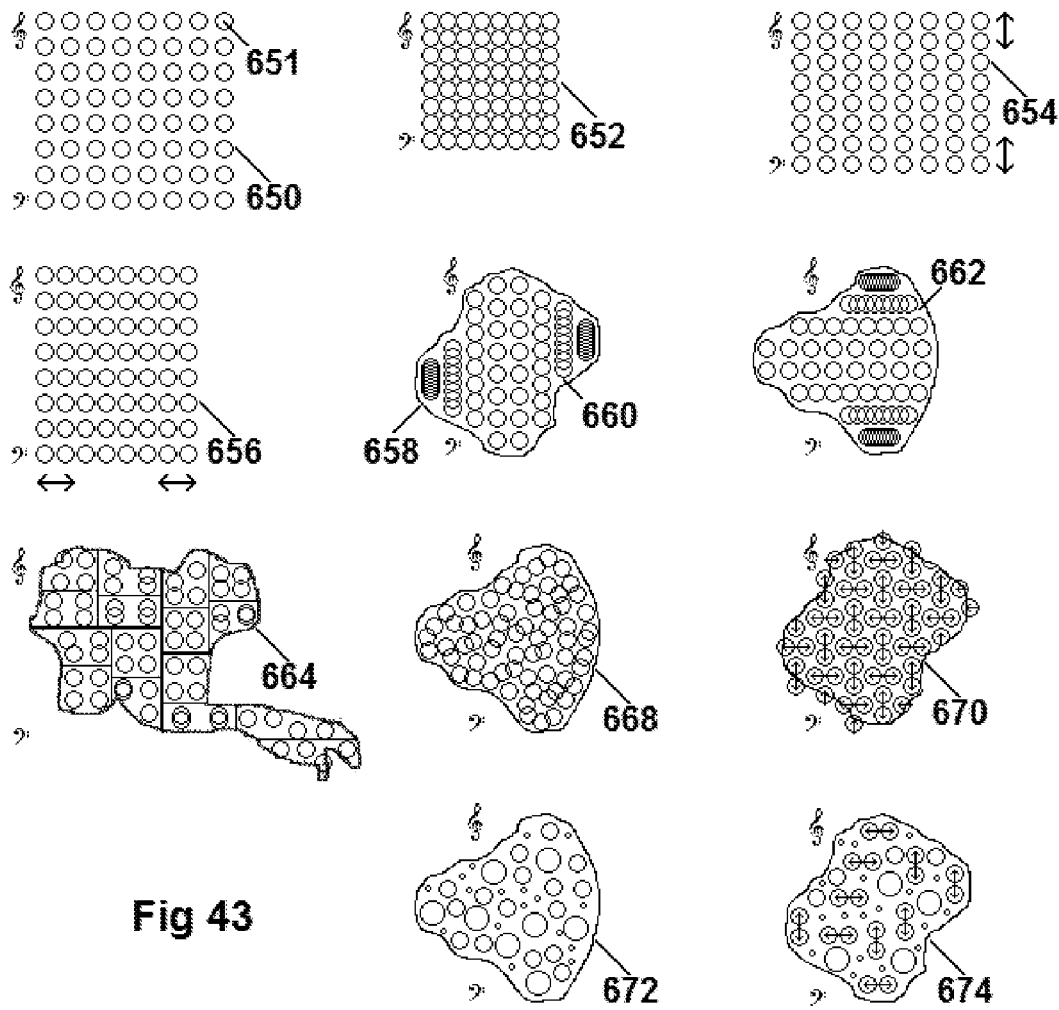

FIG. 43 shows several examples of Imprint effect configurations.

Figure 44:
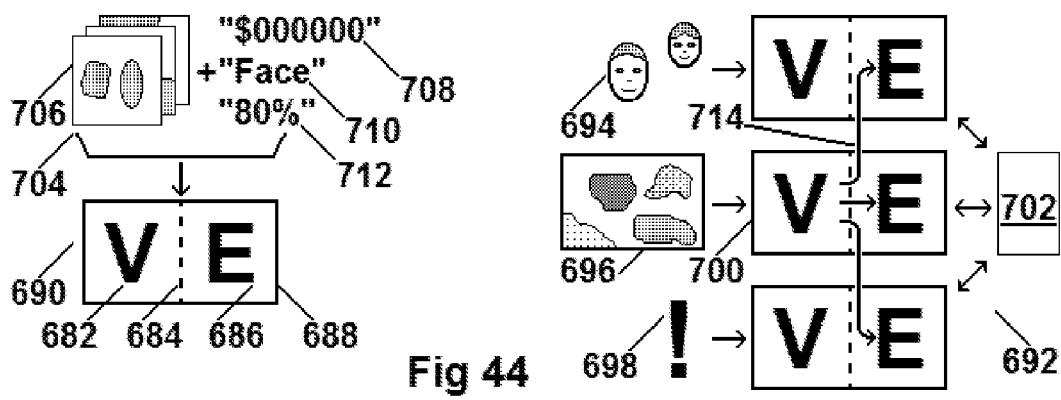

FIG. 44 conceptually illustrates one example system architecture.

OVERVIEW OF SYSTEM (INCLUDING PRIOR ART)

The embodiments of the present invention improve on the highlighted prior art by providing an additional method for rapidly and intuitively summarizing items within visual representations, by using groups of apparently-stationary simultaneously-presented energetic effects (referred to as "Imprints") to convey the spatial arrangement/distribution of the content of the items. The method is effective when the groups of apparently-stationary effects include speech sounds, and can be used in conjunction with the previously-disclosed methods, and can, for example, be used to act as an enhanced color identifier.

This description will summarize the system, then describe in detail the improvements that comprise the present invention.

This description does not repeat all of the material contained in U.S. Pat. No. 8,239,032 and UK Pat. Appl. No. GB1101732.4, which describe construction methods in detail. This description should be read in conjunction with the description and drawings of U.S. Pat. No. 8,239,032 and UK Pat. Appl. No. GB1101732.4, and the features and content applied where appropriate to this specification (with appropriate modifications).

OVERVIEW AND DEFINITIONS (INCLUDING PRIOR ART)

The system aims to simulate the way that sighted people perceive visual features, and the approach is conceptually illustrated in FIGS. 2 & 5 (which include prior art).

A "viewzone" is a (usually rectangular) section 2 (or whole 40 & 41) of the image 10 & 40 being conveyed. The viewzone can be moved to particular areas of an image and re-sized, and the spatial resolution can be changed. Viewzones are usually square or rectangular, but could alternatively be circular, elliptical, or other shapes.

Entities/visual items 4 within the viewzone are presented by the system via audiotactile effects.

Example entities conveyed can be "Objects" 4 FIG. 2 or "Regions" 41 FIG. 5 (other entity types can also be presented).

"Objects" are particular entities, for example "blobs" 92 FIG. 4, identified objects 23 FIG. 1, areas of motion FIG. 25, etc., that are identified within the viewzone.

"Regions" are regular rectangular regions (covering the viewzone 41) for which the system conveys systematic descriptions of the properties, and arrangement of the properties. (The difference between viewzones and Regions is that a viewzone defines the area of a scene from which Objects and/or Regions are extracted, while a Region presents the content, and arrangement of content, within a viewzone in a systematic manner.)

The audiotactile effects presented by the system are apparently-moving effects 6, 7 & 9, apparently-stationary Imprint effects 1, and other effects.

The apparently-moving audiotactile effects 6, 7 & 9 FIG. 2, 47 FIG. 5 follow ("trace out") paths (for example the paths of the perimeters of visual items) and are referred to as "tracers". The corners 8 & 48 and other point-like features (such as the data points 401 FIG. 29 on a line graph 400) within tracers can be emphasized via distinct effects (referred to as "dot effects"). The shape can be clarified by using a separate tracer of particular timbre (for example of "buzzing" effects), which can include distinct location- and direction-conveying effects. This is referred to as a "buzz track".

For Objects, the tracers follow paths that relate to the paths of lineal features of the objects, for example their perimeter/outline 140 FIG. 9, medial line 144 & 145 or framing rectangle 142. Alternatively, a "symbolic" tracer path 146 can present lines and corners that symbolize the classification of particular objects. For Regions, the tracers follow paths FIG. 8 that systematically cover the area of the viewzone, and are arranged so that they are generally moving over the part of the viewzone whose properties are being presented at any moment.

Multiple moving tracers can be used to present the detail of an area in an intuitive manner. They are referred to as "polytracers" and are described in section 4.3 below.

Corners and other point-like ("dimensionless") features 8 & 48 are represented by short audiotactile indicator effects (known to as "dot effects"). Indicator effects that comprise speed reductions to tracers other than completely stopping can be provided. Furthermore the speed at which a tracer stops or slows down, and restarts, can be tapered. The tracer could speed up for the indicator effect. The indicator effects can be symbolized by a momentary lack of audiotactile tracer effects; or by the change in nature of the tracer effects being used to present lineal features, so that said change in the nature highlights the existence of a point-like feature at the point of change of nature.

The indicator effects can be presented on other devices and in different modalities to the tracer.

The corner etc. indicator effects described above can additionally be applied to linear features presented using standard optophone-style image mapping; or when "polytracers" are being presented (see section 4.3 below).

Continuous "buzzing" effects can improve the perception of the tracer shape. This is described further in section 4.1 below.

In the audio modality, for both tracing out shapes and/or presenting stationary "Imprints", the location of items within the image being presented is generally conveyed by a) the frequency of the sounds, b) the stereophonic positioning effects, and c) the order and nature of the presented sounds. The frequency represents the vertical position within the image, and the left-right stereophonic positioning represents the horizontal position within the image, resulting in an audio "sound display" effect 5 FIG. 2. The change in frequency occurring as the vertical position changes can be linear or otherwise, but the preferred approach is for the frequency to change logarithmically as the vertical position changes, in a similar manner to the way that the frequencies of notes in a musical scale change. Higher frequencies are used for the higher parts of the image, and lower frequencies are used for the lower parts of the image. This would appear to be an "intuitive" approach, as similar conventions have been independently devised for use in other inventions. The frequency for the base, and for the top, of the presented area, and whether logarithmic or linear change should occur with height, can be user controlled, but would typically be set to a range of about one musical octave, with musical change with height, so that the frequency for any intermediate height can be calculated with linear or logarithmic (musical) change occurring through the given frequency range.

In the tactile modality', the position and movement of the handle 14 FIG. 2 of a force-feedback joystick 28 (controlled and moved by the system, pushing and pulling the user's hand and arm) gives proprioceptive and kinesthetic cues of shape, location, and movement; and apparently-moving 7 or apparently-stationary 17 effects presented on a tactile array 15 can trace out specific shapes 7 or present "Imprint" effects 17 respectively. (Locations can also be "told" via braille cells 34.) Tactile vibration effects of frequencies related to the frequencies of the audio effects can be presented on the handle 14 of the force-feedback joystick 28, and be a property of the effects presented on the tactile array elements 11 FIG. 2, while they are tracing out shapes and/or presenting "Imprints".

"Imprint" effects are composed of several apparently-stationary effects, for example speech sounds 1 FIG. 2, that rapidly and intuitively convey the arrangement of material that comprise items, and are described in detail in section 3 below. Imprint effects generally follow similar visual mapping conventions as are used for tracers i.e. horizontal position is mapped to left-right stereophonic positioning effects (for audio effects); vertical position is mapped to frequency for both audio and tactile effects; and overall 2-dimensional (or 3-dimensional) spatial locations are mapped to the spatial locations of the sound effects, and to the physical and/or tactile effect locations, for audio and tactile effects respectively; as conceptually illustrated in FIG. 1. (Imprints are described detail in section 3 below.)

Separate effects can present visual properties of the items (whether objects or regions), such as colors or other properties.

The volume of the effects (e.g. Imprint effects) can present additional information via volume changes—for example an audio "flutter" to convey the "texture" of an area.

"Layouts" are effects that convey the spatial arrangement of properties of entities (whether Objects or Regions) in an organized manner. Layouts can be "Object-related Layouts", or "Region Layouts". ("Layouts", "Panels", and "Segments" are described in section 4.2 below.)

Object-related layouts can convey the arrangements of properties within the object, or the location of the object within the viewzone, and other arrangements.

Properties such as color, layouts, and the nature of the item ("whatness") are presented via speech, braille, tactile impulses, and other audiotactile effects FIG. 2 & FIG. 5. They can be displayed as a part of an apparently-moving tracer 6 (e.g. moving speech sounds), as apparently-stationary "Imprint" effects 1, or be presented separately (e.g. on a braille display 34). The speech sounds can be words of a natural language, or coded, for example by using a shortened local language format (e.g. "boo-wuy" or "b-uy" for "blue and white" 26), or by using a coded format that uses syllables that are found in most languages.

The "Pace" 62 FIG. 4 is a user-controlled period of time that gives the time allowed for conveying the visual items before the next image is processed, and this may have an impact on how much visual information can be presented.

Discussion

In the tactile modality, tracer location and movement can be presented via force-feedback devices such as joysticks that move/pull the user's hand and arm along a path 9 FIGS. 2 & 39 FIG. 5, or on more specialized apparatus such as an Optacon™, Brainport™, Forehead Sensory Recognition System, or other tactile array 15 FIG. 2. "Imprints" 1 FIG. 2 (described in detail in section 3 below) can also be presented on the same audio apparatus 24 and tactile array apparatus 15, and intuitively and rapidly convey the size and location of the items In both audio and tactile modalities, the tracers and Imprints can describe the shape, size and location (and optionally the identity) of the Objects or Regions. As the system outputs both audio and tactile effects, users can choose which modality to use; or both modalities can be used simultaneously.

In the earlier patents, several arrangements of "tracer" and point-like "dot" effects were described for presenting the form of an item. With the present addition of Imprint effects, the available set of effects can be categorized in a more structured manner via their differing numbers of dimensions, as illustrated by the table shown in FIG. 35 (which includes prior art methods). (FIG. 35 shows the extent and movement of the effects, but does not describe the physical nature of the effects, which can be audio, tactile, categorical, non-categorical, etc., in the manner already described.)

The effect types can be broadly divided between "time-conveyed" apparently-moving effects (requiring a period of time to "trace out" or "sweep out" the form being represented) (e.g. "tracers" and "polytracers") and "continuous" apparently-stationary effects (that can instantaneously and continuously convey the space being represented) (e.g. Imprint effects).

The "0.5", "1.5" and "2.5" dimension entries in FIG. 35 present the boundary of an item. The "Surface" and "Volume" effects are produced when the area tracers or area Imprints are representing the visible outer surface or total volume respectively of an item. The corresponding sounds are modified to be located in 3-dimensional "sound space", for example by modeling the presented locations to include a "distance from listener" component, using the methods previously described. Tactile equivalents could be produced by using a matrix of rods that can be raised to differing heights to represent material at differing distances (not shown).

The shape/form of items can be represented by a combination of the effects shown in FIG. 35. The present invention is mainly concerned with the effects shown in the right column of the table shown in FIG. 35.

A key feature of the system is the highlighting of corners and other point-like features within shapes, which tests show to be very important in conveying the shape of an object. Corners and other point-like features are highlighted via distinct audiotactile effects (referred to as "dot effects") 8 FIG. 1 that are included at appropriate points in the shape-conveying tracers.

A key feature of the system is apparently-moving effects of particular timbre 6 & 7 FIG. 2, especially (but not only) "buzzing" audiotactile effects, known as "buzz tracks", which improve the perception of shapes and other lineal features. The effects 6 & 7 move along a path related to the item (for example the outline), tracing out the shape of the item, with dot effects highlighting corners 8. Although one possible tracer path for presenting an object's shape is the object's outline 6 & 7, other paths such as medial lines and frames can be used FIG. 9. "Symbolic Object Paths" 146 are found to be effective, as they present the location, size, orientation and type of object via a single tracer path.

A key feature of the present invention is apparently-stationary effects referred to as "Imprints" 1 FIG. 1 (described in detail in section 3 below), which rapidly and intuitively convey the arrangement of material that comprise items.

As the system outputs both audio and tactile effects, users can spread the information load to suit their abilities and circumstances: they can choose which modality to use; or both modalities can be used simultaneously, allowing more information to be presented during a certain period of time.

The embodiments can be used by partially-sighted, blind, deafblind and color-blind people. They may be used as vision substitution systems, as mobility aids, or to find out particular pieces of visual information such as colors, shapes, and corners. They can be used to present shapes to sighted people in various applications, for example as part of a training aid; game; toy; or puzzle. The embodiments can convey a prepared program of pre-defined material, and the sounds and tactile effects produced can be used for artistic purposes, and can be recorded or broadcast. Several special applications will be covered later in this description.

Several preferred embodiments will be described. Preferred embodiments can be constructed using bespoke hardware and software, or can be created using existing components with bespoke software. The embodiments use several methods to substitute for aspects of vision, and there is some interaction between the methods. Hence there will be some overlap between topics, and this description contains some repetition and cross-references. Numerous similar methods can be devised, and the scope of the invention is not limited to the examples described herein.

This description includes the following sections, which are numbered so that they can be cross-referenced:—
1. SUMMARY OF METHOD AND APPARATUS, AND THEIR OPERATION
2. DESCRIPTION OF PHYSICAL COMPONENTS, AND SOFTWARE
   2.1 HARDWARE
   2.2 SOFTWARE
3. KEY FEATURES
   3.1 USING SEVERAL STATIONARY EFFECTS TO PRESENT ITEMS ("IMPRINTS")
   3.2 PRODUCING IMPRINT EFFECTS
   3.3 USING IMPRINT EFFECTS WITH OTHER EFFECTS
   3.4 USING IMPRINT EFFECTS TO PRESENT DATA
   3.5 USING IMPRINT EFFECTS FOR AN IMPROVED COLOR IDENTIFIER
   3.6 USING IMPRINT EFFECTS WITH COMPUTER VISION
   3.7 SYSTEM ARCHITECTURE
4. PREVIOUSLY-DISCLOSED FEATURES
   4.1 IMPROVING THE PERCEPTION OF SOUND TRACERS ("BUZZ TRACKS")
   4.2 IMPROVING THE PERCEPTION OF IMAGE LAYOUT
   4.3 "POLYTRACERS"
   4.4 PRE-DEFINED AND FOUND OBJECTS & FEATURES
   4.5 USING COMPUTER VISION
   4.6 CREATING AND ACCESSING AUDIOTACTILE IMAGES
   4.7 CREATING AND ACCESSING DATA, GRAPHS, CHARTS AND WAVEFORMS
   4.8 USING A "VIEWFINDER" TO CAPTURE IMAGES
5. CONCLUSIONS 1. Summary of Method and Apparatus, and their Operation With reference to FIG. 1 which conceptually illustrates the system and in which the letters A, B, C, and D label four visual items as they are processed into effects, the method and apparatus for presenting visual items comprises:— a) Acquiring (or acquiring means for acquiring) visual items, said items each having content at a plurality of locations, whether contiguous 530 FIG. 36 or fragmented 535. For the present invention said visual items should occupy a 2-dimensional area or 3-dimensional space (i.e. not be located at a single point), and details of the locations of the content of said visual items are acquired.

Said visual items 21 & 23 FIG. 1 will typically be found within visual representations 19.

Example visual items include areas of particular ranges of color shades or other properties 21 & C FIG. 1; objects such as faces 23 & A FIG. 1, people, trees; areas of movement; regular areas within visual representations; data that can be presented visually (for example bubble charts); and any other entities that can be presented visually.

Additional visual features may optionally also be acquired at this step, for example lineal features or other data related to said visual items, such as colors, corners and other point-like features, other basic visual components, and details of recognized entities such as text, objects etc.

The visual items 25 can be acquired by doing optical processing of the visual representations 19; or by acquiring pre-defined features that have been previously decided, for example by a sighted designer selecting key features in images for presentation FIGS. 21, 22, and 23; or by acquiring items provided by an external application, or by any other method that provides details of visual items. Details of the locations of the content of said visual items are acquired.

The visual representations will typically be images of some kind, though they could be for example descriptions of shapes (and their corners) and any fill points (e.g. provided by a set of coordinates), without taking the form of an image. Other visual representations might be used, for example: data that can be presented visually; graphs; charts; maps; shapes and other data from "augmented reality" devices; etc. Any type of visual representation may be used. If the visual representations are in the form of images 19 FIG. 1, they might be provided by a live video signal (for example from a camera 51, broadcast, Internet transmission etc.); filed images (e.g. held on a computer, storage media or the Internet), for example images in one of the many formats used on computers (e.g. bitmap or JPEG format); frames of a movie read from a movie file (e.g. in ".AVI" or "MPEG" format) or from a DVD; etc. The visual representations can be "snaps" of parts of a computer "desktop" 472 FIG. 33, or provided by a media player. "Zooming" and "panning" facilities can be provided 64 FIG. 4 to allow the user to select areas of the image prior to processing.

The visual items can alternatively be acquired from an external application, or be in the form of descriptions of items. For example if a standard shape is to be presented then the locations of the content of said shape can be acquired in the form of data that describes, or gives the parameters of, the outlines of the shape and the fill points, from which the content of the shape can be calculated.

The visual items can be areas of change or movement FIG. 25, so that the movement of entities can be communicated. (Sections 4.4 to 4.8 below further describe acquiring visual items.)

b) Processing (or processing means for processing) the visual items into the form of groups of apparently-stationary energetic effects. The processing is typically performed by a processor such as a computer 13 FIG. 1 (e.g. portable or desktop computer, "tablet" or "smartphone") or embedded processor, and is described further in U.S. Pat. No. 8,239,032 and UK Pat. Appl. No. GB1101732.4 and throughout this description. (Sections 3.2 and 3.7 below further describe the processing.)

c) Display means (or providing display means) comprising audio and/or tactile displays. The provided output apparatus can be audio and/or tactile display apparatus suitable for presenting audio and/or tactile effects. In the audio modality, standard audio equipment can be used, for example an amplifier and stereophonic headphones 24 FIG. 2 or loudspeakers (and associated software). These can present Imprints 1 to rapidly and intuitively convey the properties and approximate extent of the items being presented; buzzing apparently-moving shape effects 6 to convey the shapes presented 4 (by continuously changing the frequency and stereophonic positioning of the buzzing sounds); short distinct audio effects to represent corners 8 etc., and separate encoded categorical sounds such as speech 26 to convey other visual properties.

In the tactile modality, an "Optacon™, Brainport™" or similar tactile array device 15 can present tactile Imprints effects, and several apparently-moving tracer shapes can be presented simultaneously. A braille display 34 can present features, such as colors 36 and entity descriptions, and can possibly present simple apparently-moving tracers by raising and lowering successive "dots" to produce a tactile tracer effect, though the effectiveness of such effects may vary depending on the type of braille display used. A force-feedback type joystick 28 can also be used as flexible tactile display, being suitable for presenting shapes and corners (by moving in the path of the required shapes 9 and triggering distinct effects to represent corners), and for presenting categorical features encoded as Morse code-like impulse effects ("tap codes") 32, as well as allowing the user to indicate and select parts of the images and communicate with the embodiment. It can also present "buzzing" effects similar to the audio buzzing effects e.g. of frequency relating to the pitch of the audio buzzing effects. Standard or bespoke force-feedback devices can be used. Certain standard "smartphones" and "slate-" and "tablet-" format computers (not shown) have tactile feedback facilities, and so can also provide some or all of the tactile effects described herein, for example "tap codes" and buzzing effects of particular pitch and timbre. (Section 2.1 below further describes audio and tactile displays.)

d) Outputting (or outputting means for outputting) the apparently-stationary effects, and other effects, to the audio and/or tactile displays. The effects are output to the audio and/or tactile displays. The "outputting means" can be the hardware/software combination that causes the effects to appear on the displays, for example a computer sound card and the software that controls it, or the software that causes tactile displays 33 & 35 FIG. 1 to exhibit the required effects.

As an option, the sound volume of the words or phonemes used to present colors etc. can be altered to correspond to the amount of each color present. For example if a blue and red object is being presented and there is more blue then red present, then the sound volume of the words or phonemes representing "blue" can be presented louder than those representing "red". The presentation time can similarly reflect the amount of particular properties.

The presentation of apparently-stationary effects 29 FIGS. 1 & 1 FIG. 2 is described in detail in section 3 below.

When recognized objects are presented, for examples people's faces 23 & A FIG. 1, then the actual object description can optionally be presented 29, rather than the coded object classification 1 FIG. 2.

FIG. 1 conceptually illustrates the processing of four visual items 25 (labeled A, B, C, and D) into groups of apparently-stationary energetic audio and tactile effects, and summarizes the invention. The system acquires "visual items" within visual representations 19. The visual items can be areas of a particular property such as color 21 & C, or recognized items such as people's faces 23 & A. A processor 39 processes said items into the form of groups of energetic effects—for example speech sounds or tactile effects. One way of achieving this is to isolate the parts of the image containing the visual item 25 from the background 27, producing a silhouette-like effect. Standard "computer vision" methods can be used to achieve this. Said silhouette-like images can then be processed into audio and tactile "Imprint" effects, for example speech-like sounds (each represented by a "speech bubble" 29 & 500 FIG. 34). Additionally prior art effects such as buzzing "tracers" 30 can clarify location. The effects are output to audio displays 37 (using apparatus such as an amplifier and stereophonic headphones 31 or loudspeakers) and tactile displays 33 & 35.

The system can "step" sequentially round the items being presented, or items can be presented simultaneously, or be individually selected by the user.

The approach can be used to produce an improved color identifier FIG. 40.

See U.S. Pat. No. 8,239,032 for additional details of graphical user interfaces (GUIs); speech, braille and coded impulse encoding; activity-related processing; coded impulses; optical processing; communicating lineal features and corners; pre-defined features; communicating texture; timing effect output; "viewzones", zooming and moving; speech synthesis; communicating change and movement; presenting entities; presenting objects and structures; and miscellaneous other features.

The textures of an area or entity can be conveyed via small fluctuations in the volume and/or frequency of the tracer sounds and Imprint effects. These volume and frequency effects can combine the effects of changes in brightness, color etc., to give a single volume-conveyed "texture" effect. Similar effects can be induced on the force-feedback devices.

Tactile equivalents of the audio effects are also provided, as described elsewhere in this description.

2. Description of Physical Components, and Software

An embodiment can be created by installing standard image-gathering, sound-generating and speech-synthesizing software (and any necessary hardware) on a non-portable computer or portable computer or "wearable" computer, developing appropriate software and installing it on the computer; providing force-feedback devices; and providing other aids, such as a braille display.

2.1 Hardware

FIG. 3 shows the physical appearance of a low-cost preferred embodiment, which uses only standard hardware components (connecting cables not shown). The laptop computer 50 uses Microsoft's™ "Windows"™ operating system, on which the bespoke application software for the embodiment is running. The visual representations can be provided by the "webcam" 53; via a "touchpad" 54 on which the user can draw shapes etc.; from the inbuilt laptop DVD player 55; from files held on the laptop computer 50; from the Internet; or from shapes etc. provided by the bespoke software. The force-feedback joystick 56, for example Microsoft's "Sidewinder Force Feedback 2"™, can be used by the user to indicate areas of the image and control the software, and by the system to present the Morse code-like impulses that can be felt and heard. The force-feedback mouse 57, for example Logitech's™ "Wingman Force Feedback Mouse"™, can be used by the system to present shapes. If one-handed control is preferred then the tactile effects and user control functions can be combined on to one of the force-feedback devices. The laptop's internal loudspeakers output the audio effects. Alternatively separate loudspeakers or headphones can be used (not shown).

Alternatively a portable preferred embodiment can be used (not shown), in a similar manner to that described and illustrated in U.S. Pat. No. 8,239,032. This is particularly suitable if only the audio effects are required, as the only hardware required is a standard computer with headphones. An embodiment of the system can be provided as a "smartphone" application. Certain "smartphones" and "slate-" and "tablet-" format portable computers have built-in video cameras and certain tactile control and feedback facilities, and are very portable, and so may be particularly suitable for embodying some or all of the features of the present invention.

Specialized hardware can also be used, such as an array of tactile actuators (typically vibro-tactile or electro-tactile) acting on parts of the user's body, for example finger-read vibro-tactile arrays, tongue-placed electro-tactile displays, electro-tactile displays, electromechanical tactile abdomen displays, etc.

The invention is not intended to be restricted to the embodiments described herein.

Although Imprints are mainly described as presenting 2-dimensional visual features, 3-dimensional visual features can also be presented via Imprints (and tracers) by using a 3-dimensional "sound display" and tactile space, for example by mapping spatial locations to 3-dimensional sound effect locations, and 3-dimensional physical and/or tactile effect locations (for example by using the enhanced joystick described in U.S. Pat. No. 8,239,032).

An embodiment of the system can be provided as an Internet service.

In the future embodiments of the system can be provided using future technologies.

2.2 Software

U.S. Pat. No. 8,239,032 describes one approach to developing the software, and a similar approach can be used for this invention. This description outlines the processes that are followed when the system is operating, and, when combined with U.S. Pat. No. 8,239,032 and UK Pat. Appl. No. GB1101732.4, can be regarded as an outline functional specification of the software i.e. the software specification takes the form of a description of its function. The software functionality description is spread throughout this description. The precise software design will depend on the processing hardware used and the preferred programming methods of the constructor. Software development is a large subject and well documented elsewhere, but the data and processing required will be described in sufficient detail (when read in conjunction with U.S. Pat. No. 8,239,032 and UK Pat. Appl. No. GB1101732.4) to enable software to be developed by people who are skilled in the art of software development The application software can be designed to be accessible to blind and deafblind people. Methods for doing this (for example by using speech input) are widely documented elsewhere.

As with most standard commercial software intended for general use, the user should be able to alter the parameters that control the software. These should be optionally linked to particular Activities so that the options and parameters appropriate for a particular Activity can be rapidly selected. One convenient way of achieving this is to allow the user to either a) save all applicable user control settings; or b) save only the settings that the user changes during a period of time; and in either case link them to an Activity. The first option a) will, on Activity selection, restore all applicable controls to their saved values; while the second option b) will only update the controls that were changed during the recording period.

The system can be developed to run on a "smartphone" or "slate-" or "tablet-" format computer, or on any present or future computer formats that are appropriate. A simple "front end" interface can be provided, so that an appropriate level of functionality and complexity is exposed to the user.

"Virtualization" software can be used to run the system from a "guest" operating system run on a "host" operating system. For example the Wingman Force Feedback Mouse in unsupported and can be "quirky" in Windows Vista™ or later versions of Windows. In a test, the system was installed on a Windows 2000™ guest operating system using Oracle's™ VirtualBox™ on a 64-bit Windows 8 host computer, and the Wingman Force Feedback Mouse could then be used by the system. A similar approach can be used to allow the system to run on other families of operating systems, for example Linux or Apple™'s Mac OS. Image acquisition or effect presentation can be performed within the "guest" system, or alternatively the "clipboard" facility can be used when the system is presenting clipboard contents, the images being acquired in the host system. Furthermore the system could be run via online virtual services (not shown).

Section 3.7 below describes a flexible scaleable system architecture/design that will allow parts for the system to operate on remote devices.

Prior Art Approach to Implementing Audio Effects

UK Pat. Appl. No. GB1101732.4 describes one straightforward way of implementing additional sound tracks for "buzz tracks", timbre, "pillar" and "layer" effects, and "polytracers", by using Microsoft's "DirectSound" facilities. The DirectSound ".SetVolume", ".SetFrequency", and ".SetPosition" (or ".SetPan" if panning is used) methods can be used to set the volume, height-conveying pitch, and stereophonic sound position respectively of the samples. If a changing sound timbre is required, then a straightforward way of implementing this is to have additional sound buffers playing in a continuous loop for each of the timbre types, then adjusting the volume of each to the appropriate level for the point in the path of the tracer, for the property they are presenting (e.g. the left-to-right location).

Although timbres for buzz tracks and polytracers can be generated "on the fly", greater flexibility is generally provided by using recorded or generated sound samples, for example held in the popular ".WAV" format.

Several buzz track profiles can be created and stored for quick and easy access 110 & 111 FIG. 7.

For non-speech tracers, there is normally no need to "stretch" the sound samples being replayed, as they are normally continuous sounds (not speech), and so can simply be repeated if necessary.

For speech sound polytracers, the stretching process described in U.S. Pat. No. 8,239,032 for a single tracer should be performed separately on the waveform for each tracer, and reflect the path followed by each tracer. As facilities will already exist in the system for producing one tracer, it is normally straightforward to produce the additional tracers to produce the polytracer effects, by using the same routines as previously described for a single tracer, but with the input paths (and other parameters) set to those of the individual tracers.

There are many other techniques that could be used for implementing buzz tracks and polytracers. For example a facility could be provided to stretch sounds "on-the-fly" so that sounds that have a distinct tempo could be used for buzz tracks and could maintain their original tempo, at whatever pitch they are replayed.

Application to Imprint Effects

A similar approach can be used to produce the Imprint effects—each speech-like effect can be produced using similar methods to those used to produce a moving tracer, except that the Imprint effects will be located at successive stationary locations for each of the items presented. For example when presenting successive items as speech Imprints, the elements of an 8 by 8 matrix can each be located as required for each item using the methods described for individual moving tracers.

Section 3.2 below describes in more detail how these methods are applied to Imprint effects.

Improved Stereophonic Positioning

Whatever method is used to achieve the stereophonic positioning of sound effects (for example sound "panning" or 3D sound facilities), it is important that the location conveyed by the sounds accurately reflects the location that needs to be conveyed—with certain hardware/software combinations the horizontal positioning effects may be weak and not accurately correspond to the intended location. One method of improving the stereophonic positioning effects is to allow the user to specify the 3D location or pan location parameter 540 FIG. 37 to be used for several points 541 along an axis, typically along the horizontal left-right axis 542 (though the effects for other axes could be set in a similar manner, for example the vertical axis for 3D sounds), and for each such point record 544 the 3D sound or pan parameter 540 that produces the most accurate impression of horizontal location. The system can then interpolate positioning parameters to use for intermediate locations. In this way the user-perceived stereophonic locations may better match the locations being presented.

Such improved left-right stereophonic positioning can be used for any of the audio effects, for example speech tracers, buzz tracers, polytracers, Imprints, etc., and may produce a considerable improvement in the comprehension of the presented effects.

3. Key Features 3.1 Using Several Stationary Effects to Present Items ("Imprints")

An effective method of intuitively presenting the arrangement of the content of a visual item that is being exhibited is to simultaneously present a group of apparently-stationary energetic effects, wherein said apparently-stationary group of effects 29 FIG. 1 have apparent spatial locations that relate to the spatial locations of the content of the item.

The approach is visually illustrated in FIG. 1 & FIG. 34, which shows several stationary speech-like effects (each represented by a "speech bubble" 29 & 500) being presented to represent several items. Such effects will be referred to as "Imprints". Said several apparently-stationary effects can be several speech-presenting voices 502 FIG. 34, and the effect of the multiple stationary voices presenting successive items e.g. FIGS. 39 & 40 may give the impression of successive items being "stamped out" or "printed". The dispersed effect of the range of pitches and stereo locations resemble the sounds of a crowd of people speaking in unison, "stamping out" or "printing" the items and their properties onto the "sound display" 37 FIG. 1. The "spread" of the voices (or other effects) conveys the size and approximate shape, with the pitch range and left-right stereophonic effects conveying the approximate location.

As conceptually illustrated in FIG. 1, for Imprint effect visual mapping, horizontal position is mapped to left-right stereophonic positioning effects for audio effects 5; vertical position is mapped to frequency for both audio and tactile effects. Spatial locations are mapped to the spatial locations of the sound effects, and to the physical location 9 and/or tactile effect location 11, for audio and tactile effects respectively.

When the effects 502 FIG. 34 are stereophonic speech sounds 1 FIG. 2, the pitch and left-right stereophonic positioning effects of the several "voices" of the "Imprint" correspond to the vertical and horizontal locations respectively of the content of the items being presented (i.e. follow similar pitch and left-right stereophonic positioning mapping conventions to those used for "tracers"), and produce a combined effect which may rapidly and intuitively convey the approximate extent of the item being presented; with wide-ranging items 514 producing "dispersed" effect of several pitches and apparent stereophonic locations, and compact items 516 FIG. 34 producing a more "constricted" effect of few voices and narrow pitch range.

FIGS. 34 and 35 illustrate several Imprint arrangements. The Imprint effects for several items would commonly be output in sequence, allowing the user to mentally-position the various items as they are "stepped round" in an organized manner, for example as illustrated for areas of particular colors FIG. 40. If the item being presented is a single-panel Region 506 & 510 FIG. 34, or a tracked object, then there will be no "stepping round" effect, and the Imprint effects for any visual item will present what may be described as a continuous "streaming" effect.

Several items could be output simultaneously if distinct effects are used for each item, for example distinct voices, so that a user may benefit from the "cocktail party effect" which may allow them to focus on particular items at will.

The arrangements of Imprint effects shown in the right-hand column of the table in FIG. 35 may all sound similar if presented as voice-like Imprint effects alone—the spread of pitches and stereophonic positioning may give a clear general impression of the extent of the item, but the exact form/shape, vertices, depth, etc. of the item may not be clear from the Imprint effects alone. Consequently Imprints will often (though not always) be presented in conjunction with other effects, such as shape-conveying buzz-track tracers, and/or optophone-like polytracers, as illustrated in FIG. 36. One effective arrangement is to present a buzzing outline tracer if the item being presented is a single contiguous non-fragmented item 530 FIG. 36, and optophone-like polytracer effects if the item is fragmented 535.

Note that although Imprint effects themselves are apparently-stationary, the items that they are representing can be moving—for example if successive representations of an item are presented, then the item may appear to move, especially if its effects are rapidly updated, as may occur if an item is being tracked, as described in section 3.6 below. However even in such cases the effects themselves are normally still located in the stationary grid positions 504 FIG. 34—though the collection of stationary pitches and stereophonic locations of the effects that are presenting an item may give an overall impression of change as the item changes position and/or size and/or form.

The group of individual effects that comprise a Imprint effect can be arranged in a number of ways, as illustrated in FIG. 43, which shows example contiguous/non-fragmented items, but similar approaches can be used for fragmented items 535 FIG. 36. By default, Imprint effects are arranged in a "fixed" regular matrix arrangement 650 FIG. 43. The individual effects 651 can be activated or deactivated to produce the desired silhouette-like effect, and effects that bridge the border of an item can have reduced energy (e.g. volume). A grid-like regular matrix is straightforward to implement for both audio and tactile Imprint effects FIG. 1, as the individual effects are located in the same unchanging locations (though changing energy level with content).

However there are advantages to varying the configuration of individual effect locations to relate to the items being presented. For example when a viewzone/Region within a scene is smaller 510 FIG. 34, the range of the presented region can be constricted 652 FIG. 43: optionally the several voices or other effects 651 can be relocated to cover the area presented in either the vertical or horizontal (or both) directions, so that when the viewzone is smaller, the several voices or other effects will be apparently closer together, and the distinct reduced range of frequencies and left-right positioning may be easily and intuitively interpreted by the user.

The voices or other sounds can be relocated using the standard sound facilities provided by most personal computers using the methods described in section 2.2 above. In the tactile modality, such flexibility may not be possible with standard tactile displays because the array of tactile actuators that typically makes up such devices cannot usually be repositioned. However compromise approaches may be used, for example by using techniques similar to "anti-aliasing" methods used in graphics processing to produce intermediate values; or by reducing the energy of each actuator when the item covers a larger area, and increasing it when the area presented is more constricted, hence simulating the effect of moving the actuators closer together (not shown). (Future tactile displays may be more flexible.)

The matrix of Imprint effects can be evenly shrunk 652 FIG. 43 or expanded, or varied in the vertical 654 or horizontal 656 direction, so that they match the area framing the item. If voices are used, the constricted and closer or wider pitch ranges and stereophonic positioning of the several voices may intuitively convey the extent of the item.

The matrix of Imprint effects may be adjusted so that the same number of active individual effects are presented for each item 658 (i.e. none are "switched off" as would be the case if a rectangular matrix of effects is used to present items that are not aligned rectangular). The items can be aligned vertically 660 or horizontally 662, but with their apparent locations adjusted along the alignments so that the full set of effects are used to present the content of the item 660 & 662. If synchronized speech or other effects are used, the horizontal alignment 662 has the advantage that, as such effects will normally be at the same frequency, only one set of speech sounds needs to be prepared for each row of effects, so reducing the processing load.

The Imprint matrix can be adjusted in both directions so that the effects are evenly spread according to the shape of the item 664. Similar processing to that used to calculate the "layout" of an irregularly shaped object 160 FIG. 11 can be used to calculate the locations of the individual effects, by recursively dividing the content into equal areas along axes in alternating directions 664. A randomly scattered arrangement of apparent effect 668 locations can also be used.

Although Imprints are defined as being apparently-stationary groups of effects, the individual effects within said groups can have a degree of apparent movement: for any of the above arrangements of effects, the individual effects can be varied in apparent location with time 670. Furthermore the energy (e.g. volume) of individual effects can be varied 672. Variations in both apparent location (i.e. movement), and energy, can be used 674. The frequency and amount of said movements and said variations in energies can produce energetic effects, which may be perceived as "bubbling" effects, which can be mapped to visual properties, for example brightness or texture. For example the frequency, evenness or unevenness of frequency, and amplitude of changes can rapidly convey the texture.

Effective Imprints can be produced by processing samples of buzzing sounds, humming sounds, tone-like sounds, tapping sounds, bubble-like sounds, and raindrop-like sounds for outputting as Imprints. For non-continuous sounds such as raindrop-like sounds, and the start, length, and intensity of the component sounds of the effects can be randomized around average values, producing a "fluttering" or "rain on roof" effect, and the user can control the frequency, the length, the intensity, and the amount of randomization.

Similar arrangements can be provided in both the audio and tactile modalities. The examples shown in FIG. 43 are for two-dimensional "area" Imprints, but similar arrangements and facilities can be applied to other dimensions, for example to some of the Imprint arrangements shown in FIG. 35. Other similar arrangements can be devised. GUI facilities should be provided to allow the user to easy control such configurations. By using these methods the Imprint effects and categorical information (e.g. words) presented by them can rapidly convey the size, shape, and nature of items, while the variations in location and energy of the individual effects can rapidly convey other properties such as brightness.

Presenting Regions Via Imprint Effects

The items presented via Imprint effects can for example be Objects within a viewzone e.g. FIG. 40, or alternatively the content of the (typically rectangular) area of the viewzone itself i.e. the panels of a "Region". When the item presented via Imprint effects is the whole viewzone with a single-"panel" Region 506 FIG. 34, then there is no "stepping round" effect, and the content of the whole viewzone (i.e. the Region) is effectively continuously "streamed" via the several stationary effects 508, with the categorical content and/or smoothly changing properties of each effect 508 corresponding to the content of the part of the viewzone that they each represent, as it changes with time. The "spread" of the Imprint effects will correspond to the size, shape and location of the Region/viewzone being presented. If the Regions are multi-panel then if stepping around the panels that comprise the Region, the Imprint effects will be a sequence of separate Imprint effects for each panel, rather than a continuous "streamed" Imprint (not shown).

Timing and Intensity of Imprint Effects

Certain properties of the Imprint effects, such as volume, or length of presentation time, can relate to certain properties of the items being presented. The order of presentation, length of time of presentation, volume, tactile intensity, spread of apparent location, etc. can be used to convey importance, size, color, texture, number, distance, etc. For example the timing and intensity of the effects can relate to the size or other features of the items being presented e.g. by increasing the volume of the speech and/or the length of time of presentation to correspond to the area covered by any item 546 FIG. 37 & FIG. 40. One way of implementing such effects is to calculate how the area of an item deviates from the average area of the items to be presented, then to alter the intensity and/or length of presentation time accordingly (optionally raising the alteration to a particular power in order to increase or reduce the "contrast" of the variation in effects). If speech is being output then it is advisable for a minimum volume and/or minimum length of time to optionally be set 548, so that the speech for e.g. small items is comprehensible. Optionally the color names can be made equal length 547, (e.g. "Red" and "Dark-Purple" will be assigned the same length of time) or alternatively color terms can be presented with lengths proportional to the length of their name.

Categorical and Non-Categorical Imprint Effects

Imprint effects can be multiple stationary categorically-perceived effects, such as speech or categorically-perceived tactile effects. If speech is used, then all effects at any moment should usually "speak" the same words i.e. "speak in unison" 29 FIG. 1 (although in theory different parts of an audio display could output different speech, and the user could focus on one part at any time). In the tactile modality, categorically-perceived tactile effects such as distinct textures or vibrations can be used—certain types of tactile arrays 15 FIG. 2 can present distinct categorical tactile effects; or other categorically-perceived tactile effects such as the previously-described "tap codes" can be used. The categorically-perceived effects can present any useful information relating to the item(s) being presented, for example:—what the item is e.g. "blob" or recognized entity 560 FIG. 38 (i.e. the "what-ness"); the color(s) 562; texture; and arrangement of properties 564; etc.

Alternatively the effects can be multiple stationary non-categorical effects such as certain varying tone-sounds or buzzing effects, with certain continuously-changing properties used to present continuously-changing quantities such as brightness.

Both categorically-perceived and continuously-changing Imprint effects can be output, either simultaneously or in succession. For example both categorical speech sounds and continuously-changing tone sounds can be output simultaneously, with the balance controllable by the user 566 FIG. 38. Effects can be "combined"—for example presented categorically-perceived speech sounds or sounds of distinct timbre can exhibit non-categorical continuously-varying intensity properties such as volume.

When the several effects are speech-like sounds (whether coded or standard speech, or continuous vowel sounds) the impression given to the listener may be of a crowd of voices, each at different apparent locations (conveyed by the pitch and stereophonic positioning, as previously described). For widely-spread items, the spread of pitch and other positioning effects will give a more "dispersed" effect, whilst for a more compact item the several effects will be more similar to each other, and the sounds will tend more towards a single voice. The dispersed effect of the range of pitches and stereo locations resemble the sounds of a crowd of people speaking in unison, "stamping out" or "printing" the item and its properties onto the "sound display" 5 FIG. 2.

Enhancements to Imprint Effects

Optionally the spread of voices (conveyed by the range of pitches and stereophonic locations) produced by the items being presented can be exaggerated or reduced, by exaggerating or reducing the pitch and stereophonic location range respectively (not shown).

Optionally Imprint effects can be presented using several differing voices, each of distinctly different character, for example voices with distinctly different age, sex, accent, etc., wherein the character of the voice conveys additional information; or is assigned to different items. For example voices of different characters can present different types of item, with voices of particular character assigned to presenting faces; blobs; Regions; etc.

The "cocktail party effect" may allow more than one different sets of word-like sounds to be presented simultaneously, each set presented via voice-like sounds of distinctly different character, with the user giving their attention at any point in time to the sounds produced by one voice of particular character. Said different voices can each be assigned to different items; or convey other information (not shown). An intermediate approach can be used where several items are presented simultaneously, but said items are emphasized sequentially via temporary increases in the volume or intensity of the effects presenting each said item, producing a "step round" effect.

The system addresses the question of how to integrate the potentially short time period Imprints with the existing "tracer" and "polytracer" methods, which by definition require a certain period of time to trace out the shape involved.

One approach is to "play" the Imprints at the same time as the tracers, but this can cause confusion for the user, as well as requiring equal periods of time to be assigned to both processes, whereas one of the principle motivations of using Imprints is to rapidly and intuitively summarize the content of a scene. Possibly a better approach is to allow the user to control when the detailed tracers are presented: for example, if the system is stepping round a scene sequentially presenting Imprints of the items in the scene FIG. 1 & FIG. 40, a blind user does not generally need to know the exact size, shape and location of each item—the approximate size and extent presented by the Imprint is sufficient. When a particular item is presented that the used does want to know more about, they can command the system to "lock on" that item, then obtain the exact shape of the item via previously-described tracers. In this way the user can get the benefit of the rapidly-presented Imprints, as well as the detail presented by tracers (or other effects).

Optionally only the perimeter of items can be presented via Imprint (non-tracer) effects 522 FIGS. 35 and 570 FIG. 38. Optionally the perimeters of contiguous items can be emphasized by adjusting the locations of Imprint effects that are presenting content located near to the perimeters to be located on the perimeters 572 FIG. 38—otherwise partially-occupied 505 FIG. 34 locations within the matrix will be represented with corresponding Imprint effects of reduced intensity e.g. reduced volume.

3.2 Producing Imprint Effects

Section 2.2 above summarizes possible approaches to software development that can be applied to Imprints (as well as to the previously-disclosed tracer and polytracer effects).

To produce Imprint effects, the system first identifies or is supplied with one or more items e.g. from visual representations. If distance-measuring facilities are provided (for example via Microsoft's "Kinect" system—not shown), then three-dimensional items can be presented 524 FIG. 35. The content at locations within the space occupied by the item is determined. Normally a "matrix"-based approach is satisfactory i.e. determining which locations within a regular matrix 504 FIG. 34 are occupied with content related to the item, and presenting effects for the occupied locations.

Partially-occupied locations 505 FIGS. 34 & 529 FIG. 36 within the matrix can be represented with corresponding Imprint effects of reduced intensity e.g. reduced volume.

If speech-like effects (or other "non-continuous" effects) are to be presented then it is usually necessary to produce stretched versions of the speech sounds, so that when the sounds are presented at differing pitches then the several speech effects will still be synchronized (although pitching "on the fly" can alternatively be performed). If a "panning" approach is used to achieve the stereophonic positioning (i.e. the same sounds are played on the left and right channels, but the volume of each channel is altered to give a horizontal positioning effect), then only one sample of stretched speech may be required for each row of effects 512 FIG. 34, because the same sample can be used for each column position within a row of effects. Stretched sound samples are only required for those rows which include matter to be presented. (As the effects are apparently-stationary, for certain applications if only a moderate number of different speech-like sounds are output, then a set of sounds can be pre-stretched for each row height and selected for use by the system as required, so removing the need to stretch the speech samples while the system is being used.)

For example the Microsoft DirectSound ".SetVolume", ".SetFrequency", and ".SetPosition" (or ".SetPan" if panning is used) methods can be used to set the volume, height-conveying pitch, and stereophonic sound position respectively of the sound samples. Panned sounds generally use less resources than 3D sound, and produced effective Imprint effects if the special pan-setting technique described in section 2.2 above is used. By using these methods it was practical to use 64 panned sound buffers in an 8 by 8 arrangement 652 FIG. 43. In a test on a regular PC it took the system less than one tenth of a second to stretch and initialize the buffers for 1 second of speech-like sound output for such an arrangement. The volume of the individual buffers can be altered as the Imprints are being presented to produce the required effects for particular Imprints.

To produce Imprint effects for Regions the system should adjust the speech sounds etc. in the manner described above so that the words and other effects spoken by the voices are substantially synchronized.

Once the effects have been determined, they are presented at the appropriate locations on audio displays 5 FIG. 2 and/or tactile displays 15. For audio, the effects are located in the "sound display" 5 using the techniques previously described for polytracers, with the pitch and stereophonic positioning corresponding to the location of the content being presented. For tactile effects, if a two-dimensional energetic tactile display such as a finger-read Optacon™, tongue-placed Brainport™, Forehead Sensory Recognition System, or other tactile array 15 FIG. 2 is provided, then the Imprint effects are located at the corresponding locations within the tactile matrix of elements 11. The exact method of producing the distinct tactile Imprint effects will depend on the features and capabilities of the particular tactile array type used. For example several apparently-stationary distinct vibro-tactile or electro-tactile "texture" effects may be generated for presenting distinct tactile Imprint effects.

3.3 Using Imprint Effects with Other Effects

When Imprint effects are being presented, other effects can also be presented, whether simultaneously with, or before, or after, the Imprint effects.

For audio Imprint effects, the stereophonic horizontal location and spread indicates horizontal position and item width, but such effects are generally not as clear as the pitch range (which is the primary indicator of vertical position and height). Furthermore, though Imprint effects may give a rapid and intuitive impression of the position, arrangement, size, and extent of items, they may not be as effective as, say, shape tracers for presenting the exact shape of items. For example the three points of the quasi-triangular shape shown in FIG. 2, though an essential feature of the shape, would not be well represented by Imprint effects alone.

Hence additional effects can optionally be used to support the Imprint effects, their use depending on application and user preferences 565 FIG. 38. Two Imprint-supporting additional effect types will now be described, namely tracers 531 FIG. 36 (to clarify the shape of items); and optophone-like polytracer effects 536 FIG. 36 (to clarify the distribution and extent of item content), but many other combinations can be devised.

Using Supporting Tracers

See 531 FIG. 36. The Imprint effects 532 convey the approximate location and size of the non-fragmented object/item 530, while the tracer effects 533 and corner effects 534 clarify the shape of the item. The tracers can be "buzz track"-style, or speech-like, or a combination thereof, the balance being user-controllable 568 FIG. 38. Although Imprint-supporting tracers would typically be medial or outline tracers 533, any of the path types (described in section 4.1 below) (e.g. "frame" or "symbolic" paths) could be used. For example center-tracers (located at the center of the item being presented) help to clarify the location of the Imprints.

Using Supporting Polytracers

See 536 FIG. 36. While presenting the outline via a shape-conveying outline tracer and corner effects is effective for supporting Imprint effects for clearly-defined shapes 530, for fragmented items 535 a single outline tracer may not be able to present all of the item's components in a reasonable period of time. Instead, optophone-like polytracer effects 537 can be used to support the Imprint effects 539. The apparently-moving polytracer effects can present the area covered by the item, or the entire viewzone 538, so rapidly giving an impression of the locations and distribution/arrangements of the fragments. An additional benefit of using polytracer effects is that they' can give an impression of the texture of the item.

The polytracer effects can be speech-like, tone-like, both, or other sounds such as continuous vowel sounds. The relative volume of each should be user-controllable 568 FIG. 38. The overall effect may be perceived as being of Imprint effects with a time-based optophone-like wave superimposed to clarify the distribution of content.

In addition to the polytracer effects, short "start-click" effects can optionally be made at the start of each polytracer output sequence 574 FIG. 38 to clarify "optophone-style" scan starts and so help to convey the horizontal location of the content via the delay/time from start; and "column-clicks" can be triggered as each of several left-to-right column positions of the optophone effects are reached 576. The column-clicks can be short "blip-like" sounds comprising very short tone sounds, with left-to-right movement; and pitch and stereophonic location matching the approximate smoothed center 528 FIG. 36 of the item content in each column. Alternatively full musical notes can be used instead of "blip" sounds. Alternatively, or in addition, two similar sets of column-click effects can present the upper and lower range of the content in each column respectively, or the top and bottom of the range containing, say, 80% of the content (not shown). The column-clicks' volume can relate to the amount of content for the column being presented, so that they are more emphasized at the columns for which there is more content.

The optophone-like polytracer effects can be for the full viewzone width, or optionally only presented for the horizontal range within which presented items are found 578 FIG. 38. If column-clicks are for the full viewzone width then they will be triggered at the same rate whatever item is being presented, but will be emphasized when the optophone effects are presenting the current item. If both start-clicks and column-clicks are presented then the gap between a start-click and the column-clicks will give an indication of the offset of the content represented by the column-clicks.

The paths that the Imprint-supporting polytracers follow can either be straight horizontal parallel lines 537 FIG. 36 & FIG. 17, as used in previous optophone-like systems, or "Contoured" or "Parallel" polytracers, as described in section 4.3 below.

Moving polytracers can also be presented to support stationary Imprint-conveyed non-fragmented objects 530 FIG. 36, by following any of the previously-described arrangements of moving polytracers, for example as shown in FIGS. 14 to 18.

For all such polytracer effects, the volume can relate to the amount of content, and the left-to-right scan time can either be allocated to cover the range of the viewzone that is occupied by the item being presented 578 FIG. 38; or be timed so that the scan time is allocated to the full width of the viewzone, the effects for the item cutting in during the period of the left-to-right traversal within which there is content for the item being presented.

Optionally the direction of apparent movement (i.e. whether left-to-right or right-to-left) can convey additional information. Optionally a row-by-row, diagonal, or other direction of apparent movement could be used. Optionally the viewzone area 538 can be always square, so that the user knows that the width will match the height (which is more clearly conveyed by the pitch range).

The tracer 533 and corner 534 effects, and/or polytracer effects 537, can support the Imprint effects by being presented before, during, or after the Imprint effects (531 & 536). Optionally both tracer and polytracer effects can be presented simultaneously (not shown). The system can use algorithms for deciding which supporting methods to use, for example by determining the number of fragments that comprise the presented item, or the user can control the methods.

Tactile Equivalents

Tactile equivalents to the audio effects can be provided by presenting them on a tactile display 15 & 28 FIG. 2. The main tracer can present any of the path types described elsewhere. If the force-feedback joystick 28 is used to present main tracer shapes, then typically the outline or medial line of the item is presented, or the center of the item can be presented, with the joystick moving from center to center as each item is presented via the Imprints. As described elsewhere, additional moving tracers can be presented simultaneously in the audio modality, and similar effects can also be presented on a tactile array 15 FIG. 1 such as the Brainport™ tongue display, Forehead Sensory Recognition System, or other tactile array.

"Echo Speech"

Once the audio samples have been stretched, the samples are played, the commencement of the sounds being generally adjusted to ensure that words are spoken simultaneously by the several "voices" 29 FIGS. 1 & 502 FIG. 34. The several effects' pitches and stereophonic locations each relate to the location that they are representing. However as an option 580 FIG. 38 the effects for each column 511 FIG. 34 can be started at slightly different times, so that an impression of the width of the item can be gained by the user from the number and delay of the several columns of voices. For example a user-controllable delay can control the absolute or proportional delay of the start of each column (not shown). The overall effect of this may be an "echo" effect, with some similarities to the optophone-like polytracer effects described previously. Optionally the direction of echo startup (i.e. whether left-to-right or right-to-left start order) can convey additional information. Optionally a row-by-row, diagonal line, or other effect start order could be used. As "echo speech" effects tend to make speech effects less clear, it works best when not too much information is to be presented via the speech content.

Summary of Imprint Effects

In the present invention the new feature of "Imprint effects" is disclosed. Such apparently-stationary multiple effects allow the user to gain a rapid impression of the size and extent of an item within a visual representation. When in the form of spoken real or coded words, Imprints are particularly effective, as the dispersed effect of the range of pitches and stereo locations resemble the sounds of a crowd of people speaking in unison, "stamping out" or "printing" the item and its properties onto the "sound display" 5 FIG. 2. The "spread" of the voices (or other effects) conveys the size and approximate shape, with the pitch range and left-right stereophonic effects conveying the approximate location.

However Imprint effects alone do not give a clear impression of the precise shape/form of the item being presented—hence the option of combining the presentation of Imprint effects with some of the previously-disclosed effects such as:— apparently-moving "shape tracers" with "buzz track" effects, which trace out the shapes of items; distinct "dot effects" to emphasize corners within the shapes; and optophone-like "polytracer" effects wherein lines/"fronts" of apparently-moving tracers "sweep out" the areas being conveyed. Many other combinations of effects can be devised. When combined with other effects such as line tracers, Imprint effects can be thought of as the "filling" of presented items.

Note that any of the other facilities, such as being able to track or "lock on" to particular items being presented, and being able to rapidly switch on and off "buzz-track" tracer effects, can be applied, if appropriate, with Imprint effects (with appropriate adjustments). For certain users and applications it may be useful to link combinations of settings to a stored "Activity", to allow rapid setting for a particular activity.

"Imprint" effects can be used for numerous applications, including many of the applications described in section 4 below. For example if the accessible drawing facility described in section 4.6 below is used to "fill" a drawn shape, then that shape can be presented with Imprint effects, to rapidly convey the extent, as well as using buzz-track tracers, corner effects etc. to convey the shape more precisely.

3.4 Using Imprint Effects to Present Data

Section 4.7 below describes using moving tracers (and other effects) to present data from graphs, charts, and waveforms in the form of line graphs and other formats that can presented as audiotactile lines and dots.

The approach can be extended to use Imprint effects. For example the graph type known as a "bubble chart" FIG. 39 is effective when presented via Imprints, as the audiotactile "spread" of the effects (and optionally the variation in intensity/volume and length of presentation time 546 FIG. 37) may rapidly and intuitively convey the relative sizes of the "bubbles" 590 FIG. 39 in the bubble chart. The bubbles can be presented sequentially in, say, order of size (or any other appropriate order), but if the bubble chart is presented in the audio modality only, then it may be worthwhile to present the bubbles in the order in which they occur along the horizontal (X) axis FIG. 39, so that their relative order on that axis is clear, as the horizontal audio location effects will generally be weaker than the pitch-based vertical (Y) axis effects. The intensity and length of the effects 546 FIG. 37 can correspond to the size of the bubbles 590 as described previously.

The "locking" facility described elsewhere allows any particular bubble to be temporarily locked on, so that the location and relative size of said bubble can be more clearly perceived—the system can switch to presenting shape tracers etc. for the bubble if required when the locking effect is applied.

A similar approach can be used to apply Imprint effects to other ways of presenting data where an area is presented, for example Column, Bar, Pic or Area charts, with the Imprint effects rapidly conveying the approximate area, shape and location of the elements of the charts, though in most cases additional effects will be required to clarify the shape (unlike for the case of bubble charts, where the bubble's shape is known to be circular and so the shape does not need to be specifically conveyed).

Additional effects can be presented with the Imprint effects as described in section 3.3, for example center, outline, or medial tracers and/or polytracer effects, and other configurations of effects. Constant-speed outline or medial tracers are particularly appropriate for presenting bubble charts, as they give an impression of the relative size of each bubble, because the presentation time for each bubble is proportional to the bubble's diameter.

3.5 Using Imprint Effects for an Improved Color Identifier

"Imprint" effects can be used to present the distribution of color, or other visual properties, within an image, so as to produce an improved color identifier. Devices have previously been invented that identify colors present in an entity (for example an object, scene or image), and are useful for blind people. For example the ColorTest™ and Colorino™ talking color identifiers use speech synthesis to announce the color shades of items at which they are pointed. The software called ColorID™ allows users of the Apple iPad™ to use its inbuilt camera to identify colors. Existing color identifiers can include features such as speech and braille output, and facilities for lighting target objects. Such devices generally announce a single color shade for whatever they are pointed at, and so can present precise color descriptions, for example by using a "look-up" table to translate the detected "RGB" color component values into a large range of common or special color names.

"Imprints" can be used to present several prominent colors, and their distribution, within a region of a visual representation.

If the several colors of an area and their distribution are to be presented (rather than the precise color of a single point or the single average color of an area) then one issue that must be addressed is how to decide on a limited number of color shades which effectively describe the colors of said area. For a simple image or diagram, for example as being presented in FIG. 4, then the solution is straightforward, as only a limited number of colors are present, and each can be presented in succession, via Imprint effects. However for an image containing many shades, for example a color photograph, a more sophisticated approach is required.

One weakness of the approach suggested in U.S. Pat. No. 8,239,032 was that the colors selected for presenting were often not optimal: for complex images a method of identifying the colors present (described in section 4.3 of U.S. Pat. No. 8,239,032) could, for example, suggest spectral colored shades as having the least error, when a monochrome image was presented. This is because certain colored shade combinations produced less average "color distance" i.e. "error" than the available monochrome combinations. For that particular example, an improved method (described further below) is not to select colors from the full gamut of available colors, but to restrict the range of color shades available for selection to those shades in a reduced gamut of colors, namely a monochrome gamut. The approach can be extended to include other "color kinds" (i.e. reduced gamuts, referred to as "sub-gamuts"), which group together colors (or other properties) that people may perceive as similar. For example if an image being processed is detected as consisting of only "Grays" (i.e. monochrome shades as just described), or of only "Browns", or of only spectral colors, (or consisting only of combinations of those "color kinds"), then the available choices of colors can be restricted to only the color shade categories found in those color kinds/sub-gamuts (i.e. shade combinations containing only monochrome shades, browns, or spectral colors respectively). The motivation for this approach is that the effect of assigning an "inaccurate" color to an item when the color is selected from sub-gamuts that reflect the overall content of the area in question (rather than from a full gamut) minimizes the effect of the error. For example, if "light blue" is assigned to an item when "dark blue" would have been more appropriate, then the effect of that error is less than if, say, "orange" were assigned, as "light blue" and "dark blue" are perceived by people as being similar. (The assigned colors may be "incorrect" due to the low number of best colors being used e.g. two best color categories, for representing the item, so that certain parts are inadequately represented; or due to imperfections in the algorithms for deciding the best colors to assign to an item.)

The approach used could be to compare samples of colors found in a visual representation against several reduced gamuts ("sub-gamuts") (for example "Blues", "Browns" etc.) and determining which of said sub-gamuts include substantially all (or a high proportion) of said samples, and which of said sub-gamuts include none (or a low proportion) of said samples—the system can then select up to a certain number of colors wherein said colors are each included in all of the sub-gamuts into which all of the samples fall, and are each not included in any of the sub-gamuts into which none of the samples fall, whereby many colors can be represented via a few appropriately-selected colors shade categories.

Using this approach can result in long processing times, as many combinations of color categories need to be tested. A refinement of the approach is to use, where possible, a "bespoke sub-gamut" that is decided "on the fly", comprising the color shades/categories that are found in more than a certain proportion of samples, using a "histogram" approach FIG. 41: a set of samples 602 of property values are taken from an image 600 e.g. 256 smoothed pixel samples, and each is categorized as one of the color categories 606 in the full gamut 608 of color categories, and those color categories that have more than a certain proportion 610 (e.g. 2% —the amount can be user-controllable) of pixels samples assigned to them are added to the bespoke sub-gamut 612.

Measures may be taken so that very similar colors that are prominent but bridge the boundary between two or more color categories are not omitted. For example each smoothed pixel could be assigned to a 32 by 32 by 32 "RGB cube" 604 of 32768 "bins" 614, and then all overlapping 3 by 3 by 3 RGB 27-"bin" cube "groups" of bins 615 within the full 32 by 32 by 32 RGB "cube" of bins 604 could be tested, and for each 3 by 3 by 3 27-bin cube 615 collecting the samples found in the 27 bins 615 into the deepest of those 27 bins, so that groups of color shades that "straddle" color categories are assigned to one of the color categories and not divided into several color categories and consequently omitted—for example they could otherwise be recorded as up to as little as ⅛th of their "true" proportion value if they happen to group at the intersection of a "cube" of 8 (2 by 2 by 2) color categories.

The resultant color categories columns 606 that are deeper than the required depth 610 can be deemed a "predominant color" and are assigned to the bespoke sub-gamut 612. If the total proportion of samples that are assigned to color categories in the "predominant color" sub-gamut exceeds a certain amount, for example 75% of the samples, then the image can be deemed simple enough to use only the bespoke "predominant color" sub-gamut 612—otherwise the pre-defined sub-gamuts (described above) can be used. Such an approach generally requires less processing than always testing against many pre-defined sub-gamuts of colors.

The same general approach can be extended to select and present categories of other property types, for example categories of textures, or categories of object types. In this way many samples of visual properties can be represented via a limited number of appropriately-selected visual categories.

Many refinements can be made to this basic process, for example by smoothing the sampled pixels, so that the effect of "noise" and exceptional pixels is reduced. Half-toned or "dithered" images (e.g. "newspaper"-style photographs comprising black-and-white dots) benefit from special treatment, as do simple diagrams. More specifically, if the image is a "simple diagram" or "simple photo", it was found to be helpful to set up a bespoke sub-gamut comprising the categories of colors that include the found colors, and if requested 592 FIG. 40 to check the perimeter for a predominant color, which will then be deemed the background color—if one is found, the system can not present items of that color.

As with other features, option settings can be linked to particular Activities, with particular settings defined for certain types of media.

Once the "best colors" (or other properties) are determined, each part of the content of the image can be assigned to the nearest best color (or other property). Depending on application, "blob extraction" (described in section 4.5 below) can be performed so that larger non-fragmented regions of common color can be presented.

The distributions(s) of the colors can then be assigned as the visual items to be presented via Imprints FIG. 40 (and optionally with additional effects as previously described). As is the case for other items, if the areas of color are simple blob-like areas 530 FIG. 36 then a shape-conveying buzz-track tracer can additionally be presented, and if the areas of color are fragmented 535 then optophone-like polytracer effects can give an impression of the arrangement of color and degree of fragmentation. Computer vision processing can be used to segment the image into larger blobs, for example by doing "moving average" filtering or other "blob extraction" techniques (see section 4.5 below).

Most of the other options for Imprints can also be used when the invention is used as an improved color identifier. Corresponding tactile Imprints of the locations of each color category can also be presented to the tactile elements 11 FIG. 2 if a suitable tactile array 15 is provided.

The selected colors can also be presented via the other methods described elsewhere. Furthermore the previously-described "Layout" approach to presenting the arrangement of colors can also be used.

Properties other than color can also be selected and presented in a similar manner.

More than one color can be assigned to an item, for example a mottled item (e.g. an area mottled with red and yellow spots) can be presented as comprising two or more colors, or alternatively as the net shade (e.g. of "orange"), depending on the application. Pre-defined color categories can be assigned to areas of prepared material (see section 4.4 below).

3.6 Using Imprint Effects with Computer Vision

Section 4.5 below describes using the results of computer processing with the system. Imprint effects can also enhance such presentations, for example:— a) Blob extraction. Blob extraction/image segmentation techniques allow blobs of particular colors (or other visual properties) to be presented via Imprint effects. (Blob extraction can be an optional feature of the improved color identifier described previously.)

b) Motion detection. Areas of motion can be highlighted via spoken Imprint effects.

c) Object detection and tracking. Faces and other "objects" are effective when presented as Imprint effects FIG. 1, as it is not necessary to present the exact shape if, for example, the presented words or other effects make clear that it is a face 23 (or other "object") that is being presented. The range of pitches and stereophonic locations will quickly and intuitively convey the size and location of the detected item(s), and no additional effects will generally be required.

Section 4.5 below describes object tracking techniques. When presented via Imprint methods successive sizes and locations of an item will be quickly "printed out" and intuitively conveyed. However if the tilt/angle of slope of an item being tracked is required, then additional effects may be needed, as the angle of tilt will not be clear from the Imprint effects alone. For example the orientation of a tracking ellipse 340 FIG. 27 can be conveyed via a distinct tone sound, with stereophonic location at the edges of the presented audio "sound display" 5 FIG. 2, with no tone sounds presented when the item is approximately upright, but cutting in on the left or right as the item tilts left or right respectively, the pitch changing as the tilt increases, and snapping to the base center when the item is approximately inverted (not shown).

Optionally when tracking an item the whole Imprint effect matrix 504 FIG. 34 can be adjusted to smoothly and continuously "follow" the center of the item being tracked. This make the effects no longer fit the Imprint definition of being "groups of apparently-stationary effects" but produces a "sliding Imprint" effect 518 FIG. 34 that may be perceived as being somewhere between apparently-stationary Imprint effects, and moving polytracer effects, and gives a sensation of motion. A version may be produced by placing speech-like effects at the corners of the ellipse-enclosing rectangle 344 FIG. 27, and/or the ends of the ellipse cross-hairs 346. While this approach was straightforward to implement when non-speech tracers were used as described in section 4.5, when speech sounds are used the difficulty that arises is that the system does not know in advance what paths each such point will follow, and hence what stretching of each speech sample is needed in advance, if the several speech effects are to be kept synchronized—"on the fly" stretching would be required. A way to mitigate this issue for speech sounds is to use a fixed audio matrix of effects, but allow the matrix to "move"/"slide" (but not expand/contract or tilt) to follow the item 518 FIG. 34, with the individual effects being activated and de-activated 519 as the item changes in size and/or tilts. With the latter arrangement, although the pitching will change in an unpredictable way as the matrix "moves" to follow the item, for each grid position the rate at which each sample is "played" will be change by the same proportion (if logarithmic/musical pitching is active), and so the samples will remain synchronized. (Alternatively a fixed grid can be used 504 FIG. 34 with individual effects triggered when required.)

3.7 System Architecture

The software for the system can be implemented as a simple standalone monolithic application. However a more modular architecture, as described below, may be advantageous, being more flexible and scaleable, and easier to implement and control.

With reference to FIG. 44, one possible approach is to provide an interface 684 between acquiring visual items (represented by the letter "V" 682), and presenting related effects (represented by the letter "E" 686). Such an approach has the benefits of a) allowing other/external systems to submit items for the system to present, and b) providing a scaleable architecture that allows the acquiring of several types of visual items to occur simultaneously, and several effects to be presented simultaneously.

For simple requirements, a single instance of the application 690 can be used, wherein the interface 684 acts to make the program design more modular: the visual item-acquiring module ("V") passes items to the effect-presenting module ("E") via the interface 684. This configuration may be appropriate for a device with limited technical resources.

The enclosing box 688 signifies that said two modules/facilities can be part of a single computer program/application 690, but with a flexible interface 684 provided.

The processing load can be distributed amongst several instances of the application, as illustrated in FIG. 44, which conceptually illustrates several instances acquiring visual items ("V") and presenting related effects ("E"), with the interfaces between the two modules/facilities within the instances of the application represented by dotted lines.

If required an external application can use either module/facility—for example another application can feed items in a standard format for the system to present, or another application can process the acquired visual items in some other way. Features internal to the system, for example the "drawing" facility described in section 4.6 below, can feed items to the interface 684 for presentation when needed, for example when the user wishes to have a drawn item presented.

However by using multiple instances of the application 692, several visual item-acquiring processes can occur simultaneously; and several effects can be presented simultaneously. For example the user may wish to monitor for people's faces 694 or other items, while presenting areas of color 696; or an external system may need may need to interrupt processing in certain circumstances, for example a proximity warning device 698 may request (with high priority) the presentation of effects to highlight to the user the location of a hazard.

One instance can act as the "primary instance" 700, providing the main visible GUI FIG. 4, via which the user can control and switch to other instances when required (for example to alter their settings), One way to achieve the architecture described above would be to automatically launch several instances of the application 692 when the primary instance 700 is launched. If the application is developed using Visual Basic then it can be compiled as an "ActiveX EXE" and extra instances can be launched using the "CreateObject" command. Running several instances in this way allows several processing "threads" to run simultaneously, which may produce better performance on certain systems.

A single file or database 702 can "flag"/indicate the availability state of any instance at any moment, for example "Ready" (to accept requests), or "Looking" (for visual items), or "Busy (75%)" (presenting its own or other instance's effects with an "importance" of 0.75). Other instances seeking a free instance to use should first seek instances showing a state of "Ready"; then "Looking"; then "Busy" with an importance/priority percentage less than their own priority.

An "importance" value can be assigned to the visual items so that if, for example, a more important item needs to be presented and all instances are currently busy, then presentation of the least important existing item can be interrupted and instructed to present the more important item.

By using a common "status" area 702 as described, a "peer-to-peer" configuration can be used whereby each instance runs semi-independently, seeking out whatever resource are free when needed, according to an agreed set of rules, and instances use the most appropriate instance to present the visual items that they have acquired (a "locking" arrangement should be used when the status is updated). This approach may be used to produce an effect similar to that present in human vision whereby several competing entities vie for attention, and one or more such entities are perceived by sighted person (the priority may be influenced by the current Task, as described in section 2.2 above).

A computer file folder, or database, 704 can act as an "in-tray" for visual items to be presented: several application instances 692 or external systems 698 can add visual items to the interface "in-tray" 704 for processing. The primary instance 700 can process the "in-tray", deciding the most important items, and allocate them to other instances to process 714 (or process them itself). Alternatively each instance can have its own "in-tray".

The interface 684 can comprise a system for requesting that items be presented. One approach is to present silhouette-like images 706 (for example as a bitmap "BMP" image file) wherein total blackness (i.e. an "RGB" value of 0), or total whiteness 706 represents areas not occupied by the visual item 27 FIG. 1. The area occupied by the item will normally contain the detailed light levels and colors of the item (i.e. an image of the item). The detailed light levels must not match the precise color shade used to represent unoccupied areas—if necessary a slightly different shade can be substituted. In addition to the silhouette-like image 706, the following items of information can be included:— a) the precise shade used to represent unoccupied areas 708, so that the effects module can correctly process the silhouette-like image;

b) the item type (e.g. "face", "blob", etc.) 710, so that item-specific effects can be correctly presented;

c) the importance (e.g. as a fraction, or percentage) 712, so that the system can prioritize the most important items for presentation;

d) special timings if required, so that items can be submitted to the interface prior to when they should be presented (not shown).

e) any other settings (e.g. setting overrides etc.) that may be needed for the effects module 686 to process the item (not shown).

Optionally the interface may not be presented with a silhouette-like image, but be presented with a semantic description of the items to be presented, for example specific shapes or descriptions of items and the area that they occupy. A useful feature is to allow external applications to provide parameters for shapes and corners, as well as "fill points" for filled shapes, in order to allow particular shapes to be presented via tracers, Imprints, etc.

Many applications can be devised which generate shapes, for example games, map applications, educational software etc., and these can be focused on particular niche applications, whereas the main system may be designed for more general use.

The system can then process the silhouette-like images. By presenting silhouette-like images 706 with detailed light levels and colors of the items, it is straightforward for the effects module 686 to a) plot the path of outline and other tracers from the silhouette shape(s); and b) calculate the effects levels, categorical values, layouts, texture effects etc. to present, from the detail, as described elsewhere.

Several separate items could be included in a single such interfacing image file, the separate items being distinguishable via special values held in the lower bits of the RGB color components of the pixels that cover the areas occupied by the separate items. Alternatively the "alpha channel" of a BMP file can be used to flag the status ("unoccupied", or item number etc.) of any part of the presented image (not shown).

The interfaces described above can be implemented using only simple file types (image files and text files) that many personal computer users are familiar with, so that it is straightforward for end users or 3rd party systems to use the system interface.

Additionally, the effect-presenting modules 686 can operate on systems separate from the systems on which the visual item acquiring activities take place, by passing the required data between systems.

Other similar arrangements can be devised.

Managing Effect Presentation

With several effect types available, and several visual item types presented, the GUI shown in FIG. 4 may not be ideal. The user may want particular effect types to be presented for particular visual item types. For example the user may want distinct symbolic tracers 148 FIG. 10 to signify people's faces, but poly/racers to present "blobs" of particular properties FIG. 14. The user may want Imprints presented for certain visual items, but not for others. Likewise the volume/intensity may need to be different for different effect types. Several visual item types, effects, and corresponding settings/options are described in this specification. In order to provide a practical and flexible method of controlling them, which has straightforward user interaction, the following approach can be used:— a) The GUI shown in FIG. 4 can be used to give broad "default" settings that are used if no other information is available.

b) If "Per Effect Type" 94 FIG. 4 is selected then a file specifies the settings to which particular effect types default are given. These can be overridden by settings/values for particular visual item types if applicable (not shown).

c) If "Per Item Type" 96 FIG. 4 is selected then a file specifies the type of effects presented for each visual item type, as well as certain settings, for example tracer type (symbolic, outline etc.), volume and timing. Checkboxes can specify if such effects are to override the defaults, and other controls can give values to be used (not shown).

Hence there is effectively a hierarchy of control, with the main GUI FIG. 4 giving the defaults, unless either or both of the checkboxes 94 and 96 are selected, whereupon the values for particular effect types are used (if given), and/or the values for particular visual item types are used.

4. Previously-Disclosed Features

This section mainly recaps previously-disclosed features of the system, but includes descriptions of their interaction with, and application to, the present invention.

4.1 Improving the Perception of Sound Tracers ("Buzz Tracks")

As discussed in the prior art description above, the perception of horizontal location is weak if only stereophonic cues are provided; and fluctuations in the volume of the speech sounds can make them less easy to understand. These weaknesses are addressed by using a separate audio (or tactile) "buzz track", as described below.

Adding a "Buzz Track"

A second audio tracer 6 FIG. 2 (known as a "buzz track") can be used that is easier to "mentally position" in the space presented by a "sound display" 5 than speech-like sounds.

One of the most effective sounds is a "buzzing" sound, but with a clearly defined pitch (i.e. a "voiced hiss" resembling the sound of a flying insect or bee). (Similar "moving" sounds are often used to demonstrate "3D sound" environments, indicating that such sounds are effective for conveying location in space.) Buzzing sounds can be generated by using "random" level "hissy" "white noise" to produce a sample of sound waveform of time length equal to that of one cycle of the required pitch, said sample being repeated for as many times as is necessary to produce the required length of sound. This approach produces a sound that might be described as "buzzing", but with a clearly defined pitch. The buzzing sound is usually (but optionally) played at the same time as the corresponding speech tracer, and pitched and positioned in the "sound display" 5 FIG. 2 in the same way as is used for the speech sounds and Imprints. The extra non-speech sound track is referred to as a "buzz track", but the sound timbre may not necessarily be buzzing-sounding, although such sounds tend to be easier to mentally position in space. Sounds that are of a particular timbre and that are used for buzz track-like purposes (including "polytracers"), but which are not necessarily buzzing sounding, are referred to as "humming" sounds. When such sounds, and corresponding tactile effects (e.g. continuous particular smooth, buzzing, square or sawtooth "rumble" effects) are referred to collectively they will be referred to as "humming effects".

The sound of the buzz track can be generated by the system—for example, "buzzing" sounds as already described, or sounds with square, or sawtooth waveforms. Alternatively recorded sound samples can be used, for example recordings of continuous notes produced by musical instruments; natural sounds; sounds produced by machines; etc. Such different sounds are useful if timbre is being used to convey additional information (as described later). The relative volumes of the apparently-moving speech sounds and the buzz track can be controlled by the user, for example via a slider 65 FIG. 4.

The "buzz track" is optionally played when the speech sounds are played, giving a clearer impression of the shape being presented. Any volume-altering effects (conveying information such as size, texture, width, change etc.; and sawtooth-profile volume effects, as described below) can be applied to the buzz track rather than distorting the speech sounds (distorting the speech can make it more difficult to comprehend).

For example if a medial-line tracer 144 FIG. 9 is used to present a shaped entity, then the entities "width" at any point can be conveyed via the volume of the tracer. If a "buzz track" is used, then as well as more-clearly giving the shape of the medial line, the width of the entity at any point can be conveyed by the volume of the buzz track, leaving the speech unaffected.

Both the speech tracer and buzz track can optionally follow the same apparent path at the same time. However, if small objects 4 FIG. 2 are being enlarged 6 to better convey their shape, then as an option either one of the buzz track tracer or speech tracer can be enlarged 104 FIG. 6, rather than both. Doing this will allow one of the 104 tracers to present the shape more effectively, while the other tracer gives the location of the small shape 106 within the image. (If a single force-feedback device is being used to present shapes, then it can follow the path of either such tracer.)

Effects corresponding to the buzz tracks can also be applied to the tactile display, for example by presenting a vibration of frequency corresponding to the current height within the image 119 FIG. 7.

Varying the "Timbre" of the Buzz Track to Convey Additional Information

If a "buzz track" is being presented, changes to its timbre can be made in order to convey additional information in a non-linguistic manner. For example, the left-right positioning can be further enhanced by gradually changing from a "buzzing" to "square wave" sound as the apparently-moving tracer sounds move from left to right. The vertical positioning can be emphasized in a similar manner. It is sometimes useful to be able to emphasize the center of the image area, by changing to a different timbre when the tracer is approaching the center of the image.

If timbre-altering facilities are provided, other properties or qualities can also be conveyed to the user via the buzz track, for example the features (e.g. roughness or smoothness) of the perimeter/edge of the object or the straightness or otherwise of the line being presented. "Pseudo-timbres" can be provided as options, for example the "quietness" and "loudness" (i.e. the volume).

FIG. 7 shows a GUI for controlling the buzz track feature. One approach is to give the timbre to be presented for both ends of a spectrum of properties: for example when horizontal position is being conveyed via timbre, the timbre for "leftward" 112 and "rightward" is given. The system will then vary the timbre as the motion changes.

A tactile version of the buzz track timbres can also be provided, by using continuously-altering tactile effects 114 FIG. 7.

"Pillar" and "Layer" "Lattice" Effects

If buzz tracks and timbre effects are used, or just buzz tracks, it is still sometimes difficult to interpret the shape of the line described by a moving tracer from the audio effects alone. Furthermore for a tracer moving in a mainly upward direction, it is difficult to determine the direction of the slope (i.e. whether to the left or right) from the slowly-changing timbre.

Consider for example the two shapes 104 & 108 FIG. 6. Although the two shapes can be distinguished from the buzz track alone with some practice, it is not always clear whether the edges are straight or curved.

In order to improve the perception of shapes, and slopes within shapes, and clarify them, additional effects can be added.

One approach is to divide the image to be presented into a lattice of equal-width columns 18 FIG. 2 and/or several equal-depth rows (which may or may not match the grid formed by the segments of the current Layout, if any). Then indicator effects can be triggered whenever the tracer moves from one such column to another 16 FIG. 2 (referred to as "pillar effects"), and/or from one such row to another (referred to as "layer effects").

Using pillar and/or layer effects allow the shape of lines to be perceived more clearly if (as is usually the case) the tracer travels at a constant speed, as then the rate at which the effects are presented will change to reflect the angle of slope. For example if pillar effects are presented then the diamond shape 108 FIG. 6 will produce an even rate of effects, while the "concave diamond" shape 104 will produce a changing rate of slope-conveying effects.

One suitable Layer effect may be to change effect pitch/frequency on change of layer, so that anywhere within a particular layer is presented at one pitch. The pitches can be set to be musical pitches, producing a musical effect. If volume-based Pillar effects are also applied, such effects can sound like musical beats. (However using this approach will reduce vertical resolution.) Similar effects could be applied directly to the speech effects, producing a "singing" effect.

Note that when pillar effects are presented, different effects can be presented when the tracer moves from left to right, and when it moves from right to left. One effective indicator effect for this purpose is to apply a sawtooth-shaped volume profile 109 FIG. 6 to the sounds as they move horizontally. The effect of the illustrated profile is that the buzz track presents an effect sounding like "bing-bing-bing" as the tracer moves left to right, characteristic of the "attack-decay" effect heard when a percussion instrument is struck, wherein the volume rises rapidly, then decays relatively slowly; and presents an effect sounding like "nyib-nyib-nyib" as the tracer moves right to left, characteristic of some of the sounds heard when a soundtrack is played backwards. The rate at which such effects are heard indicates the slope of the line described by the tracer.

Further clarity can be given to the horizontal definition of shapes by starting the tracer at, say, the leftmost point of the shape, so that the user knows that any initial horizontal movement will be rightwards (sometimes other considerations will override this approach).

The visual properties of Speed of travel, Angle of slope, Direction of movement (Rightward, Upward, Downward, Leftward), Size, Texture, Color temperature, Leftness, Rightness, Highness, Lowness, Bigness, Straightness, Curvyness, Roughness, Smoothness, ColorWarmth, ColorCoolness and Distance (and many other possible visual properties) can be mapped to the audio properties of Volume, Pitch, audio pulse frequency (e.g. "beeping" frequency) 116 FIG. 7; and to the tactile properties of Intensity, Frequency, and pulse rate 118 FIG. 7; and to other audiotactile properties/features.

Optionally each pillar or layer can be assigned a distinct effect. For example each pillar/layer can be presented with a distinct timber.

Optionally buzz tracks can be presented alone, without speech-like sounds.

Tracer Paths

Region Tracer Paths

When regular rectangular "Regions" are being presented FIG. 8, the audiotactile tracer's path shape only conveys the extent/area covered by the tracer, and not useful detailed shape information. However When pillar and/or layer effects are being output, a one-dimensional tracer path across or up/down the region respectively will exhibit the pillar and layer effects more clearly.

Hence one possible set of region tracer path options would be to provide tracer paths named "Steps" 120 FIG. 8, "Middle" 122, "Circle" 124, "Frame" 126, "Across" 128, and "Down" 130 ("Middle" referring to an unmoving tracer located at the center of the region being conveyed).

Buzz track effects help to clarify the presented region tracer path shapes.

Object Tracer Paths

When "Objects" are being presented via audiotactile tracers 68 & 63 FIG. 4, the audiotactile tracer's path can follow one of several routes FIG. 9, as described below (direction of travel along path may vary).

a) Object Outlines. The outline/perimeter of the object can be presented 63 FIGS. 4 & 140 FIG. 9, and/or other "keylines" if the optical processing component is able to identify such lines.

b) Object Centers. The audiotactile path tracer can be stationary for the period presenting the object, being "located" at the center of the object (not shown).

c) Object Frames. The audiotactile path tracer can follow a path that "frames" the extent of the object. The frame can be rectangular 142, or be rounded at the corners 141 FIG. 9 or ellipse-shaped (not shown). The frame will generally be orthogonal/vertical, but can slope to indicate the orientation of an elongated object at an angle to the vertical (not shown).

d) Object Medial Paths. The tracer can follow the "centerline" of an identified object 144 FIG. 9. This type of medial path is referred to as a "linear medial". It is not as effective for objects with no clear elongation: for them, a "circuit medial" can be used, wherein the path travels in a loop centered on the middle of the object, and is positioned at any point along its route at the middle of the content (or at the middle of the distance to the edge of the content) found between the center and the edge of the object 145.

e) Symbolic Object Paths. For identified objects, the system can present a series of lines and corners that symbolize the classification of particular objects, rather than attempting to present the shape that the object currently forms in the scene. Human figures 150 FIG. 10 and people's faces 148 are examples of entities that can be effectively presented via symbolic object paths 146 FIG. 9. One symbolic shape should be used to represent "unknown" (for example an "X"-shape 152 FIG. 10).

It was found to be useful to have sub-categories of symbolic shapes that show parts of an object. For example it is useful to provide a shape for the top half of a human figure 156, head & shoulders, etc.

Several symbolic shapes can be assigned to one entity to sub-classify it—for example the symbolic face can have versions for "head on" 148, "left-profile" 154, and "right-profile" 158.

It could be argued that symbolic object paths (i.e. special shapes which symbolize recognized objects) are unnecessary, as the nature of the object could instead be presented directly to the user, for example via speech synthesis or braille. However it may be that using a non-semantic format is less tiring or distracting in certain circumstances, and more closely resembles the experience of visual object recognition, though this issue has not yet been formally tested/investigated.

Buzz track effects help to clarify the presented object tracer path shapes.

Using Start Point and Direction of Travel

Although additional information can be conveyed via the start point and direction of rotation of the tracers (clockwise or anticlockwise), and via multiple simultaneous tracers, when tested such cues can be difficult and tiring to interpret if used for arbitrary non-specific shapes, although they can be effective for controlled/limited shapes such as symbolic tracers. The issues, in the audio modality, for general shapes are:—

Direction (clockwise or anticlockwise):— For elongated shapes 640 & 641 FIG. 42 it is difficult for the user to instantly determine the direction of rotation from the changing effects, although it is easier for more bulbous shapes 642.

Start point:— The start point can be confused if, for example, leftmost, rightmost, topmost, and lowermost start points are used—shapes such as 642 FIG. 42 would present very similar start points 644 for leftmost and topmost; and for rightmost and lowermost 646. Consequently it is only practical to use opposite start points (e.g. leftmost and rightmost; or topmost and lowermost) to signify additional information.

Consequently single tracer paths should generally start from the same side and travel in a consistent clockwise or anticlockwise direction. An additional benefit of using this approach is that it makes it easier for the user to "visualize" the shape if they know that its tracer will begin by moving in a consistent direction.

In the tactile modality similar considerations apply.

4.2 Improving the Perception of Image Layout

Object-Related Layouts

When presenting objects, a "layout" related to the object can be presented at the same time, for example by using a braille/tactile display, or by using speech codes. The Object-related Layout content can comprise material selected from the following options:— a) Object content. Because the shape of the object is known, the image content in only the area covered by the object can be presented. The system should spread the content over the area of the Layout, for example by recursively dividing the content into equal areas along axes in alternating directions 160 FIG. 11 until the number of areas matches the number of segments in the Layout, and then presenting the content of those areas in their corresponding segments in the Layout.

b) Framed content. The content of the rectangular frame enclosing the object can be presented in the Layout with the content "stretched" if necessary to use the full height and width of the frame (not shown).

c) Figure/Ground ("Profile") format. The content of the frame can be presented using an approach that incorporates the perceptual concept of "figure/ground" i.e. the effect whereby objects are perceived as being figures on a background. If one object is being presented then the system can present the layouts as showing:— i) The area covered by the object within the "frame" enclosing the object 164, the object being stretched in one direction, so that it extends to the edges of the Layout. If the object is sloping then the enclosing frame can also be sloping, or alternatively kept orthogonal. Alternatively a square frame can be used (not shown), wherein the object content is centrally positioned and not stretched (not shown).

ii) The location of the object ("Figure") within the whole scene or viewzone ("Ground") can be presented 166.

iii) All of the objects being presented within the whole scene or viewzone can be presented 168.

d) Viewzone content. The standard viewzone Region layout as previously described can be presented by the layout-presentation method (e.g. braille or speech codes) at the same time as the object path is presented via the audiotactile tracer.

e) Symbolic layout format. If the object has been identified, then symbolic layouts (using a similar concept to the symbolic object tracer paths described previously) can be presented, wherein the arrangement of dots is constant for particular object types (not shown).

Improved Layout Coding

Several viewzone Layout configurations have been devised wherein the center of the viewzone presents higher-resolution information than at the edges. Examples of such viewzones are shown in FIG. 12.

A simple 8-segment wide by 4-segment deep Layout format 172 FIG. 12 is can be effective when braille is used as output, as it can be easily presented via a single line of a standard refreshable braille display, and so it is easy for the user to "read".

Earlier coded phonetic methods used by the system for presenting the arrangement of properties in a panel used somewhat arbitrary sounds. Categorically-described visual properties were normally presented to the user via groups of "CV" (Consonant-Vowel) syllables; via Morse code-like impulses; and via braille. With reference to FIG. 5, the image 40 is reduced to 8 by 8 "segments" 41. The segments in each square of 4 by 4 segments (known as a "panel") are each set to one of the two shades that the system calculates best represent the panel 42. Then the image is presented via audio 43 and two tactile methods 44 & 45. For each panel, one CV syllable conveys the two selected shades; and two CV syllables convey the arrangement ("Layout") of those two shades. For the top right "panel" 46, the coded CV syllable "Wah" conveys the two color shades "white and black", and the two CV syllables "Lair-Roar" presents the "layout" of the two color shades as 4 by 4 segments. The whole image is conveyed by the four spoken "words" shown 43, and by the corresponding 12 braille cells 44, both of which fully describe the colors and layout of the 8 by 8 segments shown in 42. The coded Morse code-like impulses 45 exhibited on the force-feedback joystick 49 present the color shades.

The colors can also be presented in a coded but less arbitrary manner, for example "boo-yow" or "bow" for "blue and yellow". However when tested in a small trial, real-name (non-coded) colors were greatly preferred by participants, and it made the system more accessible to untrained people. The real-name colors could be spoken more quickly by the system, as the user was expecting a color name, and could "fill in" parts of the speech that they heard less clearly, as occurs in everyday speech—this effect is not available with the theoretically more efficient coded words. Even long color names such as "DarkPurple" could be spoken rapidly (in about a third of a second) and still be understood.

Given the positive response to using real color names for colors, the use of non-coded words for layouts has been investigated. Unlike for colors, there are no standard terms for particular arrangements of blobs. However it was straightforward to give reasonably sensible (and easily distinguishable) "real-word" names to 16 layout arrangements, allowing a 4-by-8 layout matrix 180 FIG. 13 to be presented to beginners via 8 short "real" words 184 in a "column-by-column" arrangement. (Such an arrangement also maps well to a standard 4-dot-high braille display 182.) For example the 16 terms "None", "First", "Next", "Third", "Fourth", "Two", "Mid", "Pair", "Split", "Dots", "Blobs", "Three", "Wide", "Gap", "Most" and "All" could be used to describe the 16 possible arrangements of a column or row of four segments.

A comfortable limit of about 4 to 6 short words per second is practical. This gives a limit to how much layout information can practically be presented via words. Furthermore, well-known experiments show that about 6 to 8 unrelated "chunks" of information can be comfortably handled in people's short term memory, giving a limit of about 4 to 6 "words" being used to present layout information for any particular area, if color information is also given.

Users may decide whether coded 186 or real-word 184 color and layout presentation is used: using real words may be more distracting to ambient sounds and more difficult for users to temporarily ignore, whereas the coded sounds may be easily ignored when required, without having to mute the system sounds.

With practice, users may become familiar with groups of sounds representing several columns, so that, say, a 4-by-4 blobs arrangement is immediately understood as a single entity "chunk", rather than having to be mentally "assembled" from the component sounds. (This has not yet been tested.)

4.3 "Polytracers"

If a medial-line tracer is used to present a shaped entity, then the entity's "width" at any point can be conveyed via the volume of the tracer. However the detail of the shape of the entity is not conveyed, nor is the "surface detail" of the entity. This can be rectified by using several shape tracers, that are output simultaneously, and are referred to as "polytracers". The tracers that comprise a polytracer are arranged approximately in a line, and move approximately perpendicular to said line, to "sweep out" item areas, in a similar manner to an optophone.

Multiple tracer speech or non-speech polytracers can produce optophone-like effects, which may allow more accurate perception of the distribution of material within entities, and can support Layouts and Imprints (as described in section 3.3 above).

The use of multiple speech tracers is briefly covered in U.S. Pat. No. 8,239,032, which describes how a medial tracer can be used with several other simultaneously-presented apparently-moving speech tracers to convey the shape, detail, and give an impression of the texture of the entity (they were referred to as "Spined Audiotactile Graphics with Multiple Tracers"). UK Pat. Appl. No. GB1101732.4 describes polytracers in more detail.

If several non-speech audio "humming" tracers (i.e. of a particular timbre but which are not necessarily buzzing sounding) are used (instead of, or in conjunction with, several speech-like tracers), then the shape and content of an area can be presented in a more intuitive manner. The multiple "humming" non-speech sounds may give a more-accurate indication of location in space, in a similar manner to single buzz track tracers. The selection of sounds for non-speech polytracers can be optimized for positioning accuracy. "Buzzing", "Sawtooth" and "Square" waveforms may work well for this purpose, but the extra tracers can alternatively present non-speech "pure" tones such as Sine waves in a similar manner to existing optophone-like systems.

Alternatively the extra tracers can also be speech-like, presenting the same speech phonemes as the main tracer, but with their pitch and stereophonic location at any moment corresponding to the location of the image matter that they are representing (as described in U.S. Pat. No. 8,239,032). Both options are provided 70 FIG. 4 and FIG. 19 (shown as "Tones" and "Voices").

The paths that the polytracers follow can either be straight parallel lines FIG. 17, as used in previous optophone-like systems, or if a shaped entity is being presented then the tracers can follow paths that help to convey the overall shape of the entity.

Contoured Polytracers

One way to include shape detail and to give an impression of the texture of the entity, is for the system to present a coded speech-like medial-tracer with several simultaneously-conveyed tracers that travel in approximately the same direction as the medial-tracer, but vary in the width that they represent FIG. 14 so that the shape of the entity is conveyed quickly, and more of the detail and texture is also conveyed 226 FIG. 14.

In a simple version, a straight medial line 206 FIG. 14 is used and just two extra tracers 202 & 204 convey the outside edge of the entity, but then little detail of the interior of the shape will be presented. The extra tracers can be non-speech (e.g. buzzing or tone sounds). Alternatively they can present the same speech-like sounds as the main medial tracer, so that a "chorus" effect is produced, with the pitch and stereophonic positioning of the tracers corresponding to the area of the image being presented at any moment.

In a more complex example, a contoured polytracer with a curved-medial-tracer 211 uses six further tracers 212 which are conveyed in the directions indicated by the arrows. The path of the medial-tracer can be decided in the same way as for standard curved-medial-tracers, and the paths of the two half-outline tracers 213 follow the outer edge of the entity. The half-outline tracers and the simultaneously-conveyed medial-tracers are conveyed at different speeds set so that each is conveyed at an even rate but completes in the same amount of time. If several "rib" lines 214 are plotted from points along the medial-tracer to points along the outer tracers which would be conveyed at the same time, each "rib" line can contain a certain number of equally-spaced points (two in the case in FIG. 14) and the path of the additional tracers can be determined by joining the corresponding points in all of the rib lines. All of the tracers can share the same start point 215 and end point 216.

The "contoured" polytracer method works best when the general direction of movement of the tracers is fairly horizontal, as the spread of frequencies helps to convey the width or height of the entity.

Parallel Polytracers

To overcome some of the limitations of "contoured" polytracers, equal-width tracers ("parallel polytracers") FIG. 15 travel quasi-parallel to the main (i.e. medial) tracer and are output simultaneously, and each tracer can convey the same width within the entity. The number of tracers actively presented at any moment will vary according to the width of the entity. "Parallel" polytracers are effective for presenting fragmented and convoluted objects.

The advantages of this method include:— a) All parts of the entity are conveyed, even if the border swings back from the general direction of flow 242 FIG. 15, or parts of the entity are separate from the main body of the entity 244. Because of this the method is effective for conveying fragmented entities, and those without clearly defined borders.

b) While each tracer can vary in volume to reflect the content of the area being conveyed, the number of tracers and hence the overall volume will tend to increase as the width of the entity increases.

The effect will be of a group of equal-width, quasi-parallel tracers traveling in line with the medial-tracer 246 FIG. 15, with the outer-edge tracers being activated and de-activated according to the width of the entity at any point 248 FIG. 15.

A "circuit" medial path FIG. 16 can also be used, the polytracers presenting the content of the entity along the route of the circuit medial.

Other similar arrangements can be devised.

Rectangular Polytracers

As an option, instead of shaping the tracers' paths, an optophone-like "rectangular" polytracer arrangement 250 FIG. 17 can be used, wherein the tracers are straight, parallel, and of equal length, forming a rectangular area. For example, Object-related Layouts (described in section 4.2 above) show the locations of entities within an image, so that a perceptual Figure/Ground effect is produced FIG. 11, either emphasizing the shape of the object 164 or the location of the object within the scene 168. Such "silhouette"-like images are effective when presented via optophone-like humming/tone and/or voice polytracers.

Rectangular polytracer arrangements can effectively present the information presented by the braille display area FIG. 13, or they can use their own resolution.

Rectangular polytracer arrangements can be sloped so that they are aligned with the "straight line medial" of an entity 252 FIG. 17.

Branching Medial Tracers and Polytracers

For certain entities, the system (or a human designer) can determine that neither a single medial line (straight or curved), nor a "circuit medial" FIG. 16 is appropriate for presenting the entity. This might be the case for clearly "branching" items FIG. 18 or a "Y"-shape. In such cases it may be advantageous for the audio main tracer to split into two main tracers at the branch point 263 FIG. 18, the two tracers being simultaneously-conveyed, but each being pitched and stereophonically-located to reflect its path. UK Pat. Appl. No. GB1101732.4 describes approaches for processing such shapes.

If "branching-medial-tracers" are used as a basis for area-conveying polytracers, it will be necessary to define which parts of the entity are conveyed by each branch.

If branching-medials are presenting speech sounds, then the same synchronized sounds should be output by each branch.

More complex branching situations can arise 268 FIG. 18 and similar approaches can be devised to convey them.

Polytracer Options

Many options can be set to control the polytracer effects, for example via GUI controls FIG. 19.

If a force-feedback device is being used to present shapes, then it will normally follow the path of the main/medial tracer.

The volumes presented can reflect the actual brightness of the content of a layout, or "false" volumes 280 can be used so that there is a clear change in volume when a change of content occurs, even if, say, two different color shades happen to be of similar intensity. Most of the Region Layout and Object-related Layout arrangements described elsewhere can be presented by the polytracers 282 FIG. 19, for example those producing silhouette-like effects.

The pitch range used for the polytracer effects can match the pitching conventions used elsewhere by the system 284.

The number of tone-like tracers ("Stripes") 288 or speech-like voices 294 can be set, as well as their relative overall volumes 290. For "rectangular" polytracer arrangements 250 FIG. 17 the output tracers can be made to "pulse" 292 as separate sounds on change of columns/pillars or rows/layers to give a "beat" effect which will help convey the Pillar and Column "lattice". Many other options could be included.

Many effective combinations of settings can be implemented for polytracers. A single "buzz track" tracer can define the medial line 222 FIG. 14 while the other tracers are speech-line or tone-like, or the two outer edge tracers 220 can be buzz tracks etc. Many of the layout arrangements previously described can be presented via polytracers (including symbolic layouts), either as "rectangular" polytracers, or shaped to match to the entity being presented.

To summarize, polytracers are often used to support the Layout effects previously described; and to give greater clarity to the shapes being presented, and to the distribution of material within those shapes.

Tactile equivalents to polytracers can be provided by presenting them on a tactile array displays 15 FIG. 2, such as the tactile palm-pad described in the applicant's U.S. Pat. No. 8,239,032, or the Optacon™, Brainport™, Forehead Sensory Recognition System, or other tactile array.

4.4 Pre-Defined and Found Objects & Features

The system can present both entities found in images "on the fly" by using optical processing/"computer vision" methods; and pre-defined entities from prepared media identified and marked up by a human designer. (The system can also present entities submitted by an external system—see section 3.7 above). FIG. 20 summarizes the process:—for non-prepared media (e.g. "live" images) the system attempts to find (a) objects according to the user's requirements, and builds a "Guide" (b) of the found objects. Alternatively a previously-prepared Guide (b) can be used to give the objects and features that are present. Finally, the corresponding Effects (c) are presented to the user.

Below is described one technique for pre-defining entities within images, in which entities are marked onto image bitmaps and a corresponding table is produced and stored on a text file that describes the nature and properties of the entities.

For non-prepared images ("live" images, etc.) pre-defined features will not be available. Section 4.5 below describes various techniques for identifying and extracting entities from images etc. The selected blobs and other entities can then be "painted" onto the corresponding image bitmap by the system, with their data bits set as appropriate; and a table can be produced by the system, describing the selected entities, in the same manner as described below for pre-defined images. Said bitmap and text file can then be handled by the same routine as is used to process the pre-defined features. The selected entities can then be presented by stepping round the objects in order of importance or via whatever method the user has selected.

The controls 74 FIG. 4 specify whether the Guide is used (if available), or whether the scene is always automatically processed in order to discover objects etc., even if a pre-defined Guide is available i.e. the Guide is ignored/overridden.

Creating and Using a Pre-Defined "Guide"

For prepared media, a sighted designer can highlight the entities present in images, and identify what they are, their importance etc. Such pre-defined entity information can be held on a separate file, or embedded in files of common multimedia formats (e.g. MP3). The pre-defined sequences can be presented as a series of one or more "Views" that describe the scene being presented. FIG. 23 illustrates how bitmaps 315 and the text table 316 are combined to produce a guide 317, which can be attached/bound to the end of the corresponding media file 318.

This approach allows the file 320 to be viewed and/or heard (if an audio file) by sighted people using standard media players (which do not normally detect such additions to the file), but when the file 320 is processed by the system, the system can detect if pre-defined feature information 317 is present, by searching for a distinct set of identification data at the end of the file. If this is found then the pre-defined feature information can be separated and processed as a separate file One or more "Views" can be used in pre-defined sequences (known as "Guides") to present a scene. Movies can be conveyed by presenting several images or "Views", approximately equivalent to a "shot" in a movie "storyboard". Usually one View will be used for still images and several Views will be used for motion picture sequences. For each View, one or more "objects" can be presented. It is found to be effective to "step" around each object in a View, showing the most important objects and features in order of importance. Alternatively the user can select the items that are to be presented.

Creating Pre-Defined Guide Sequences

The following approach was found to be effective for creating pre-defined sequences:—

1) Plan the Views to be presented by the Guide.

2) For each View, determine the number of non-overlapping groups of objects and/or features occurring in the scene. Generally one group of objects 300 FIG. 21 will present the background, and one or more further groups of objects present the foreground 302 and details.

3) For each Group, create a bitmap file of the image but with the least significant bits masked out/cleared. These can then be marked with non-overlapping "objects" 304 FIG. 21 using standard image processing software. The images with marked objects and features can contain just "Objects" 304 FIG. 21; and/or the Paths to be followed when presenting the features.

"Paths" can be included to illustrate (a) the shape of objects and/or (b) the paths that objects move along in the scene being portrayed. For example for a bouncing ball, the shape of the ball, and the path that it follows, can be presented.

4) Create a text table FIG. 22 listing the objects 308 in the View(s), and the exact color shades applicable to them 310. Standard word processing or spreadsheet software can be used for this purpose. The table can also specify the Importance 311, Distance 312, Opacity 313 etc. of items.

5) After the text file and Markup bitmaps have been created, the system should process/merge them, creating a Guide file 317 FIG. 23 containing details of the objects and features in the View(s), and with the bitmap Markup 315 information included.

The system can present the features in Views to the user in the required manner, for example by presenting the objects/features in a Group 308 & 309 FIG. 22; the most important objects/features, or objects/features whose importance has been determined to be greater than a certain amount 311; or a selected object/feature (for example by the user positioning a pointer and pressing a button-sequence, or "clicking" on an object with a mouse); etc. Alternatively the user can specify keyword(s) 76 FIG. 4 included in the Descriptions 307 FIG. 22 of the objects/features. For movies, accessible "VCR"-style controls 78 FIG. 4 can control the presentation of the entities in successive Views of a multi-View Guide.

4.5 Using Computer Vision

The technology known as "Computer Vision" allows many of the audiotactile effects to be applied to specific features of images. The resultant features, for example the features described in this section, can then be presented using, where appropriate, the audiotactile techniques described elsewhere in this specification, including Imprint effects.

There are several software libraries available for performing computer vision techniques. The application of four standard computer vision techniques will now be described using the facilities of the OpenCV package, namely blob extraction; object detection/identification; motion detection; and object tracking. However many other similar techniques can be applied to producing shapes and paths etc. for the audiotactile effects to present.

The simple controls 80 FIG. 4 can be used whereby the user can select the color(s) that the system is to search for, by ticking "checkboxes" 82 (which can also be "checked" or "unchecked" via a key sequence) i.e. several colors can be sought simultaneously. The system then performs standard blob extraction techniques, and selects those "blobs" which match the selected colors. Checkboxes are also provided for requesting searching for people's faces 84, human figures 86, and areas of motion 88, as described below.

Blob Extraction

Blob extraction/image segmentation techniques are useful, as the perimeter, or medial line, etc. of the extracted blobs can be the features that are presented via tracers and Imprints. Filtering methods such as "moving average" can be used to reduce the detail in an image, and pixels falling into particular color bands can be grouped together to form blobs 324 FIG. 24, which can then be presented to the user. Blob resolution can be improved by performing standard optical processing techniques such as eroding and dilating the blobs.

Several different colors can be grouped together 322 FIG. 24—for example the pixels of the colors Red, Orange and Yellow can be handled as a single shade, so avoiding the fragmentation of objects that contain several such colors.

Optionally fragmented images can be "thresholded", then ellipses fitted to the resultant contours by using the OpenCV functions Threshold, FindContours, and FitEllipse. Appropriate resultant ellipses, and their content, can then be presented via the Imprints.

The resultant blobs can be presented, where appropriate, using some of the audiotactile techniques described elsewhere in this specification, for example Imprints (as described in section 3.6).

Object Detection

There are methods available for detecting the presence of particular objects within an image, and the system can provide this facility. The user can specify which object types are sought, and how many are presented and the selection criteria. For example faces can be presented to the user as easily-recognized Symbolic Object Paths 148 FIG. 10.

Detected objects e.g. faces can also be presented, where appropriate, using some of the audiotactile techniques described elsewhere in this specification, for example Imprints (as described in section 3.6).

Motion Detection

The presence of motion within a sequence of images (for example live video images) can be detected via the OpenCV function "CalcOpticalFlowPyrLK" which allows points to be tracked between successive images. By presenting the images to CalcOpticalFlowPyrLK in the reverse order, the locations to which the points appear to move form a regular grid, rather than where they start from. The grid of motion end points can then be consolidated to form "blobs" 326 FIG. 25 whose shape and location can be presented to the user by using the techniques described previously. The direction of the "tails" of the arrows 328 FIG. 25 showing the directions of motion around the perimeter of a blob 326 can be used to determine the overall direction of movement. In FIG. 25 a lateral move left is occurring. FIG. 26 shows the motions 334 that may occur if "zooming" (i.e. growth or shrinkage) and rotation are occurring.

By analyzing the direction of motion flow, motions such as rotation; tilt; "zoom" (i.e. growth or shrinkage); and lateral movement (up, down, left, right etc.) can be determined. Lateral moves are straightforward to determine, as all points tend to move in the same direction. However by sampling the angles 336 FIG. 26 that the individual moves make with the radius lines 338 that run from the middle of the motion area to the perimeter, zoom and rotation movements can be estimated The derived information can be then be presented to the user either directly (e.g. via speech synthesis), or more intuitively via buzz track effects such as altering the timbre of a buzz track that is conveying the shape and location of the area of motion 326 FIG. 25.

Detected motion areas of motion 326 FIG. 25 can be presented, where appropriate, using some of the audiotactile techniques described elsewhere in this specification, for example Imprints (as described in section 3.6 above).

Object Tracking/Locking

The object tracking/locking feature provides a facility for blind people to perceive the paths followed by moving entities. Once an area of interest within an image has been determined, for example via face detection or motion detection as just described, the system can track (i.e. follow) the entity concerned. For example the OpenCV function "Camshift" (Continuously Adaptive Mean Shift) returns an ellipse 340 FIG. 27 giving a probable location and extent of a particular entity whose initial location is given to OpcnCV. An effective way of doing this is to allow the user to trigger tracking 90 FIG. 4 when a particular entity is being presented i.e. "lock on" to a particular item and keep presenting it until the user requests it to resume normal presentation. If Motion 88 or Face 84 presentation is selected, then when, for example, a particular face is being output, the user can select tracking 90, whereupon the normal image processing is interrupted, and the location of the current object (or motion blob etc.) is determined and that area is then tracked.

The motion of the tracked area can be presented by the main tracer following the center of the tracked area 342 FIG. 27. This tracer can present speech information, and have buzz track effects applied to it, in a similar manner to standard tracers, except that it will be reporting a continuously-changing entity (namely the center of the tracking ellipse 340) rather than presenting individual shapes etc. within successive image "snapshots". Additional tracers can present polytracer-like effects, for example by separate tracers following the paths of the corners of the ellipse-enclosing rectangle 344 FIG. 27, and/or the paths of the ends of the ellipse cross-hairs 346. In this way an intuitive impression of the speed, location and area of motion can be conveyed.

In the tactile modality, the main tracer path will by default also follow the path of the tracked area (e.g. a force-feedback joystick can follow a path related to the path of the center of the tracking ellipse).

Tracked objects can also be presented, where appropriate, using some of the audiotactile techniques described elsewhere in this specification, for example Imprints (as described in section 3.6).

Processing Simple Images

There is one type of image which is straightforward to handle and very effective to present, namely simple images or visual materials containing a limited number of color shades, and with clearly defined areas 92 FIG. 4. Examples of such materials include maps, diagrams, cartoons etc., and these are often encountered in environments where a computer might be being used (e.g. office or educational environments). It is important that the system handles such materials effectively.

Before doing general image processing, the system can a) sample the image pixels (or inspect all image pixels if the image is not too large), and if the number of different color shades is less than a particular number, handle the image as a simple image. Process the image perimeter pixels, and define the background as being the most popular color shade found along the perimeter of the image. No image filtering such as moving average smoothing etc. will normally be required.

This approach is straightforward to implement for simple images held on "lossless" file/image formats that define a precise shade to each pixel, for example "GIF" and "BMP" images. The checkboxes used to specify colors to find and present 82 FIG. 4 can optionally temporarily change to match the found colors.

The resultant areas of color can be presented, where appropriate, using some of the audiotactile techniques described elsewhere in this specification, for example Imprints (as described in section 3.6).

4.6 Creating and Accessing Audiotactile Images

A facility can be provided whereby a user can "paint"/draw simple shapes on a background, in a similar manner to that followed by sighted people using standard computer painting programs. The facility can be used by a blind person to create images and present corresponding audiotactile effects. It can also be used to facilitate the process of creating pre-defined Guides (see section 4.4 above).

The resultant images can be immediately replayed; edited; and saved. A blind person can check the created image. Audio feedback can use sounds similar to those used for buzz tracks in order to clarify locations and shapes. Created images can also be presented via Imprint effects.

The facility can include features tailored to the marking-up process for pre-defined Guides (see section 4.4 above), for example by filling closed shapes with the same color; or by allowing the least significant bits of an image's (e.g. a photograph's) pixels to be "zeroed"/cleared 360 FIG. 28;

and automatically incrementing the marker bits of selected mark-up colors; and producing the corresponding text file listing the colors used 354, in a similar manner to that described in section 4.4.

The drawing facility can be implemented as a general facility for marking up images with features to be presented as audiotactile effects. FIG. 28 shows an example GUI for such a facility. In the figure, an image 350 is being "marked up" with objects 352. The incorporated table facility 354 allows the user to edit a Guide table and bitmaps in a more convenient manner than if using a separate word processor or spreadsheet and image editing program as described in section 4.4. For example the system can automatically adjust selected colors 356 so that they are precisely the correct color to align with the Guide, as is required for the system to link objects marked-up in the image 350 with the objects contained in the Guide table 354.

The simple editing controls 370 allow the user to draw lines (for example via a computer mouse) which can then be presented as tracer paths; or "closed" lines can be "filled" with colors assigned to particular objects 376, which are then presented using the current system settings (including Imprint effects). Note that the functionality of this accessible drawing facility is described as being controlled via a standard mouse or joystick, but other suitable current or future pointing methods can be used. Currently standalone touch-screens and the integrated touch-screens of "smart-phones" and "slate-" and "tablet-" format computers would in many cases also be suitable.

Controls 358 allow the user to clear the image to a plain background, so that simple lines and shapes can be drawn and immediately presented. (Alternatively the current image can be selected as a background by using a control 360, allowing the user to trace round items etc. for markup purposes.) When a new background is selected in this manner, the system clears the special "markup" bits of the image (e.g. the lower bits of each RGB color component for the example shown in FIG. 28), so that subsequent markup drawing performed by the user using the precise colors shown in the Guide 354 (with the lower bits set as per the Guide) can be identified by the system as markup information.

Paths drawn onto the image by the user can be presented directly (by activating a control 362), or the system can present the "blobs" drawn on the image using the current system settings 364 (using the current settings for object tracer-type—e.g. perimeter/outline, medial line etc.; or using Imprint effects). If the path is presented directly 362, then the relative timing used when drawing the path can optionally be used to adjust the relative speed at which sections of the tracer path are presented (this option can be selected via the checkbox-style toggle-button control 366).

The facility shown in FIG. 28 can be made more accessible to blind people by allowing them to use a joystick 372, or a computer mouse with constrained movement such as the Logitech Force Feedback Mouse, to draw lines and indicate points in the image 350. An "unconstrained" mouse (i.e. standard computer mouse) can also be used, as described below. For blind users, stereophonic humming sounds using similar conventions to those used for "buzz tracks" can be used to give continuous feedback to the user about the location of the mouse pointer (i.e. software drawing "pen") at any time. When users move a mouse (or joystick) in a certain path, the feedback sounds that they hear will be similar to those produced when a tracer moves in the same path, and they will hear similar sounds when the "buzz track" of the same shape is replayed. The same effects as are described above for implementing "buzz tracks" (and appropriate timbre and Pillar/Layer effects) can be used to provide feedback to the user as they move the mouse (or joystick). Additionally Imprint effects can be triggered if a "fill with color" action is triggered, to confirm the approximate size and location of the filled item.

An important feature of the draw/markup facility is allowing users to add specific common shapes to an image 376 FIG. 28, for example simple component shapes such as circles, squares etc., or specific standard objects such as faces, trees, cars etc. The latter can resemble their corresponding "symbolic object paths" FIG. 10. The user only needs to specify the object type (e.g. via keyword or object number), and the start and end point of the object, for example via a mouse or via speech input. The object is then interpolated between the start and end point given, making object drawing very straightforward for blind users. The object can be "stretched" or squeezed 380 & 378 FIG. 28 by the user optionally supplying a percentage or fraction 380. The resultant shape can be "filled" if required, and feature as part of a guide (and be included in Object-related Layouts etc.). Imprint effects can repeatedly output as an object is being "drawn" in order to give feedback on its size and location.

When the facility shown in FIG. 28 is requested, if no Guide is active, then a simple default Guide can be loaded, for example a Guide containing one View, one Group and one Object record 374 FIG. 28. These records can be added to by using the controls 368, as the user marks up the image.

Using a Computer Mouse to Draw Images

An unconstrained computer mouse is normally considered to be of little use to a totally blind person, as they are unable to visually follow the mouse pointer on the screen. However if the location-conveying buzz track audio feedback method described above is implemented, then the user can be aware of the mouse location, and the shape of the path in which it is moving.

However a problem with this method is that for a drawing application such as that shown in FIG. 28, the user has to locate the mouse pointer in the drawing area/"canvas" 350 FIG. 28, which is difficult to do even with audio feedback. A solution is to allow the mouse to be moved anywhere on the computer's screen/"desktop" area (i.e. use the full dimensions of the screen), but with the location being processed to map to the canvas area.

In addition to using a conventional mouse, "alternative" input devices that simulate the action of a mouse may be used. Other new methods that are devised can be used as an input device if appropriate, for example using gesture-based input, Gyration™'s "Air Mouse™", or Microsoft™'s "Kinect™" system. Numerous other input methods can be used.

4.7 Creating and Accessing Data, Graphs, and Waveforms

Data (for example as held in a computer spreadsheet) can be presented in the form of audiotactile shapes, in a similar manner to the methods described for other shapes, the shapes being similar in form to certain standard visual graphs and charts. The system (or an external program) can read the data and process it into the form of path shapes that are reminiscent of standard charts and graphs FIG. 29. The path followed by the tracer in presenting non-visual effects to convey an "audiotactile graph" resembles the corresponding conventional visual graphs and charts of the same type, for example line graphs 400 FIG. 29, column charts 402, pie/doughnut charts 406 etc.

Such "audiotactile graphs" are particularly effective when presented with "buzz track" effects applied, as they clarify the shape being presented. Additionally Imprint effects can be used: the graph type known as a "bubble chart" FIG. 39 is effective when presented via Imprints, as described in section 3.4 above. As with other applications, the effects can be presented as audio effects and/or as tactile effects, for example as moving tracer or stationary Imprint effects presented on a tactile array 15 FIG. 2.

One key difference from general image presentation is that the distinct indicator effects, which normally convey the presence of corners, can be used to represent data points. Such effects would sometimes be generated by the system anyway if it was presenting shapes such as 400 FIG. 29 when the slope of the line graph changed suddenly, but the system can explicitly generate similar indicator effects to represent data points 401 even if no corner is present, such indicator effects being presented at the moment when the tracer is passing the locations of the data points occur within the line graph, in a similar manner to the way corners in shapes are presented. Such effects are output even if the angle of slope does not change so as to form a clear corner 403.

A computer spreadsheet FIG. 30 includes values to be presented 420, and special identification elements 422, which can be created by a user, or generated by another system. The identification elements 422 contain a distinct prefix that is unlikely to occur otherwise, followed by an identifier. These are followed by data and other values 420. These can, by a convention, describe the type of graph to be presented (for example "LIN"=Line graph 400 FIG. 29, "COL"=Column chart 402, "BAR"=Bar chart 404, "PIE"=Pie/doughnut 406, "NET"="Net"/"radar" 408, or "WAV"=Wave file—described later). As shown in FIG. 29, the path followed in presenting non-visual effects to convey a graph resembles the corresponding conventional visual graphs and charts of the same type.

The graph type can be overridden by the user. The range of the graph, and the location of Pillar effects etc. can be given on an information row 424 FIG. 30. Other information, such as categorical information to be presented etc. can also be included. Other rows of the spreadsheet contain the data points to be presented 426. (The spreadsheet FIG. 30 is for the graph 410 FIG. 29.)

The system presents the data in the form of a shape, preferably with buzz track effects applied, which conveys the data. For example 400 FIG. 29 shows a linear path that resembles a line graph. Similar graphs have previously been presented by using optophone-style audio mapping. However by using audiotactile "tracers" that can move in any direction, shapes that resemble other graph and chart styles can also be presented via non-visual effects FIG. 29.

The following features can be provided, for example controlled by a GUI FIG. 31, or specified via the input file:— a) Presenting data points as indicator effects 430 FIG. 31, as described above.

b) Equal time legs 432. The tracer will normally travel at an even speed, but optionally the speed can alter so that an equal time is assigned to each data point, the tracer traveling faster between data points that are located further apart spatially. This approach may be preferred by some users.

c) Switch sound between points 434. Effects such as timbre can be used to distinguish separate legs. The tracer buzz track sound timbre can on change on change of leg. This approach is effective when Pie charts are presented 406 FIG. 29, as the several sections are emphasized in this way. Particular timbres can convey the nature of the item represented by the corresponding leg. (Tactile effects can also change on change of leg, in a similar manner.)

d) "Spiky" charts 436. The line representing the graph can return to a zero point 405 (or other value) between data points, in order to emphasize the height/location of the data point. This will produce a "bouncing" effect between points. This feature can be used to produce effects that simulate visual column and bar charts 402 & 404 FIG. 29.

Several "rows" of data can be presented, for example in sequence 406 & 410 FIG. 29.

Presenting Wave Shapes

As well as providing facilities for presenting data in the form of graphs and charts as described above, the system can also present waveform shapes, for example for educational purposes.

For example the waveform types presented can be sinusoidal waves 450 FIG. 32, "rectangular" waves (including square waves), sawtooth-shaped waves (including triangular waves), and other wave shapes (e.g. the spreadsheet in FIG. 32 controls an audiotactile waveform that illustrates a Fourier series). The parameters of the waveform can be controlled in a similar manner (i.e. via a spreadsheet or GUI), and can include wave shape 450; the number of waves to be presented 452; the wave minimum to maximum range 454; the start phase 456; etc.

Several waves can be added/combined, and the resultant waveform presented. The several waveforms can be specified via a spreadsheet FIG. 32; or via bespoke GUI controls FIG. 31. For example a "Fourier Series" of several sine waves can be combined to demonstrate how a periodic signal can be represented as a sum of sinusoids (the formula implemented via the spreadsheet FIG. 32 or via the controls 438 FIG. 31).

With all of the graph, chart and waveform, and other techniques described in this section (and elsewhere), the "buzz track" techniques described previously and the Imprint techniques described above can be used, where appropriate, to clarify the shapes presented.

4.8 Using a "Viewfinder" to Capture Images

The presented images can be gathered from various sources, such as image files, DVDs, or live video images, and these may be specifically handled by the system. However a more general facility can be provided by defining an area of the computer's screen contents as being the image to be presented 472 FIG. 33. This area can be controlled via a sizable and moveable "viewfinder" frame that can "hover" over any part of the screen.

The "viewfinder" facility can "snap" parts of the computer's "desktop", or parts of any application that is not handled by the bespoke image gathering facilities.

It is useful to provide facilities to lock the viewfinder to an area 464 FIG. 33, or to a particular application 466 (so that it "follows" the application if it is moved); to "see through" the system GUI 468; and to store and retrieve the settings for later use 470.

5. Conclusions

Advantages

From the description above, a number of advantages of some embodiments of my system for presenting visual items become evident:

(a) "Imprint" effects allow the user to gain a rapid and intuitive impression of the size and arrangement of items within a visual representation.

(b) When combined with previously-disclosed features such as buzzing shape-tracers and corner effects, and polytracers, the shape of items can be accurately perceived.

(c) It can be used for numerous applications.

Conclusions, Ramifications and Scope

Accordingly, the reader will see that the improved system addresses several of the shortcomings of previous inventions in the field. Furthermore, the system has the additional advantage that embodiments can be implemented using low-cost standard computer hardware.

Although the description above contains many specificities, these should not be construed as limiting the scope of the embodiments but as merely providing illustrations of some of the presently preferred embodiments. Numerous modifications may be made to the arrangements that have been described without departing from the true spirit and scope of the invention.

Thus the scope of the embodiments should be determined by the appended claims and their legal equivalents, rather than by the examples given.

I claim:

1. A method of presenting visual items comprising:
    (a) acquiring at least one visual item, wherein each of said visual items has content at a plurality of locations;
    (b) first processing each of said visual items into the form of a group of substantially apparently-stationary stereophonic effects, each of said groups of effects comprising a plurality of substantially apparently-stationary stereophonic sounds,
        wherein each of said stereophonic sounds of said group presents the same at least one property that relates to said visual item that said stereophonic sound presents, and
        wherein the pitch and horizontal stereophonic positioning of each of said stereophonic sounds of said group relate to the vertical and horizontal locations respectively of at least one of said plurality of locations of said content of said visual item that said stereophonic sound presents, whereby each of said property-presenting stereophonic sounds has an apparent location that relates to said at least one location of said content of said visual item that said stereophonic sound presents;
    (c) providing at least one audio display means;
    (d) outputting at least one of said groups of stereophonic effects to at least one of said audio display means;
    whereby the properties, locations, and extents of said visual items can be rapidly perceived via non-visual effects.

2. A method according to claim 1 wherein said stereophonic sounds include sounds selected from the group consisting of: words of natural languages, phonemes of natural languages, coded phonemes of natural languages, other categorically-perceived sounds, tone-like sounds, humming sounds, buzzing sounds, tapping sounds, bubble-like sounds, raindrop-like sounds, and combinations thereof.

3. A method according to claim 1 wherein other effect types are additionally presented, wherein said other effect types include other effect types selected from the group consisting of: tracer effects, polytracer effects, tactile effects and combinations thereof; whereby said visual items can be more accurately perceived.

4. A method according to claim 1 wherein said groups of stereophonic effects are presented via user-controlled methods, wherein said methods include methods selected from the group consisting of: sequentially in time, simultaneously, individually, and combinations thereof; whereby a person can perceive an impression of said visual items as groups of apparently-stationary stereophonic effects that are stepped-round and sequentially-presented, or simultaneously-presented, or individually-presented, and can control which items are presented.

5. A method according to claim 1 further including the step of second processing the distribution of the varying visual properties of said content of said visual items into the form of fluctuations in the volumes of said stereophonic sounds, wherein said varying visual properties include properties selected from the group consisting of: brightness, color, and combinations thereof, and said fluctuations include fluctuations selected from the group consisting of: variations in volume, variations in rate of change of volume, and combinations thereof; whereby an impression of the texture of said visual items can be perceived via said volume fluctuations.

6. A method according to claim 1 wherein particular properties of said stereophonic sounds are related to particular properties of said visual items, and said particular properties of said stereophonic sounds include properties selected from the group consisting of: length of time of presentation, order of presentation, volume, and combinations thereof; and said particular properties of said visual items include properties selected from the group consisting of: size, importance, brightness, and combinations thereof.

7. A method according to claim 1 further including the steps of:
    (a) third processing visual representations, said third processing comprising identifying a particular number of prominent categories of visual properties, and their distribution, within said visual representations, wherein said visual properties include properties selected from the group consisting of: colors, textures, categories of object types, and combinations thereof;
    (b) fourth processing said distributions of said prominent categories of visual properties, said fourth processing comprising assigning said distributions as said visual items for said acquiring, said first processing, and said outputting steps;
    whereby the distribution of said prominent visual properties within said visual representations can be perceived via non-visual effects.

8. A method according to claim 1 wherein said visual items are related to visual representations, or parts of visual representations, wherein said visual representations include visual representations selected from the group consisting of: live images, recorded still or moving images, created still or moving images, filtered still or moving images, still or moving images prepared by a person, maps, abstract shapes, descriptions of shapes and other visual properties, visual representations produced by computer vision processing, areas of common properties, areas of movement, identified objects, data that can be presented visually, parts of computer desktops, visual representations provided by external systems, and combinations thereof;
    and wherein said visual items include visual items selected from the group consisting of: areas of particular ranges of colors shades and other properties, elements of data that can be presented visually, regular areas within said visual representation, areas of movement, people's faces, text, other objects, other entities that can be presented visually, and combinations thereof.

9. A method according to claim 1 which is provided as a smartphone application.

10. A method according to claim 1 which is provided as an Internet service.

11. Apparatus for presenting visual items comprising:
    (a) acquiring means for acquiring at least one visual item, wherein each of said visual items has content at a plurality of locations;

(b) first processing means for processing each of said visual items into the form of a group of substantially apparently-stationary stereophonic effects, each of said groups of effects comprising a plurality of substantially apparently-stationary stereophonic sounds, wherein each of said stereophonic sounds of said group presents the same at least one property that relates to said visual item that said stereophonic sound presents, and wherein the pitch and horizontal stereophonic positioning of each of said stereophonic sounds of said group relate to the vertical and horizontal locations respectively of at least one of said plurality of locations of said content of said visual item that said stereophonic sound presents, whereby each of said property-presenting stereophonic sounds has an apparent location that relates to said at least one location of said content of said visual item that said stereophonic sound presents;

(c) at least one audio display;

(d) outputting means for outputting at least one of said groups of stereophonic effects to at least one of said audio displays;

whereby the properties, locations, and extents of said visual items can be rapidly perceived via non-visual effects.

12. Apparatus according to claim 11 wherein said stereophonic sounds include sounds selected from the group consisting of: words of natural languages, phonemes of natural languages, coded phonemes of natural languages, other categorically-perceived sounds, tone-like sounds, humming sounds, buzzing sounds, tapping sounds, bubble-like sounds, raindrop-like sounds, and combinations thereof.

13. Apparatus according to claim 11 wherein other effect types are additionally presented, wherein said other effect types include other effect types selected from the group consisting of: tracer effects, polytracer effects, tactile effects, and combinations thereof; whereby said visual items can be more accurately perceived.

14. Apparatus according to claim 11 wherein said groups of stereophonic effects are presented via user-controlled methods, wherein said methods include methods selected from the group consisting of: sequentially in time, simultaneously, individually, and combinations thereof whereby a person can perceive an impression of said visual items as groups of apparently-stationary stereophonic effects that are stepped-round and sequentially-presented, or simultaneously-presented, or individually-presented, and can control which items are presented.

15. Apparatus according to claim 11 further comprising second processing means for processing the distribution of the varying visual properties of said content of said visual items into the form of fluctuations in the volumes of said stereophonic sounds, wherein said varying visual properties include properties selected from the group consisting of: brightness, color, and combinations thereof, and said fluctuations include fluctuations selected from the group consisting of: variations in volume, variations in rate of change of volume, and combinations thereof; whereby an impression of the texture of said visual items can be perceived via said volume fluctuations.

16. Apparatus according to claim 11 wherein particular properties of said stereophonic sounds are related to particular properties of said visual items, and said particular properties of said stereophonic sounds include properties selected from the group consisting of: length of time of presentation, order of presentation, volume, and combinations thereof; and said particular properties of said visual items include properties selected from the group consisting of: size, importance, brightness, and combinations thereof.

17. Apparatus according to claim 11 further comprising:

(a) third processing means for processing visual representations, said processing comprising identifying a particular number of prominent categories of visual properties, and their distribution, within said visual representations, wherein said visual properties include properties selected from the group consisting of: colors, textures, categories of object types, and combinations thereof;

(b) fourth processing means for processing said distributions of said prominent categories of visual properties, said processing comprising assigning said distributions as said visual items for said acquiring means, said first processing means, and said outputting means;

whereby the distribution of said prominent visual properties within said visual representations can be perceived via non-visual effects.

18. Apparatus according to claim 11 wherein said visual items are related to visual representations, or parts of visual representations, wherein said visual representations include visual representations selected from the group consisting of: live images, recorded still or moving images, created still or moving images, filtered still or moving images, still or moving images prepared by a person, maps, abstract shapes, descriptions of shapes and other visual properties, visual representations produced by computer vision processing, areas of common properties, areas of movement, identified objects, data that can be presented visually, parts of computer desktops, visual representations provided by external systems, and combinations thereof;

and wherein said visual items include visual items selected from the group consisting of: areas of particular ranges of colors shades and other properties, elements of data that can be presented visually, regular areas within said visual representation, areas of movement, people's faces, text, other objects, other entities that can be presented visually, and combinations thereof.

19. Apparatus according to claim 11 which can be arranged on a substantially horizontal surface, whereby said apparatus can be used on a desktop or similar surface.

20. Apparatus according to claim 11 which is portable.

* * * * *